US007170826B2

(12) United States Patent
Furukawa et al.

(10) Patent No.: US 7,170,826 B2
(45) Date of Patent: Jan. 30, 2007

(54) MULTIFUNCTIONAL WATCH

(75) Inventors: Tsuneaki Furukawa, Nagano-ken (JP); Eiichi Nagasaka, Nagano-ken (JP); Koji Fukui, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 303 days.

(21) Appl. No.: 10/764,482

(22) Filed: Jan. 27, 2004

(65) Prior Publication Data

US 2004/0264304 A1 Dec. 30, 2004

(30) Foreign Application Priority Data

Jan. 28, 2003 (JP) ............................ 2003-018806
Jan. 30, 2003 (JP) ............................ 2003-022165
Jan. 30, 2003 (JP) ............................ 2003-022166

(51) Int. Cl.
*G02B 19/04* (2006.01)

(52) U.S. Cl. ......................... 368/80; 368/223; 368/228

(58) Field of Classification Search ................ 368/223, 368/11, 80, 64, 66, 110, 112–113, 204, 228; D10/39

See application file for complete search history.

(56) References Cited

U.S. PATENT DOCUMENTS 2,265,906 A 12/1941 Guyoto
3,077,729 A * 2/1963 Schlenker ................... 368/228
3,457,720 A 7/1969 Backman
3,901,020 A * 8/1975 Capt et al. .................. 368/105
5,724,317 A * 3/1998 Kubota et al. ................ 368/11
D449,231 S * 10/2001 Giardiello .................... D10/32
6,466,518 B1 10/2002 Akahane et al.
6,570,823 B1 * 5/2003 Gilomen et al. ............ 368/113
2004/0170088 A1 9/2004 Seyr

FOREIGN PATENT DOCUMENTS

CH 65765 A 7/1914

(Continued)

OTHER PUBLICATIONS

Sekainotokei (or World Wrist Watch Time Spec), Aug. 20, 2004, p. 28, No. 58, World Photo Press, Japan.

*Primary Examiner*—Vit Miska
*Assistant Examiner*—Sean Kayes
(74) *Attorney, Agent, or Firm*—Global IP Counselors, LLP

(57) ABSTRACT

There is provided a multifunction timepiece wherein the visibility of pointers can be improved, and increases in the thickness of the timepiece can be reduced. This timepiece includes a dial, an hour hand, a minute hand, a pointer, and a movement. The dial has a dial cover and a time display section on the inner periphery thereof. The hour hand is mounted on the time display section and has an hour hand rotating shaft disposed at a different position from the center position of the time display section. The minute hand is mounted on the time display section and has a minute hand rotating shaft disposed at a different position from the center position of the time display section. The pointer is mounted on the time display section and has a pointer rotating shaft. The dimension A from the pointer rotating shaft to the tip of the pointer is greater than the dimension B from the minute hand rotating shaft to the tip of the minute hand. The pointer rotating shaft is disposed at a position away from the hour hand rotating shaft by a distance less than dimension A and greater than dimension B. The movement drives the hour hand, the minute hand, and the pointer.

15 Claims, 28 Drawing Sheets

FOREIGN PATENT DOCUMENTS

| | | | |
|---|---|---|---|
| EP | 0361013 | A | 4/1989 |
| EP | 1118915 | A | 7/2001 |
| JP | 29-13590 | U | 10/1924 |
| JP | 05-30236 | B | 4/1986 |
| JP | 61-083991 | A | 4/1986 |
| JP | 05-66588 | U | 9/1993 |
| JP | 2555141 | U | 9/1993 |
| JP | 2595941 | Y | 8/1994 |
| JP | 2000-147166 | A | 5/2000 |
| JP | U2605696 | Y2 | 6/2000 |
| WO | WO-99/54792 | A1 | 10/1999 |
| WO | WO-02093273 | A | 11/2005 |

* cited by examiner

A-A CROSS-SECTIONAL VIEW

B-B CROSS-SECTIONAL VIEW

C-C CROSS-SECTIONAL VIEW

D-D CROSS-SECTIONAL VIEW (3:00)

MULTIFUNCTIONAL WATCH

BACKGROUND OF THE INVENTION

1. Field of the Invention

The present invention relates to a multifunction timepiece having pointers for displaying the standard time as well as pointers for displaying chronograph time, temperature, and other such information other than the standard time.

2. Background Information

Recently the demand has been growing for multifunction displays that display the time information of chronographs, alarms, timers, and the like as well as temperature, pressure, humidity, and other such information not only in digital electronic timepieces but also in analog electronic timepieces (pointer type electronic timepieces), and various multifunction analog timepieces are becoming commercially available.

In these multifunction analog timepieces, pointers for chronographs, alarms, and other such added functional displays are provided in addition to an hour hand, minute hand, and seconds hand for showing the standard time or other such pointers for displaying standard time (pointers for basic timepieces).

Therefore, it has been necessary to dispose the pointers in the time display section of the timepiece so that they do not interfere with each other. The time display section is the region separated by nonessential components such as the inner peripheral surface of the case for holding the periphery of the dial, and is the region in which the dial can be seen.

Therefore, with multifunction timepieces having a chronograph function, for example, normally the rotating shafts of the hour hand and minute hand for displaying the standard time are disposed in the center of the time display section (for example, the time display section is the center position of the circle in a common flat circular multifunction timepiece, or is positioned at the point of intersection of the diagonals in a flat rectangular time display section, and normally coincides with the barycentric position of the dial), and the rotating shaft of the second chronograph hand (seconds CG hand) for the chronograph function is disposed on the same axis.

Also, a small seconds hand for displaying seconds in standard time, and a minute chronograph hand (minute CG hand) and an hour chronograph hand (hour CG hand) for a chronograph may be provided as pointers (auxiliary pointers) whose rotating shafts are disposed other than in the center of the time display section (for example, see "JP-A 61-83991, referred to hereinbelow as Patent Literature 1").

Other examples include those wherein pointers with rotating shafts disposed at the center of the time display section are not provided, but the hour hand, minute hand, and seconds hand for displaying the standard time are disposed below the center position of the time display section (the 6:00 side in a regular timepiece), the 1/10th seconds CG hand is disposed to the left of the center of the time display section (the 9:00 side in a regular timepiece), the seconds CG hand is disposed above the center position of the time display section (the 12:00 side in a regular timepiece), the hour CG hand is disposed to the right of the center position of the time display section (the 3:00 section in a regular timepiece), and the standard time display section and chronograph display section are disposed so as not to overlap each other (for example, see WO99/54792, hereinbelow referred to as Patent Literature 2).

However, the electronic timepiece with a chronograph function cited in the above-mentioned Patent Literature 1 has problems in that the user has difficulty distinguishing the hands because the pointers for standard time display and the pointers for chronograph display overlap, and particularly the seconds CG hand and the minute and hour hands for standard time display overlap in a coaxial manner. Another problem is that since three pointers are disposed on the same axis, the thickness of the electronic timepiece increases because a gear train or the like for driving the pointers is also disposed in the center of the time display section in an overlapping manner.

The electronic timepiece with a chronograph function cited in the above-mentioned Patent Literature 2 is made easier for the user to read because the standard time display section and chronograph display section are positioned independently so as not to overlap. However, problems have been encountered in that the dimensions of the pointers are reduced and the display sections as a whole are smaller and more difficult to see.

Such problems are not limited to timepieces with chronograph functions but are also common in multifunction timepieces having pointers for displaying the time information of alarms, timers, and the like, as well as temperature, pressure, humidity, and other such information.

Also, electric motor-driven electronic timepieces are driven by electric power supplied from a regular battery, but other timepieces have become known in recent years. These timepieces are provided with power-generating devices in consideration for the need to dispense with battery replacement, to improve ease of use, and make the products more environmentally friendly by incorporating types in which power is generated by rotating a rotor with an oscillating weight or a coil spring, as well as solar batteries and other such power generators.

For example, multifunction timepieces incorporating a power generator that utilizes an oscillating weight are becoming known among analog electric timepieces (pointer type electric timepieces) having a chronograph function (for example, see FIG. 13 of the aforementioned Patent Literature 2).

In a timepiece with a power-generating device, it is necessary to incorporate a secondary battery for storing the power generated by the power generator in a movement.

This movement may, for example, have a bottom plate, an electric motor or gear train for driving the pointers, a circuit holder for supporting the gear train or the like, a gear train support, a printed circuit board on which an IC or the like is mounted, a power generator, a secondary battery, and the like. When the movement is assembled, normally the aforementioned components are stacked in order from the components of the dial (normally the bottom plate) to the components of the back cover.

Specifically, the movement is assembled by mounting the circuit holder on the bottom plate, disposing the gear train, electric drive motor, secondary battery, or the like thereon, and sequentially layering the gear train support, the printed circuit board, and the like. In other words, a single-layer structure wherein the components constituting the movement are disposed between the bottom plate and the gear train support and printed circuit board has conventionally been used. Therefore, the configuration is such that the secondary battery is disposed on the dial side of the printed circuit board (first layer), simplifying the conductive structure of the secondary battery and the printed circuit board.

However, when the secondary battery is disposed on the dial side of the printed circuit board (first layer), the secondary battery is already mounted by the time components such as the gear train and printed circuit board are incorporated into the assembly.

Therefore, the electrical conduction from the secondary battery must be cut off when the circuits are electrically inspected after the components are assembled. In a common design, therefore, a component such as a positive terminal is incorporated last, and caution must be taken to prevent the secondary battery from becoming conductive during the assembly steps.

Therefore, problems have been encountered in that the design of the movement becomes complicated, workability of assembly is reduced, and it is difficult to improve productivity of the movement.

In the particular case of a large number of pointers, as in a multifunction timepiece with a chronograph function, an electric motor, gear train, and other such components for driving the pointers must be incorporated, and problems have been encountered in the sense that it is difficult to design a movement in which a positive terminal can be incorporated last and that the movement is difficult to assemble.

Also, when the secondary battery is disposed in the same layer as the electric motor or gear train, the flat space capable of accommodating the secondary battery is reduced and an extremely flat secondary battery must be utilized. Extremely flat secondary batteries cannot be efficiently charged due to significant internal resistance.

Such problems are extremely pronounced in a timepiece with a rotary-weight power generator in which an oscillating weight, power generator, or other such components must be mounted, because of the need to take into account the manner in which these components are mounted, and the problems related to the incorporation of a secondary battery are common to other timepieces with other types of power generators.

Also, a chronograph timepiece with an analog display, which is a typical example of a multifunction timepiece, has a second chronograph hand, a minute chronograph hand, and other such chronograph hands, and a start button provided to the timepiece is operated to start time measurement. In other words, operating the start button causes the drive force from the drive source to be transmitted to the chronograph wheels with chronograph hands, and the wheels start moving. Operating a stop button terminates the time measurement, stops the chronograph hands, and causes the measured time to be displayed by the chronograph hands.

Many conventional chronograph timepieces are designed with a common start and stop button, and the start and stop functions can be alternately repeated. A reset button is also provided separately from the start and stop button in conventional chronograph timepieces. When the chronograph hands are stopped, operating the reset button causes the chronograph hands to return to the zero position (hereinafter described as “reset to zero”). When the hands are reset to zero, the electronic circuits controlling the driving of the chronograph are simultaneously reset, and the chronograph timepiece reaches a state awaiting the next start.

Other electronic chronograph timepieces include those that have independent electric motors for the second chronograph wheel and the minute chronograph wheel, wherein the electric motors are controlled by electronic circuits to start, stop, and return the wheels to zero.

However, this configuration requires electric motors for the plurality of chronograph wheels, which increases the number of components and complicates the structure. Also, when a wheel is reset to zero with an electric motor, the length of time needed to reset the wheel to zero increases for some of the stopping positions of the chronograph hands because the electric motor is driven at a determined step rate to reset to zero.

On the other hand, the mechanical resetting structures used in conventional mechanical timepieces have merits in that resetting to zero can be performed instantaneously regardless of the stopping position of the chronograph hands. Therefore, chronograph timepieces are being proposed wherein the mechanical resetting structure used in a mechanical timepiece is combined with electronic control.

The mechanism for mechanically resetting the chronograph hands to zero has a structure wherein the hands are reset to zero by pressing a heart-cam provided to the chronograph wheel for holding the chronograph hands and displaying the elapsed time. Structures with operating cams are sometimes used in this case in order to be able to control the start, stop, and reset states in a stable manner while providing a satisfactory feel when the mechanism is operated (for example, see pages 3 through 8 of the aforementioned Patent Literature 2).

The operating cam in Patent Literature 2 has a toothed gear section and shaft sections, and the rotary position of the operating cam is controlled by means of an operating cam jumper. The operating cam is turned one pitch at a time by pressing the start and stop button, and the start and stop states are established by defining two positions: a position at which the tip of the operating lever touches the wall of a shaft section of the operating cam, and a position between the adjacent shaft sections. During resetting, a return-to-zero transmission hammer is moved by pushing a reset button to reset to zero, but the tip of a second return-to-zero transmission hammer comes into contact with a shaft section of the operating cam when the timepiece has been started, and the timepiece cannot be reset to zero. When the timepiece is stopped, the tip of the second return-to-zero transmission hammer comes between the shaft sections of the operating cam and assumes a positional relationship whereby the timepiece can be reset to zero. In such a configuration, the three conditions of start, stop, and reset are established with the controlled positions of the operating cam rotated in interlocked fashion with the operating buttons.

A structure for simplifying the resetting mechanism has also been proposed (for example, refer to “Utility Model Registration No. 2605696 ([0010-0022]), hereinbelow referred to as Patent Literature 3”). In this Patent Literature 3, pressing the reset button moves a return-to-zero hammer, a maneuvering lever, and a return-to-zero transmission hammer, which are always interlocked via the return spring of a battery hold-down plate, and the pressure section of the return-to-zero transmission hammer applies pressure to a heart-cam provided to the chronograph wheel to return the pointers. This continually maintains a state in which the return-to-zero transmission hammer constantly applies pressure to the heart-cam by means of a spring formed on the battery hold-down plate.

When the start/stop button is pressed, the maneuvering lever and the return-to-zero transmission hammer are moved in coordinated fashion by the return spring of the battery hold-down plate disposed along the outer periphery of the movement, and the pressurized state of the heart-cam created by the pressure unit of the return-to-zero transmission hammer is released. The position of the return-to-zero transmission hammer is controlled by means of interlocking with the notches in the spring provided to the battery hold-down plate.

Therefore, the maneuvering lever is also controllably positioned by means of the return-to-zero transmission hammer into a state separated from the start/stop button. When the start/stop button is pressed again, the maneuvering lever and the return-to-zero transmission hammer do not move with the button operation, and the return spring of the battery hold-down plate provided to the outer periphery of the movement next to the start/stop button is connected to the contact point of the circuit substrate, and a switch input is established, and when the button is released, the button alone is returned by the return spring and the switch input is turned off. Thus, the structure allows the start and stop operations to be repeated.

In Patent Literature 2, controlling the positions of the shaft sections of the operating cam makes it possible to control the positions of the operating lever and the return-to-zero transmission hammer that are interlocked with the operation of the start/stop button and the reset button; to stabilize the start, stop, and reset states; and to prevent malfunctioning. However, numerous components are involved, the structure is complicated, and there have also been problems with assembly.

In Patent Literature 3, the maneuvering lever and the return-to-zero transmission hammer are interlocked and switch input is established when the start/stop button is pressed during the start operation, and the maneuvering lever and return-to-zero transmission hammer are not interlocked and the switch input alone is established even if the start/stop button is pressed during the stop operation.

With such a structure, the number of components can be reduced and the configuration can be simplified, but the structure is still such that during the stop operation the buttons are inconvenient to operate because the ON and OFF operations are merely repeated by electrical power, so the buttons tend to be easily pressed, and malfunctions tend to occur.

Such problems are not limited to chronograph timepieces, and timepieces having pointers for displaying time information, temperature, pressure, humidity, and other such information in alarms, timers, and the like have had the same problems.

It will be clear to those skilled in the art from the disclosure of the present invention that an improved timepiece is necessary because of the above-mentioned considerations. The present invention meets the requirements of these conventional technologies as well as other requirements, which will be apparent to those skilled in the art from the disclosure hereinbelow.

SUMMARY OF THE INVENTION

A first object of the present invention is to provide a multifunction timepiece wherein the visibility of the pointers is improved and the timepiece can be prevented from becoming thicker.

A second object of the present invention is to provide a multifunction timepiece with a power generating device wherein the circuits can be electrically inspected, the movement can be easily designed and assembled, and the charging efficiency of the secondary battery can be improved.

A third object of the present invention is to provide a multifunction timepiece wherein the mechanical resetting structure of the pointers can be realized with a small number of components, the structure can be simplified, assembly can be improved, and the operation can be made reliable and more convenient.

The timepiece relating to the present invention has a dial, an hour hand, a minute hand, a pointer, and a movement. The dial has a dial cover and a time display section on the inner periphery thereof. The hour hand is mounted on the time display section and has an hour hand rotating shaft disposed at a different position from the center position of the time display section. The minute hand is mounted on the time display section and has a minute hand rotating shaft disposed at a different position from the center position of the time display section. The pointer is mounted on the time display section and has a pointer rotating shaft. The dimension A from the pointer rotating shaft to the tip of the pointer is greater than the dimension B from the minute hand rotating shaft to the tip of the minute hand. The pointer rotating shaft is disposed at a position away from the hour hand rotating shaft by a distance less than dimension A and greater than dimension B. The movement drives the hour hand, the minute hand, and the pointer.

The objectives, characteristics, merits, and other attributes of the present invention described above shall be clear to those skilled in the art from the description of the invention hereinbelow. The description of the invention and the accompanying diagrams disclose the preferred embodiments of the present invention.

BRIEF DESCRIPTION OF THE DRAWINGS

Referring to the accompanying diagrams that partially disclose the present invention.

DESCRIPTION OF THE PREFERRED EMBODIMENTS

Embodiments of the invention will now be described with reference to the drawings. As will be apparent from the disclosure of the present invention to those skilled in the art, the description of the invention embodiments is intended solely to illustrate the present invention and should not be construed as limiting the scope of the present invention, which is defined by the claims described below or by equivalent claims thereof.

[First Embodiment]

Next, the first embodiment of the present invention will be described.

Figure 1:
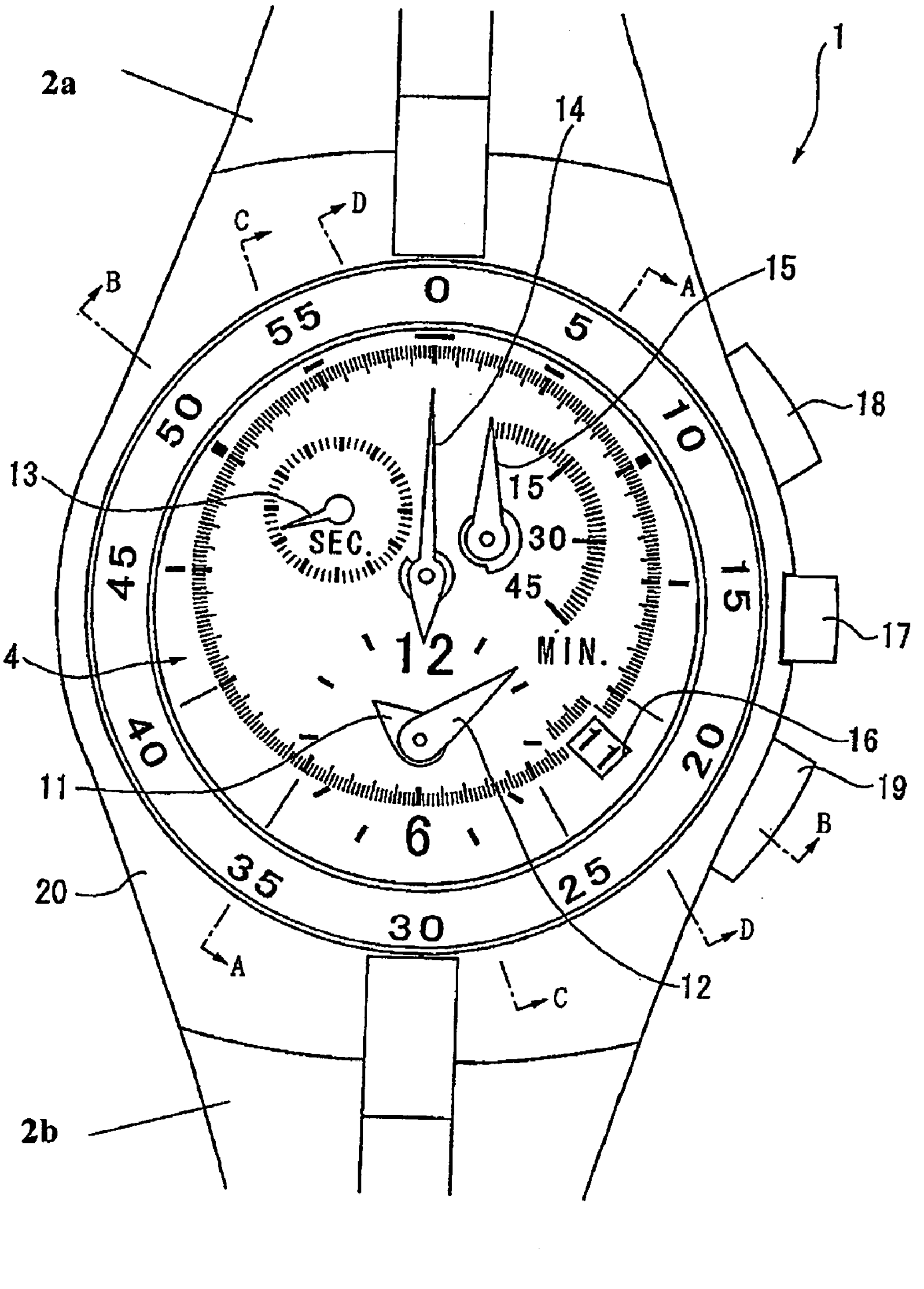
FIG. 1 is an external front view of a chronograph timepiece, which is the first embodiment of the present invention.

FIG. 1 shows a front external view of a chronograph timepiece 1, which is an embodiment of the multifunction timepiece of the present invention.

Figure 2:
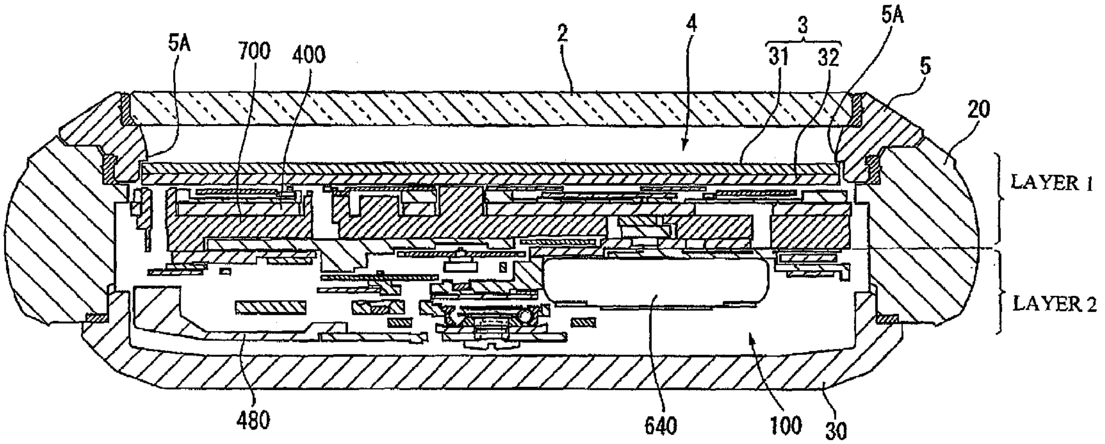
FIG. 2 is a cross-sectional view along the line A—A in FIG. 1.
Figure 3:
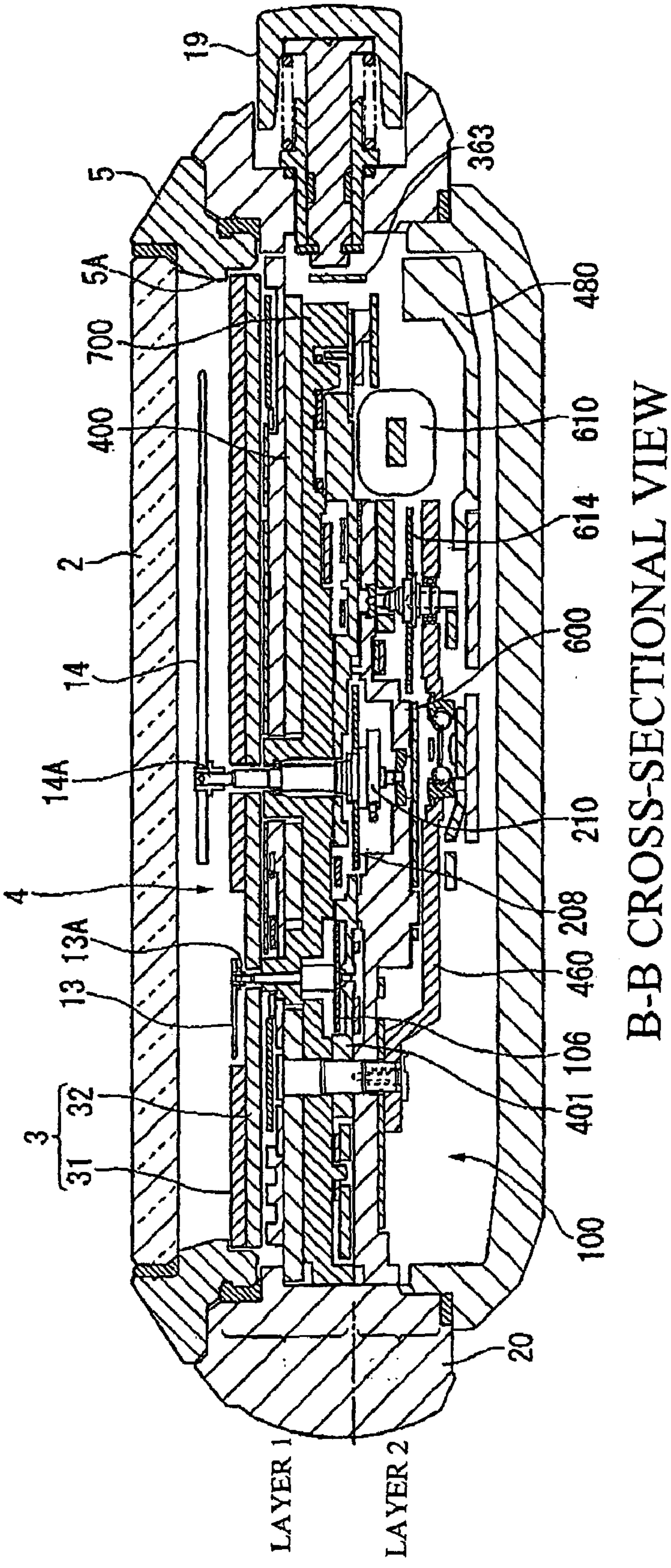
FIG. 3 is a cross-sectional view along the line B—B in FIG. 1.
Figure 4:
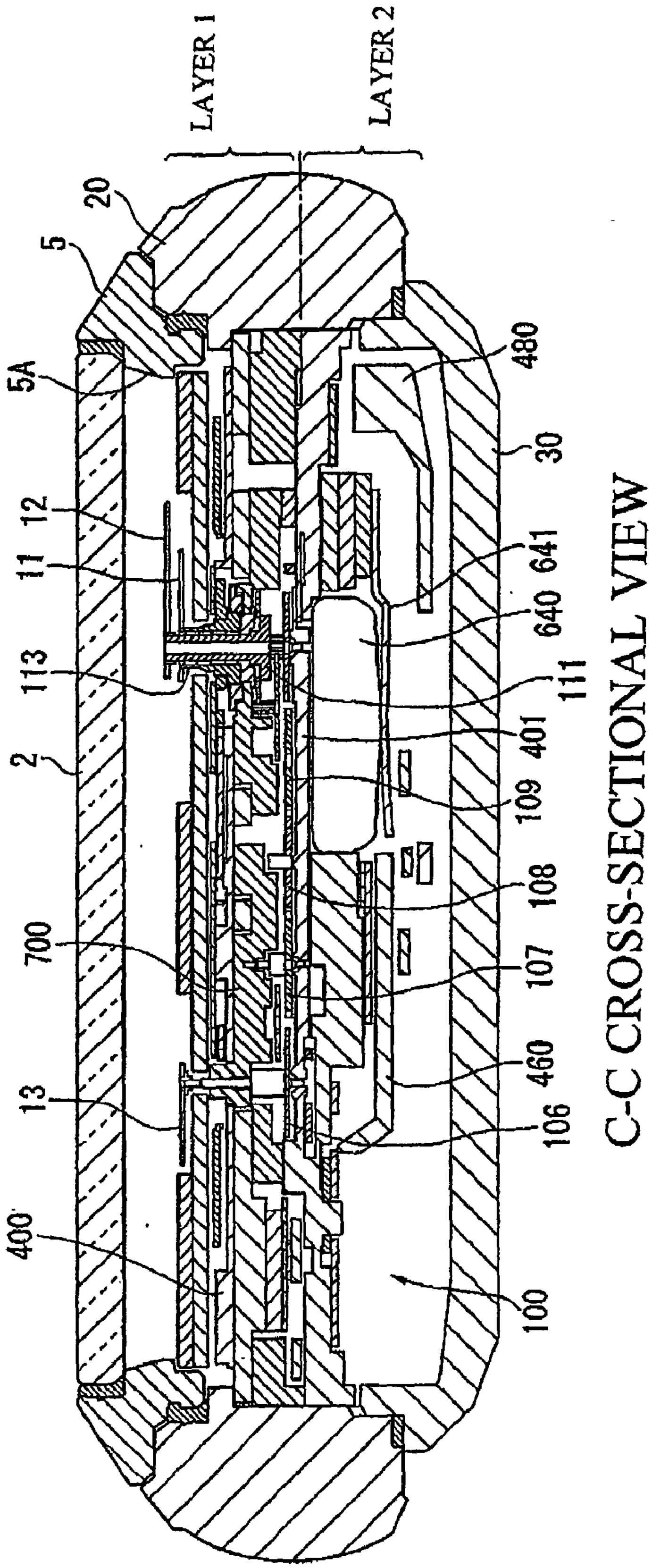
FIG. 4 is a cross-sectional view along the line C—C in FIG. 1.
Figure 5:
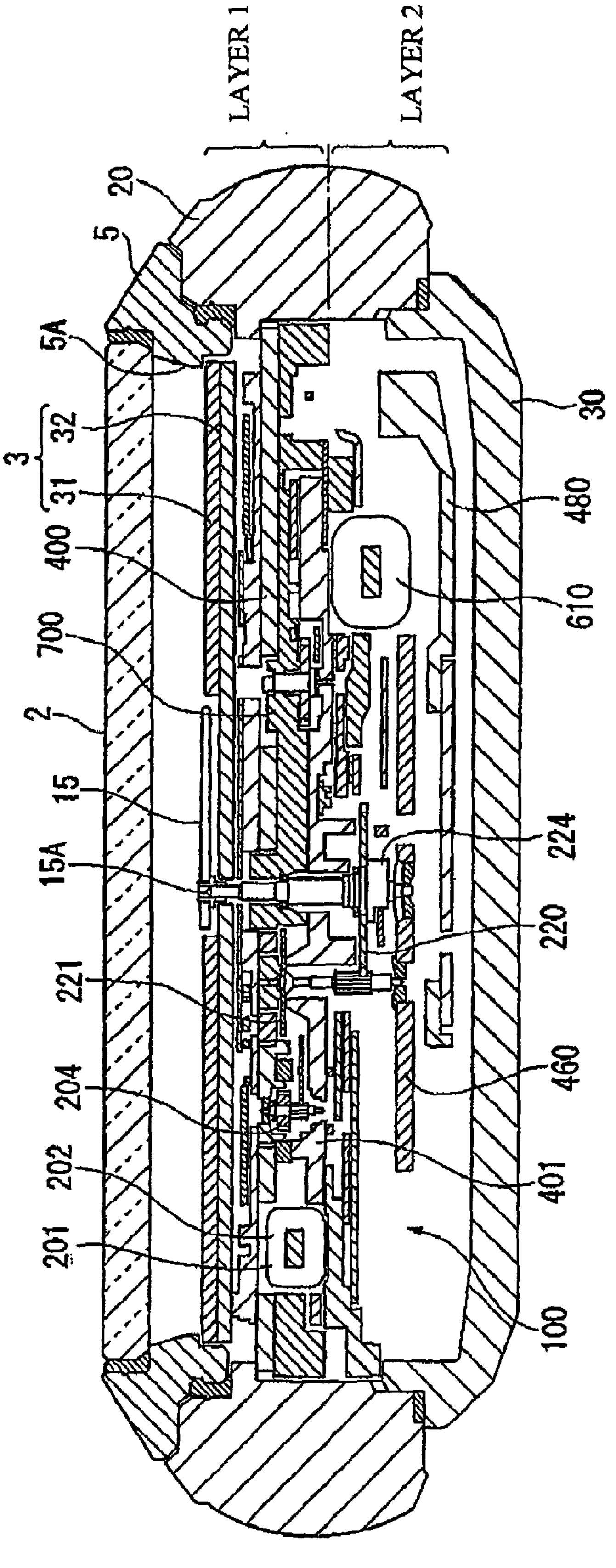
FIG. 5 is a cross-sectional view along the line D—D in FIG. 1.

This chronograph timepiece 1 has a time display section 4 comprising a dial 3 visible through transparent glass 2, as shown in FIGS. 2 through 4, which are cross-sectional views along the cross-sectional lines A—A through D—D in FIG. 1. Specifically, the time display section 4 is partitioned off around the inside of the inner peripheral surface (dial cover surface) 5A of a glass-holding ring 5 mounted around the dial 3. Therefore, in the present embodiment, the time display section 4 is partitioned off into a roughly circular shape when viewed from the front, and the dial cover for partitioning off the time display section 4 is formed by the glass-holding ring 5.

[Pointer Layout Configuration]

The chronograph timepiece 1 has an hour hand 11, a minute hand 12, and a seconds hand 13 designed for displaying the standard time and mounted on the time display section 4, and a second chronograph hand (seconds CG hand) 14 and a minute chronograph hand (minute CG hand) 15 for displaying information other than the standard time, namely, the chronograph time, as shown in FIG. 1. Therefore, the pointers for displaying information other than the standard time are configured by the seconds CG hand 14 and the minute CG hand 15.

Also, a winding-button 17, which is an external operating member for correcting the standard time, is mounted on the side of the timepiece 1 in the 3:00 direction; a start and stop button 18 for starting and stopping the seconds CG hand 14 and minute CG hand 15 is mounted in the 2:00 direction; and a reset button 19 for returning the seconds CG hand 14 and minute CG hand 15 to zero is mounted in the 4:00 direction.

Figure 6:
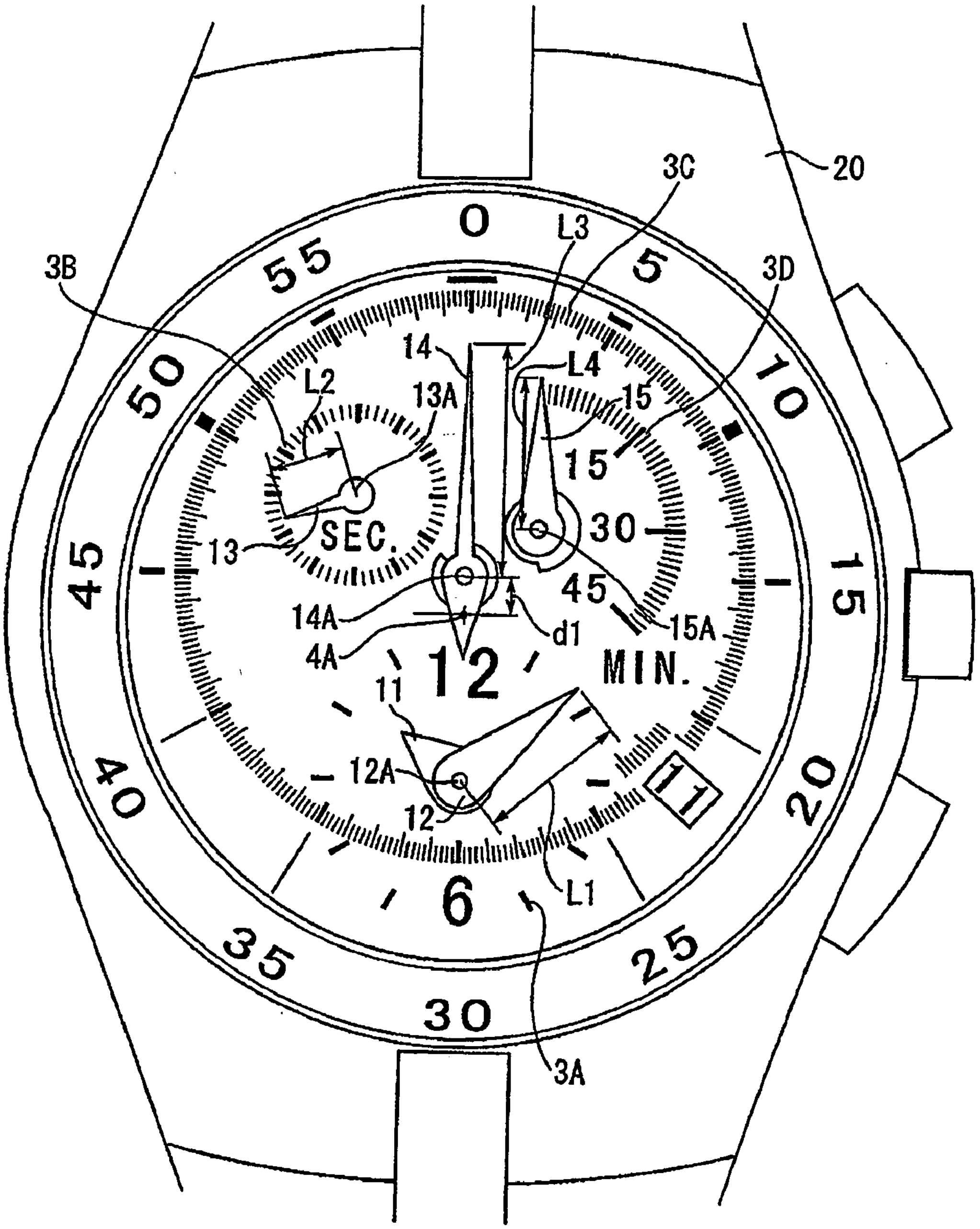
FIG. 6 is an enlarged external front view of the chronograph timepiece.

The rotating shafts 12A of the hour hand 11 and minute hand 12 are coaxial, and this rotating shaft 12A is provided to a position (the lower middle of FIG. 6) that is offset from the center 4A of the time display section 4 in the 6:00 direction, as shown in FIG. 6. The seconds hand 13 is mounted at a position wherein the rotating shaft 13A thereof is offset from the center 4A roughly in the 10:00 direction.

The seconds CG hand 14 for displaying the second chronograph time is mounted at a position wherein the rotating shaft 14A thereof is slightly misaligned (eccentric) from the center 4A in the 12:00 direction. The eccentricity d1 is about 1.5 mm in the present embodiment, but this eccentricity d1 is set according to the size, design, and the like of the timepiece 1, and is not limited to 1.5 mm alone.

Also, the minute CG hand 15 for displaying the minute chronograph time is mounted at a position wherein the rotating shaft 15A thereof is offset from the center 4A roughly in the 2:00 direction.

Hour/minute graduations 3A and second graduations 3B for displaying the standard time, graduations 3C for displaying the second chronograph time, and graduations 3D for displaying the minute chronograph time are formed on the dial 3. The graduations 3A through 3D are provided according to the trajectories described by the ends of the pointers 11 through 15. Therefore, the graduations 3C are provided eccentric in relation to the time display section 4 toward 12 hours.

The pointers 11 through 14 are rotated around the timepiece similar to a regular timepiece, but only the minute CG hand 15 moves in a fan pattern above the fan-shaped graduations. In other words, the minute CG hand 15 rotates around the timepiece from the return-to-zero state (reset state) shown in FIG. 6. Also, when the reset button 19 is pressed, the minute CG hand 15 is designed to rotate in the opposite direction and to return to the initial position (reset state). In the present embodiment, the minute chronograph is a 45-minute timer, and can be used to keep time for soccer, rugby, and other such games.

If the lengths from the rotating shafts 12A through 15A of the minute hand 12, the seconds hand 13, the seconds CG hand 14, and the minute CG hand 15 to the tips of the pointers 12 through 15 are respectively denoted by L1 through L4, then the length L3 of the seconds CG hand 14 is made greater than the lengths L1, L2, and L4 of the other pointers. Specifically, in the present embodiment, the length A from the rotating shaft 14A of the seconds CG hand 14 pointer to the tip of the seconds CG hand 14 is L3, the length B from the rotating shaft 12A of the minute hand 12 to the tip of the minute hand 12 is L1, the length C from the rotating shaft 13A of the seconds hand 13 to the tip of the seconds hand 13 is L2, and the length D from the rotating shaft 15A of the second pointer, the minute CG hand 15, to the tip of the minute CG hand 15 is L4.

The interval (distance) between the rotating shaft 12A of the minute hand 12 and the rotating shaft 14A of the seconds CG hand 14 is greater than the length L1 of the minute hand 12, and is designed so that the minute hand 12 does not run into the rotating shaft 14A. It is apparent that the hour hand 11 is longer than the minute hand 12 and is disposed coaxially with the minute hand 12 to prevent the hour hand 11 from running into the rotating shaft 14A.

In addition to the above-mentioned conditions, the length L1 of the minute hand 12 and the position of the rotating shaft 12A are designed so that the tip of the minute hand 12 does not come into contact with the glass-holding ring 5, which is the dial cover, when the minute hand 12 rotates around the rotating shaft 12A. Specifically, the rotating shaft 12A is disposed at a position substantially halfway between the inner surface 5A of the glass-holding ring 5 in the 6:00 direction and the rotating shaft 14A, and the length L1 of the minute hand 12 is set according to the disposed position thereof.

The interval (distance) between the rotating shaft 13A of the seconds hand 13 and the rotating shaft 14A is also greater than the length L2 of the seconds hand 13, and is designed so that the seconds hand 13 does not run into the rotating shaft 14A.

The seconds hand 13 is mounted in the time display section 4 roughly in the 10:00 direction, and since the space in which it can be mounted is smaller than in the 6:00 direction in which the hour and minute hands 11 and 12 are mounted, the length L2 of the seconds hand 13 is less than the length L1 of the minute hand 12. The length L2 of the seconds hand 13 and the position in which the rotating shaft 13A is located are set so as to prevent the seconds hand from running into the rotating shaft 14A and the glass-holding ring 5 on the outer periphery of the time display section 4, similar to the minute hand 12.

On the other hand, the interval between the rotating shaft 15A of the minute CG hand 15 and the rotating shaft 14A is smaller than the length L4 of the minute CG hand 15, and the rotating shafts 14A and 15A are disposed adjacent to each other.

Therefore, the minute CG hand 15 may collide with the rotating shaft 14A when the hand 15 makes a full circle. In the present embodiment, therefore, the configuration is such that the minute CG hand 15 does not make a full circle as do the other pointers 11 through 14 as previously described, and is capable of being turned and driven only within a specific angle range, that is, the drive trajectory thereof is fan shaped.

Here, the rotating shafts 12A, 13A, and 15A of the hour hand 11, minute hand 12, seconds hand 13, and minute CG hand 15 are disposed within the movement trajectory of the seconds CG hand 14. Therefore, the vertical position (level) of the seconds CG hand 14 is disposed higher (next to the glass 2) than the vertical position of the hands 11 through 13 and 15, and the vertical level is set so that the seconds CG hand 14 does not interfere with the hands 11 through 13 and 15.

The dial 3 on which the graduations 3A through 3D are formed is also disposed in alignment with the vertical positions of the hands 11 through 15 because the vertical positions of the hands 11 through 13 and 15 differ from that of the seconds CG hand 14.

Specifically, the dial 3 is configured from two vertically overlapping dials 31 and 32, as shown in FIGS. 2 through 4. The graduations 3C for the seconds CG hand 14 are formed on the upper dial 31 (next to the glass 2). In the dial 31, holes are machined at the points where the hands 11 through 13 and 15 are mounted so that the lower dial 32 is exposed. Therefore, the graduations 3A, 3B, and 3D are formed on the dial 32.

Also, a through-window 16 for exposing the date indicator and displaying the date is formed in the dials 31 and 32 in the section roughly halfway between the 4:00 and 5:00 direction of the dial 3 (roughly the 4:30 direction).

The chronograph timepiece 1 has a case 20, a glass-holding ring 5 fitted via packing in the top opening of the case 20, glass 2 held by the glass-holding ring 5, and a back cover 30 fitted via packing in the bottom opening of the case 20, as shown in FIGS. 2 through 4. A pair of straps 20*a* and 20*b* for mounting the timepiece 1 on the wrist of the user is fitted on the case 20.

In the present embodiment, the vertical positional relationship of the timepiece I in the cross-sectional direction is such that the glass 2 is on the top, and the back cover 30 is on the bottom, unless particularly specified.

A movement 100 for driving the hands 11 through 15 is mounted in the internal space surrounded by the case 20, the glass 2, and the back cover 30.

[Movement Structure]

Next, the configuration of the movement 100 of the chronograph timepiece 1 will be described. In broad terms, the movement 100 of the present embodiment has a two-layer structure. A basic timepiece gear train for displaying the standard time, a CG (chronograph) gear train for displaying the chronograph [time], and a time correction mechanism for correcting the standard time are mounted in the first layer (first layer section).

Also, a coil block for power generation, a stator, a power generating gear train, a secondary battery for charging electric energy, and a chronograph resetting mechanism are mounted in the second layer (second layer section).

A printed circuit board 501 for electrically controlling the standard time display and chronograph display and for controlling the power generator is mounted between the first layer and the second layer.

In the present embodiment, the first layer is the upper side of the timepiece 1, that is, the side near the glass 2 and dial 3, and the second layer is the lower side of the timepiece 1, that is, the side near the back cover 30.

[2-1. Configuration of First Layer of Movement]

Figure 7:
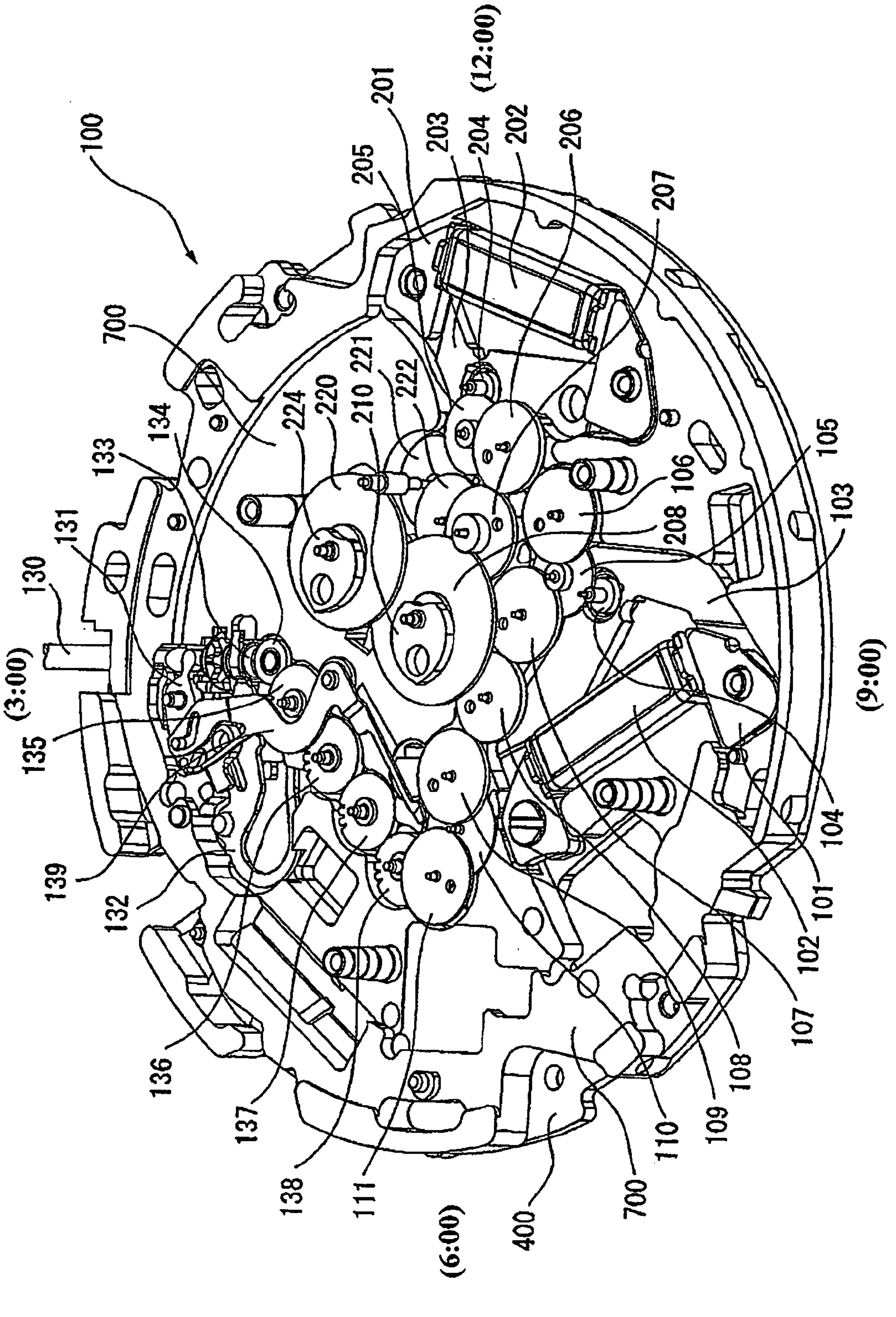
FIG. 7 is a perspective view showing a state during the step of assembling the movement.
Figure 8:
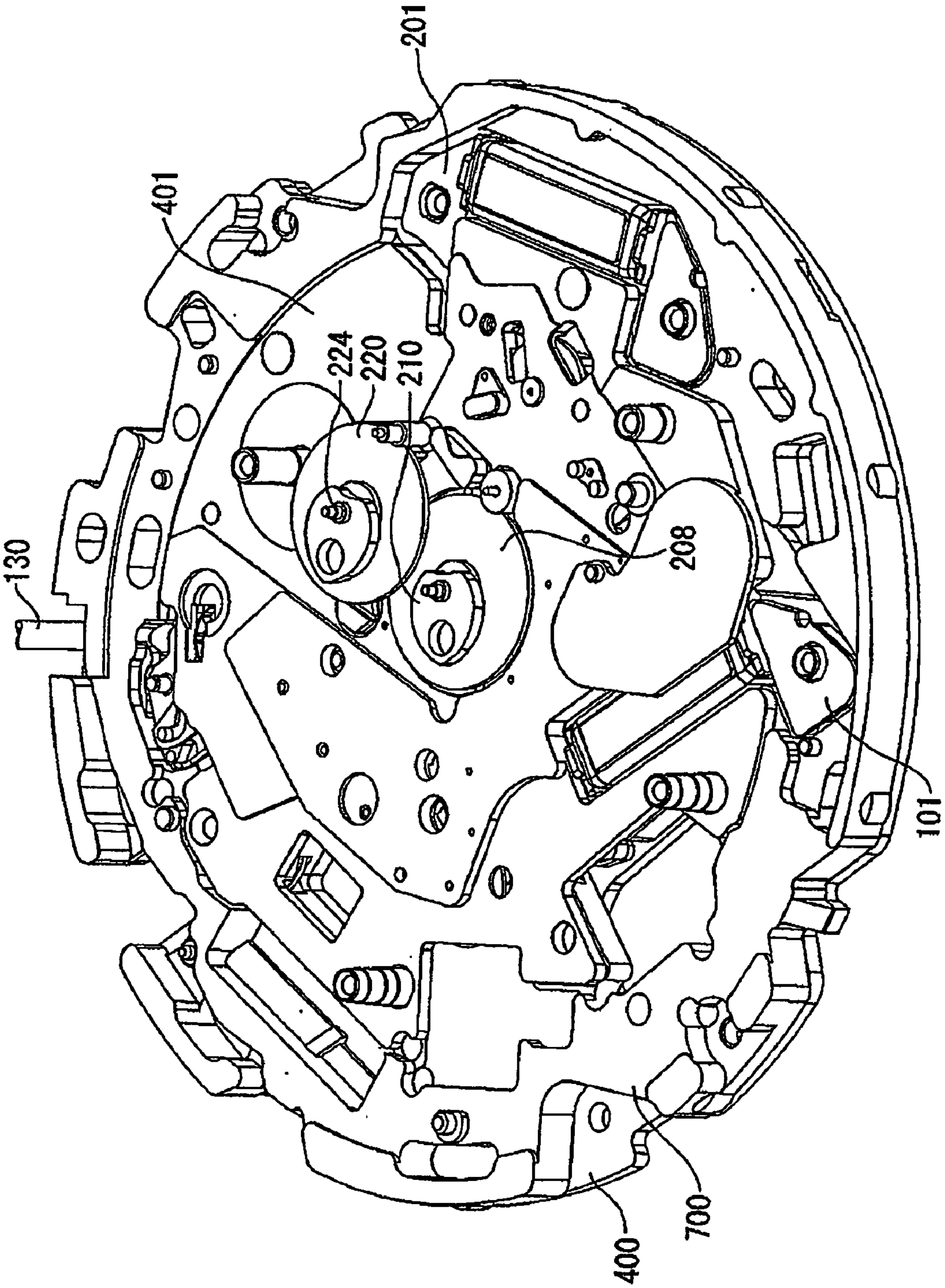
FIG. 8 is a perspective view showing a state during the step of assembling the movement.

A basic timepiece gear train or chronograph gear train, and a time correction mechanism are mounted in the first layer of the movement 100, as shown also in FIG. 7. The perspective view in FIG. 7 shows the back cover 30 as the top and the glass 2 as the bottom. This is because normally the components are assembled on a bottom plate 400 when the movement 100 is being assembled. This vertical positional relationship is also the same in the perspective views in FIGS. 8 through 14, which show the process of assembling the movement 100.

A synthetic resin circuit holder 700 is mounted on the top surface (next to the back cover) of the bottom plate 400, and toothed gears or the like for each gear train are mounted on this circuit holder 700 as shown in FIG. 7.

[2-1-1. Basic Timepiece Gear Train]

A rough structure of the basic timepiece gear train for showing the standard time will now be described. The basic timepiece is configured with a basic timepiece electric motor 101 and a basic timepiece gear train.

The basic timepiece electric motor 101, which is a drive source for the basic timepiece, is configured from a basic timepiece coil 102, a basic timepiece stator 103, and a basic timepiece rotor 104. The basic timepiece rotor 104 is rotated at a timing of one step per second by a drive signal from the electric circuit, and the drive is reduced and transmitted to a small second wheel and pinion 106 via a fifth wheel and pinion 105. Therefore, the seconds of the standard time are displayed by means of a basic timepiece seconds hand (small seconds hand) 13 supported on the small center wheel and pinion 106.

Specifically, the basic timepiece electric motor 101 is mounted near the small center wheel and pinion 106 for supporting the small seconds hand 13. Display irregularities during movement of the small seconds hand 13 can thereby be reduced.

Also, the rotation of the rotor 104 is reduced and transmitted to a center wheel and pinion 111 via the fifth wheel and pinion 105, a fourth third middle gear 107, a fourth second middle gear 108, a fourth first middle gear 109, and a third wheel and pinion 110. Therefore, the minutes of the standard time are displayed by the minute hand 12 of the basic timepiece supported on the center wheel and pinion 111, as shown in FIG. 4. The drive is transmitted from the center wheel and pinion 111 to an hour-wheel 113 via the date rear wheel to display the hour of the standard time.

Here, the distance becomes extremely large between the seconds hand 13 disposed away from the center 4A of the time display section 4 roughly in the 10:00 direction, and the hour hand 11 and minute hand 12 disposed in the 6:00 direction. Therefore, in the present embodiment, three middle gears 107 through 109 that do not increase or reduce speed are disposed to transmit the rotation of the basic timepiece electric motor 101 to the center wheel and pinion 111, which is located at a distance from the rotor 104. The middle gears 107 through 109 are toothed gears that do not increase or reduce speed, and are therefore configured from similar toothed gears. Thus, the cost does not greatly increase even if the number of toothed gears increases.

The basic timepiece gear train is thus configured from the toothed gears 105 through 111.

[2-1-2. Time Correction Mechanism]

As shown in FIG. 7, the time correction mechanism for correcting the time of the hour hand 11 and minute hand 12 has a setting stem 130 on which a winding-button 17 is fixed, and a switching section configured from a trigger-piece 131, a bolt 132, a control lever 139, a drum wheel 133, and the like for setting the setting stem 130 to the following set positions: a normal state position, a time correction position, and a calendar correction position. The setting stem 130 is disposed in the 3:00 direction of the timepiece 1, and the switching section is disposed from the 3:00 direction to the 5:00 direction.

Since the setting stem 130 disposed in the 3:00 direction and the hour hand 11 and minute hand 12 disposed in the 6:00 direction are separated, the time correction mechanism of the present embodiment has three middle gears 135 through 137.

Specifically, the trigger-piece 131 is coupled with the bolt 132, and the drum wheel 133 interlocks with a setting-wheel 134 by pulling out the setting stem 130 fixed to the winding-button 17. The setting-wheel 134 transmits the rotation of the setting stem 130 to a minute wheel 138 sequentially via the third intermediate minute wheel 135, the date rear second middle gear 136, and the date rear first middle gear 137, whereby the standard time is corrected. The control lever 139 locks onto the trigger-piece 131, and the fourth first middle gear 109 is controlled in conjunction with the pulling out of the setting stem 130.

The middle gears 134 through 137, which are provided herein because of the separation of the winding-button 17 and the hour and minute hands 11 and 12, are toothed gears that do not increase or reduce speed, and therefore are configured from toothed gears similar to the minute wheel 138. Thus, the cost does not greatly increase even if the number of toothed gears increases.

[2-1-3. Chronograph Gear Train]

The chronograph timepiece is configured with a chronograph electric motor 201 and a chronograph gear train.

The chronograph electric motor 201, which is a drive source for the chronograph gear train, is configured from a coil 202, a stator 203, and a rotor 204, and is disposed roughly in the 12:00 direction of the timepiece 1. In the chronograph electric motor 201, the rotor 204 is rotatably driven by a drive signal from the electric circuit.

The rotation of the rotor 204 is transmitted to a seconds CG gear 208 via a second CG third middle gear 205, a seconds CG second middle gear 206, and a second CG first middle gear 207, and the chronograph seconds are displayed by the seconds CG hand 14 supported by the seconds CG gear 208.

The rotation transmitted to the second CG first middle gear 207 is transmitted from the second CG first middle gear 207 to a minute CG gear 220 via a minute CG second middle gear 222 and a minute CG first middle gear 221, and the chronograph minutes are displayed by the minute CG hand 15 supported by the minute CG gear 220. Specifically, the second CG first middle gear 207 has two pinions at the top and bottom, and the seconds CG gear 208 interlocks with one pinion, while the second middle gear 222 interlocks with the other pinion.

The seconds CG gear 208 and minute CG gear 220 both have heart-cams 210 and 224 for resetting to zero. Among the rods and toothed gears constituting the seconds CG gear 208 and minute CG gear 220, the same rods are used for the gears 208 and 220, while only the toothed gears differ. The seconds CG gear 208 and the minute CG gear 220 are disposed in a cross-sectional misalignment because the pointer lengths differ as shown in FIG. 7.

A gear train support 401 is mounted on the top of the basic timepiece gear train and the chronograph gear train mounted in the first layer of the movement 100 described above (next to the back cover), as shown in FIG. 8, and upper pivots (pivots next to the back cover) of the basic timepiece gear train and the chronograph gear train are supported in a rotatable manner by the gear train support 401. Specifically, the basic timepiece gear train and the chronograph gear train are supported between the circuit holder 700 and the gear train support 401 installed on the top surface of the bottom plate 400. In other words, the gears (toothed gears) other than those to which the hands 11 through 15 are attached (for example, the seconds CG gear 208, the minute CG gear 220, and the like) are journaled in the gear train support 401 at the top pivot and in the circuit holder 700 at the bottom pivot.

[2-2. Configuration of Middle Layer of Movement]

Figure 9:
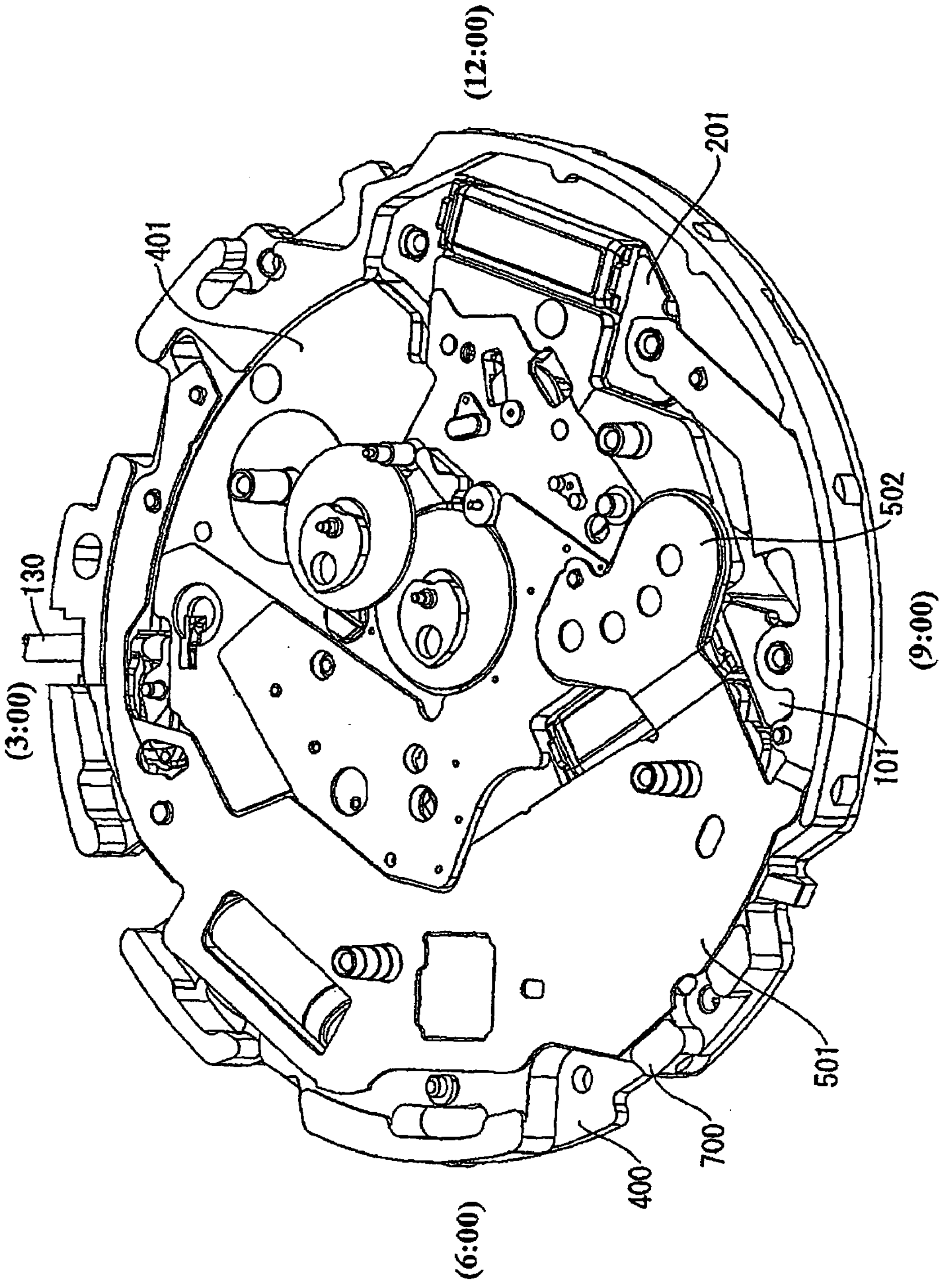
FIG. 9 is a perspective view showing a state during the step of assembling the movement.

A printed circuit board 501 into which an IC, rectifying circuit, or the like is incorporated is mounted on the gear train support 401 (next to the back cover), as shown in FIG. 9. The printed circuit board 501 is formed into a flat rough C-shape along the inner periphery of the case of the timepiece 1, extending from the section in which the start and stop button 18 is disposed roughly in the 2:00 direction of the timepiece 1, to the reset button 19, the 6:00 position, and the 10:00 position at which the electric motors are disposed.

The driving of the electric motors 101 and 201 can be controlled, and the operating state of the buttons 18 and 19 detected, by the IC or another such electric circuit provided to the printed circuit board 501.

Furthermore, the printed circuit board 501 is provided with a conduction terminal section 502 having four conduction terminals for providing conduction with the circuits in the second layer.

[2-3. Configuration of Second Layer of Movement]

A coil block for power generation, a stator, a power generating gear train, a secondary battery for charging electric energy, and a chronograph resetting mechanism are mounted in the second layer of the movement 100.

Figure 10:
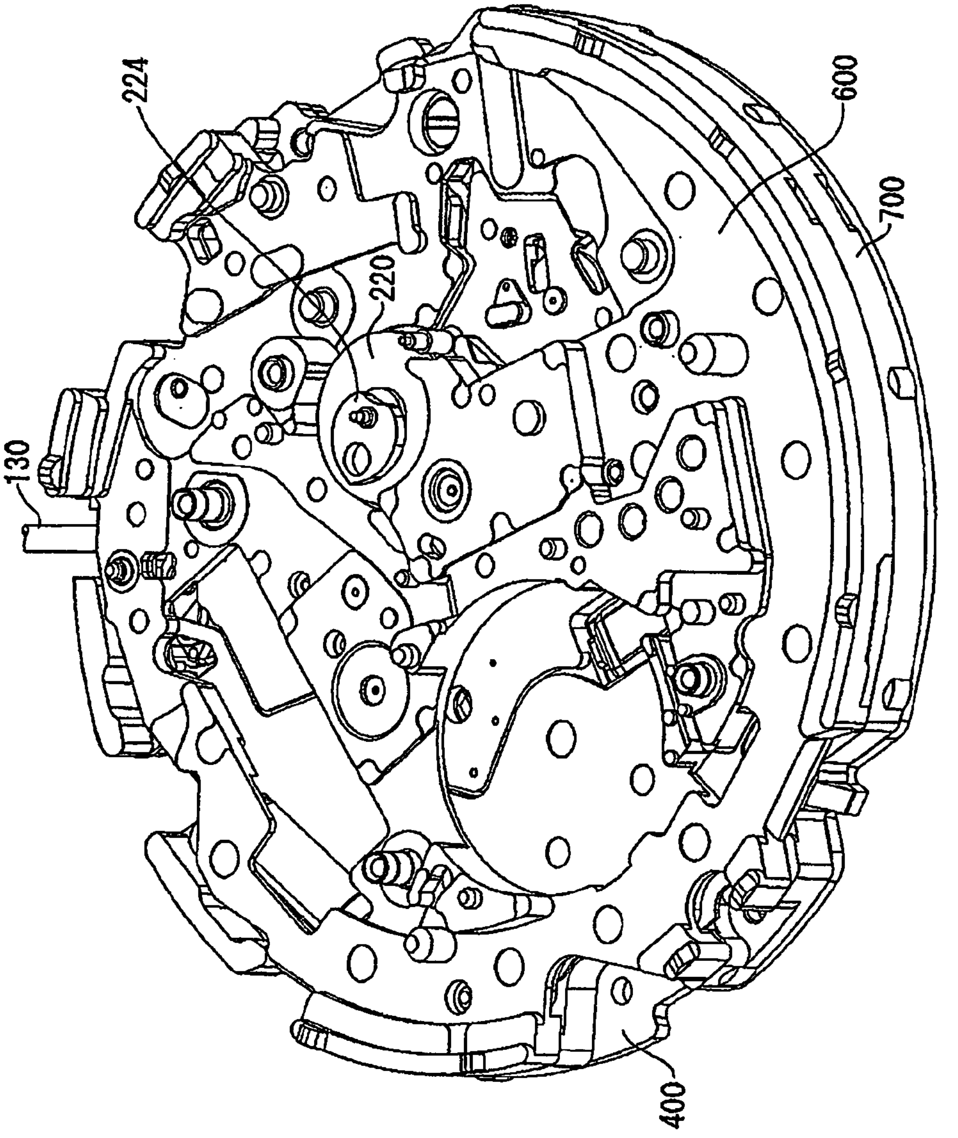
FIG. 10 is a perspective view showing a state during the step of assembling the movement.

The second layer of the movement has a circuit cover 600 disposed in overlapping fashion on the printed circuit board 501 (next to the back cover), as shown in FIG. 10. The circuit cover 600 constitutes a base for the power generator, the secondary battery, and the resetting mechanism.

Figure 11:
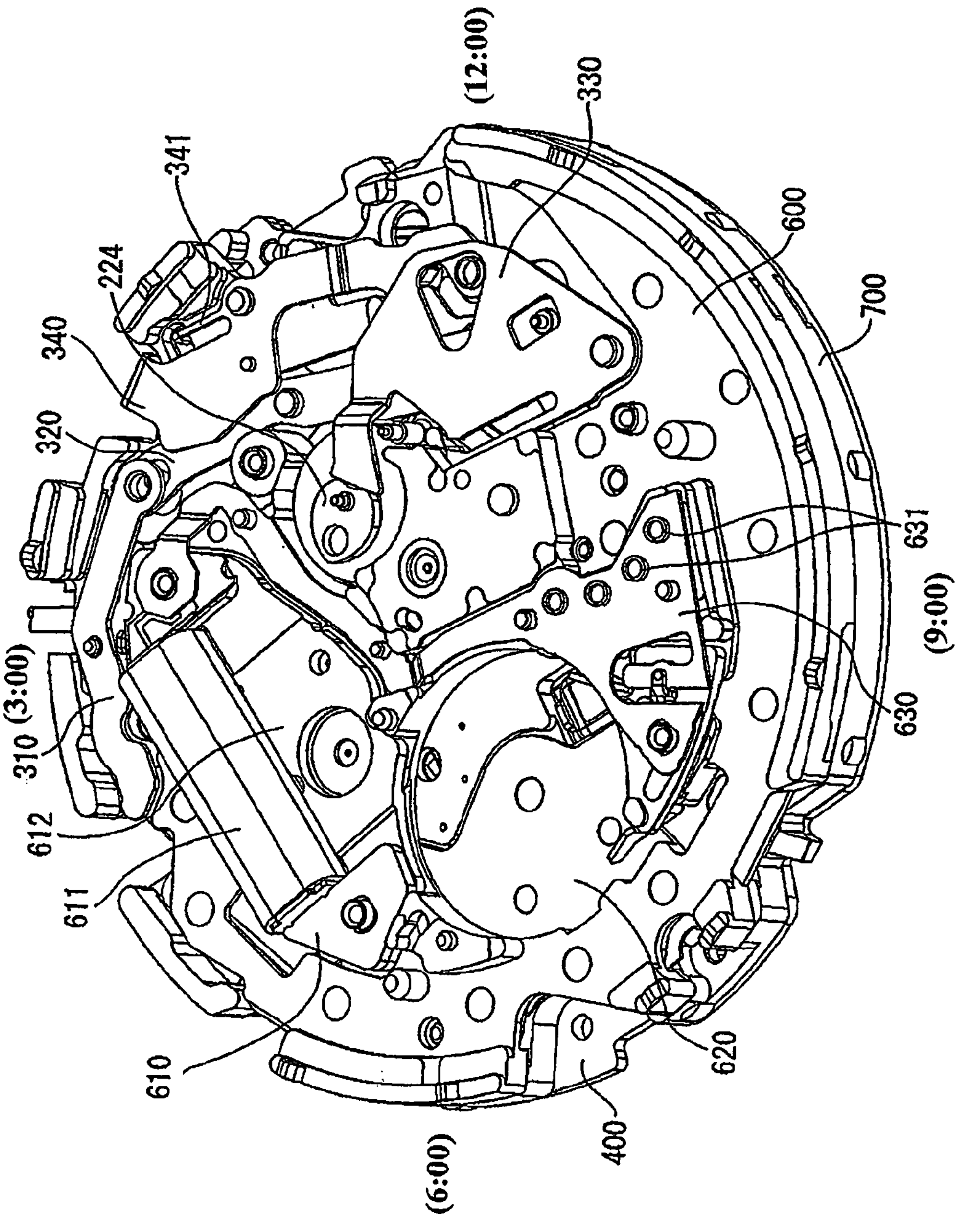
FIG. 11 is a perspective view showing a state during the step of assembling the movement.
Figure 12:
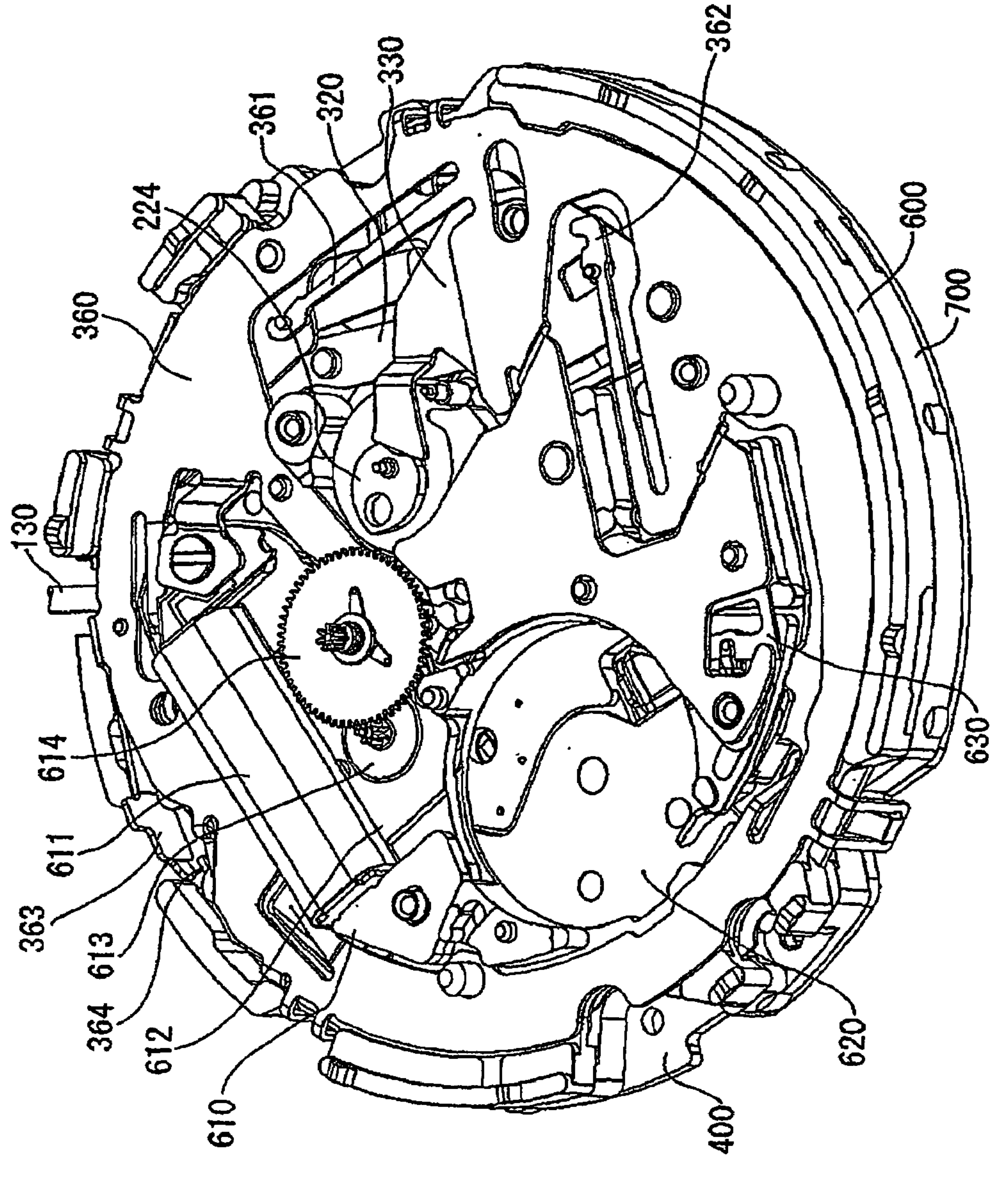
FIG. 12 is a perspective view showing a state during the step of assembling the movement.

Specifically, a power generator 610 with a power generating coil block 611, a power generating stator 612, and a power generating rotor 613 is disposed roughly in the 4:00 direction of the circuit cover 600, as shown in FIGS. 11 and 12. Since the electric motors 101 and 201 are disposed with their planar positions roughly in the 8–9:00 direction and the 11–12:00 direction in relation to the center 4A, the power generator 610 and the electric motors 101 and 201 are disposed such that their planar positions differ, or in other words, such that they do not overlap in one plane.

A virtually cylindrical bed 620 for mounting a secondary power source 640 is formed roughly in the 8:00 direction, and a conduction board 630 is disposed along the outer periphery thereof. Disposing four conduction coils 631 in four through-holes formed in the circuit cover 600 allows the ends thereof to be in contact with the terminals of the printed circuit board 501 and the conduction board 630. Thus, the printed circuit board 501 electrically connected to the electric motors 101 and 201 and the like of the first layer of the movement 100, and the conduction board 630 electrically connected to the power generator 610 and the secondary power source 640 of the second layer, are configured to be capable of electric connection via the conduction coils 631. Since four conduction coils 631 are provided in the present embodiment, four electric wires are disposed. Two of these are for conducting the output (generated electricity) of the power generator 610 to the rectifying circuit of the printed circuit board 501, and the other two are for charging the secondary power source 640 with the electric current rectified by the rectifying circuit.

The circuit cover 600 supports the upper pivots on the rotary shafts of the seconds CG gear 208 and second CG first middle gear 207 in a rotatable manner.

Furthermore, a return-to-zero hammer 330 in contact with the heart-cams 210 and 224, an operating lever 340 that rotates when the start and stop button 18 is pressed to separate the return-to-zero hammer 330 from the heart-cams 210 and 224, a transmission hammer 310 and return-to-zero transmission hammer 320 that rotate when the reset button 19 is pressed to bring the return-to-zero hammer 330 into contact with the heart-cams 210 and 224, and other such hammers constituting the resetting mechanism are mounted extending roughly from the 4:00 position to the 10:00 position of the timepiece 1 so as to overlap in the vertical direction of the CG gear train or CG electric motor 201.

These hammer components the resetting mechanism are also mounted so as to not overlap in the same plane as the power generator 610 or secondary power source 640.

A switch input terminal 341 is formed integrally with the operating lever 340, and the switch input terminal 341 comes into contact with the terminals of the printed circuit board 501 when the start and stop button 18 is pressed, which makes it possible to detect the pressing of the button 18, that is, the switch input.

A return-to-zero clamp 360 is mounted on the hammers 310, 320, 330, and 340 of the return-to-zero mechanism (next to the back cover), as shown in FIG. 12, and the hammers 310, 320, 330, and 340 are supported between the return-to-zero clamp 360 and the circuit cover 600. A click spring 361 interlocking with a pin protruding from the operating lever 340 and a click spring 362 interlocking with a pin protruding from the return-to-zero transmission hammer 320 are formed integrally in the return-to-zero clamp 360.

Also, a spring section 363 with which the reset button 19 is kept in contact is formed on the return-to-zero clamp 360, as shown in FIG. 12. Therefore, the transmission hammer 310 is pressed via the spring section 363 and is rotated when the reset button 19 is pressed. The spring section 363 elastically holds an input terminal section 364 formed on the side facing the return-to-zero clamp, and when the reset button 19 is pressed, the spring section 363 releases the input terminal section 364 formed on the return-to-zero clamp 360, and the input terminal section 364 comes into contact with a reset terminal provided to the printed circuit board 501. Thus, it is possible to detect when the reset button 19 is pressed.

A rotor transmission gear 614 for interlocking with the power generating rotor 613 is also mounted on the upper side of the return-to-zero clamp 360.

Figure 13:
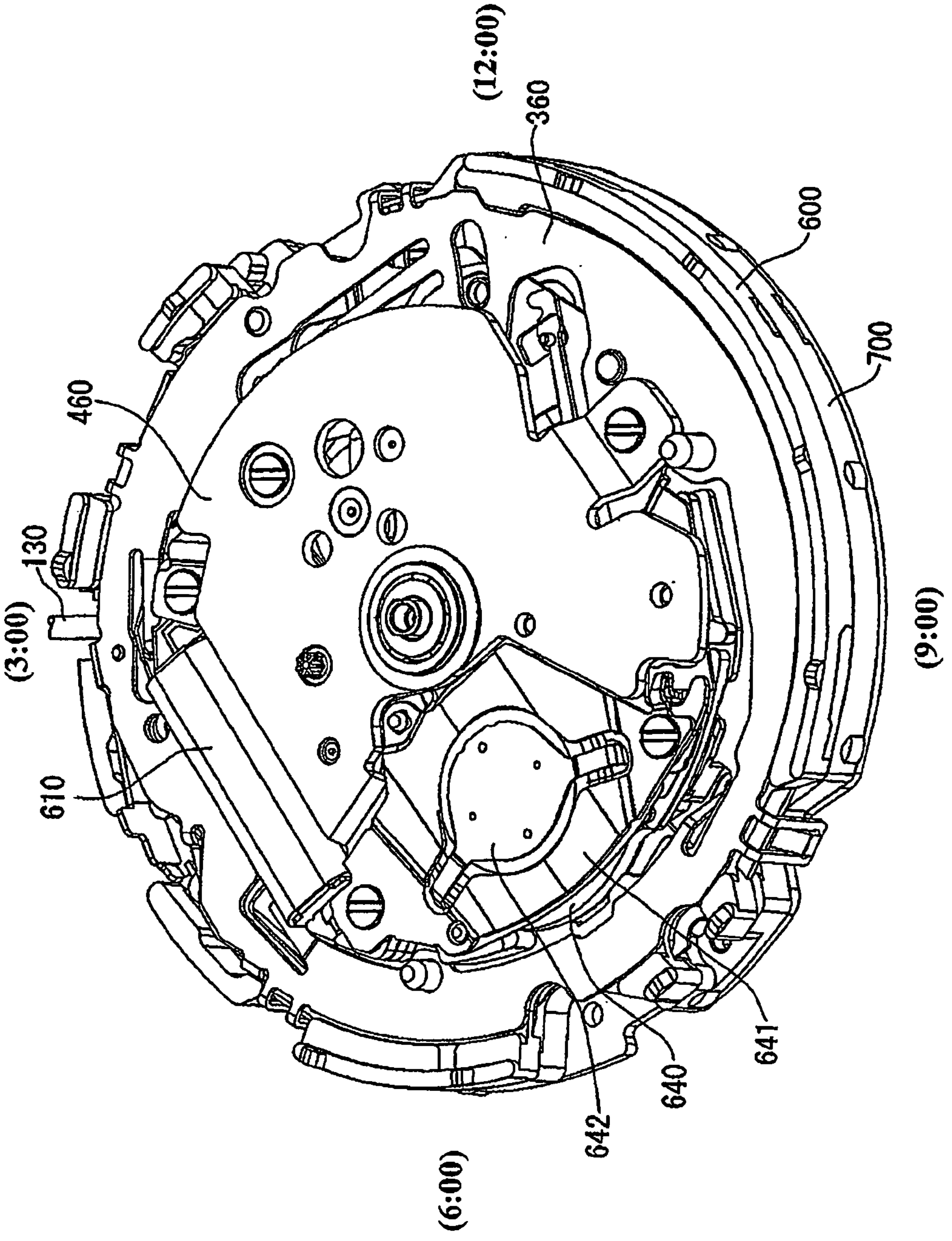
FIG. 13 is a perspective view showing a state during the step of assembling the movement.

Furthermore, an oscillating weight bridge 460 is mounted on the return-to-zero clamp 360, as shown in FIG. 13. The upper pivots on the rotary shafts of the power generating rotor 613, the rotor transmission gear 614, the minute CG gear 220, and the minute CG first middle gear 221 are supported by the oscillating weight bridge 460 in a rotatable manner.

Also, the secondary power source 640 is mounted in the bed 620. The secondary power source 640 is configured such that a secondary power source unit is integrated by welding with a secondary battery and a negative terminal. The secondary power source 640 is fixed to the movement 100 by a secondary battery clamp 641, which is a metal member, with two screws via an insulation board, and is designed to be assembled last of the movement components. A negative lead plate 642 for the secondary battery is also attached to the secondary power source 640. The secondary power source 640 herein is mounted at a position substantially in the same plane as the IC or auxiliary capacitor of the printed circuit board 501.

Figure 14:
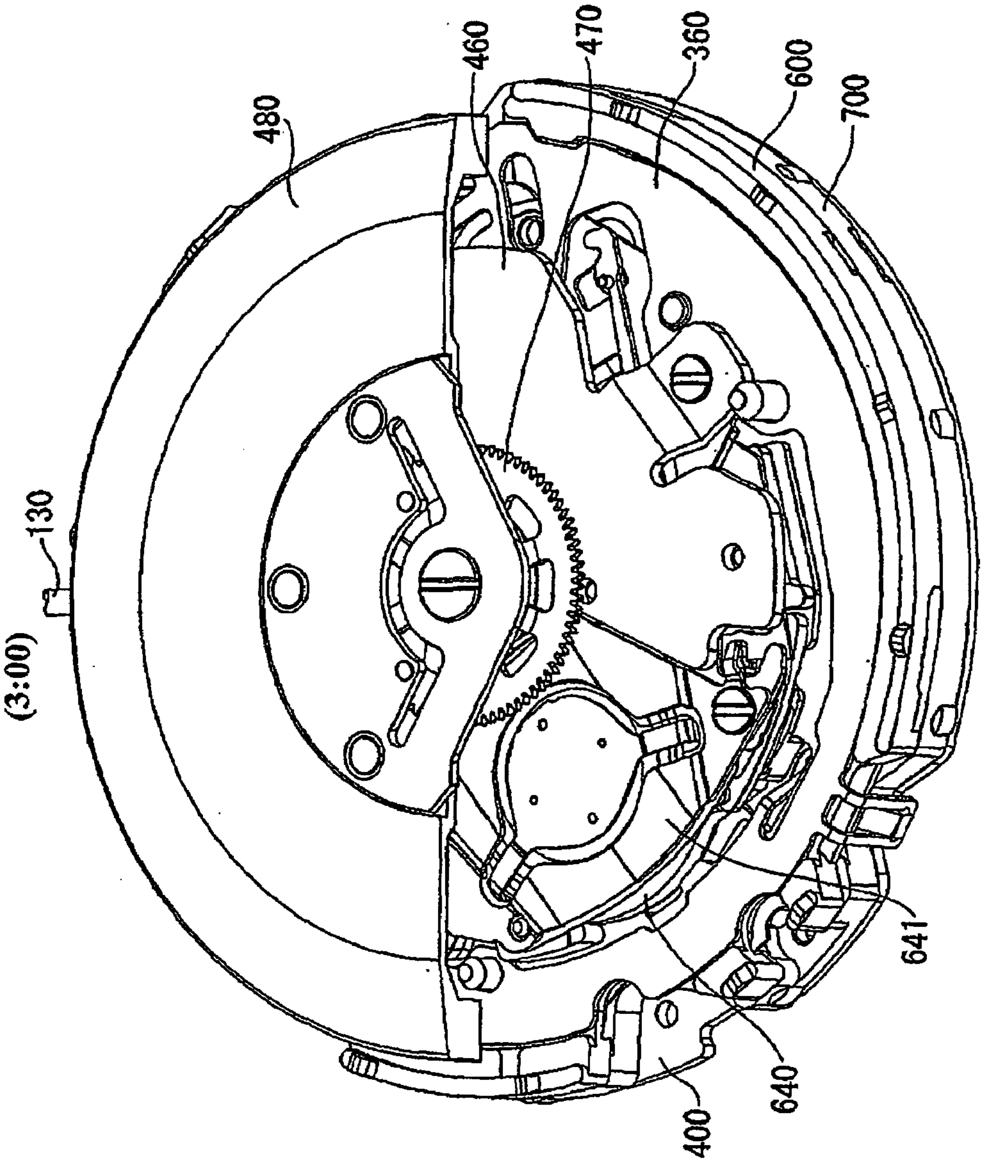
FIG. 14 is a perspective view showing a state during the step of assembling the movement.

An oscillating weight wheel 470 and an oscillating weight 480 are mounted on the oscillating weight bridge 460, as shown in FIG. 14. The oscillating weight wheel 470 interlocks with the pinion of the rotor transmission gear 614 protruding from the oscillating weight bridge 460. Therefore, the power generating rotor 613 rotates via the rotor transmission gear 614 and the power generator 610 generates electricity when the oscillating weight wheel 470 rotates along with the rotation of the oscillating weight 480. Consequently, a power generating device is configured by the oscillating weight 480, the oscillating weight wheel 470, and the power generator 610.

[2-4. Configuration of Date Indicator Section]

Figure 15:
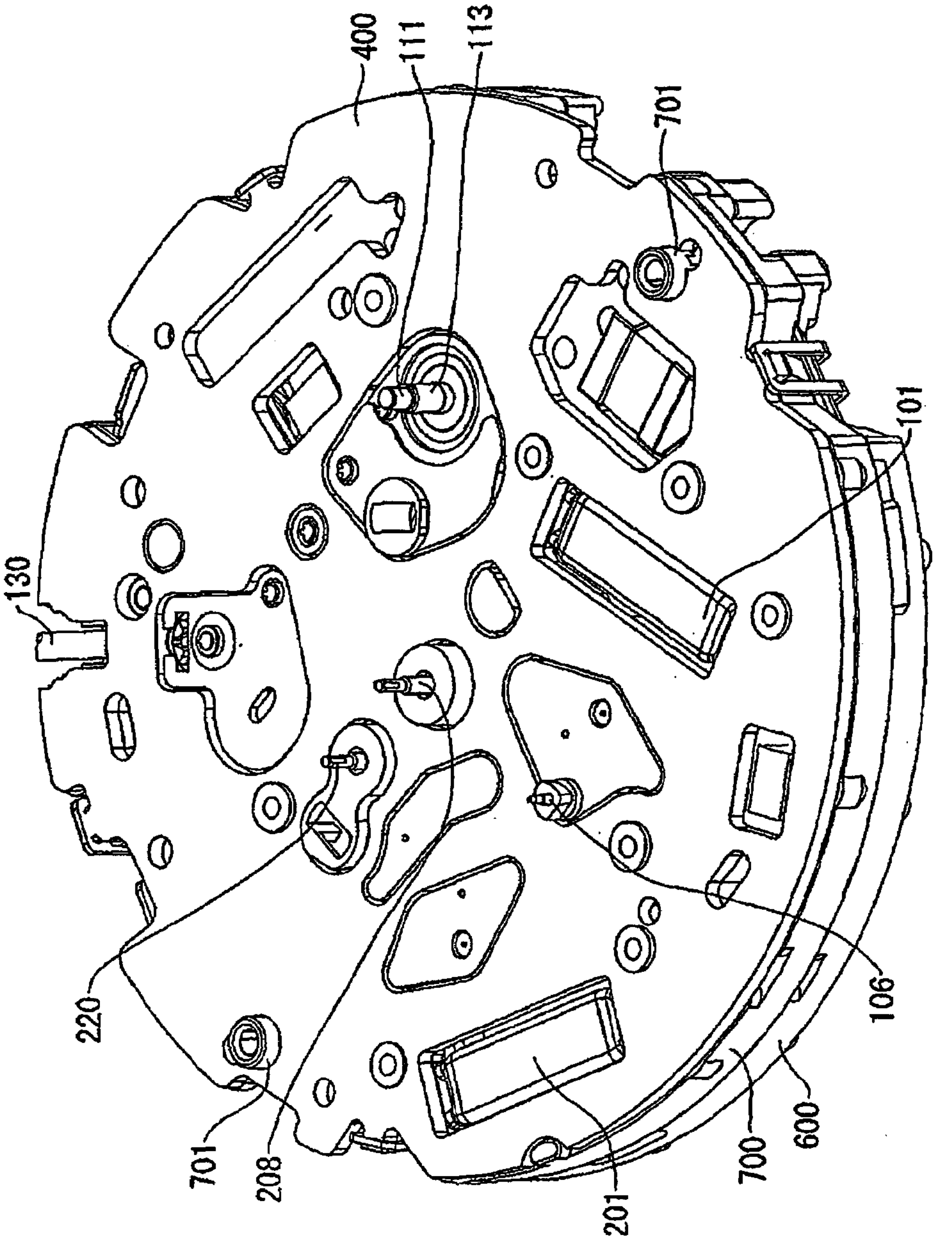
FIG. 15 is a perspective view showing the bottom plate surface of the movement.

A guide pipe 701 formed integrally with the circuit holder 700 protrudes from the hole in the bottom plate 400 next to the dial 3 of the bottom plate 400, as shown in FIG. 15. The dial 3 is guided through and positioned in the guide pipe 701.

Figure 16:
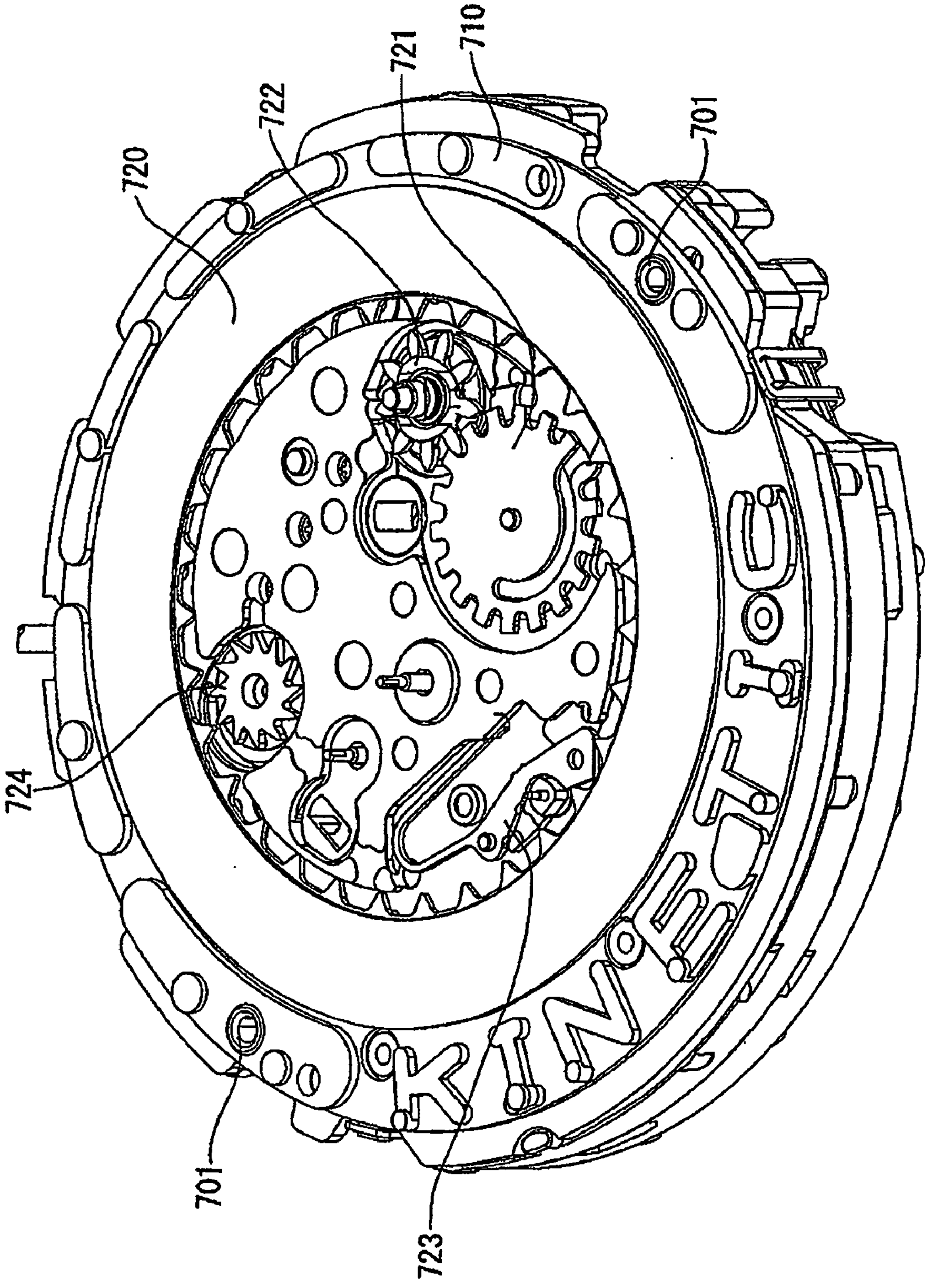
FIG. 16 is a perspective view showing the date indicator on the bottom plate surface of the movement.

Also, the guide pipe 701 is led through a hole in a date indicator guide holder 710 formed in a ring shape, as shown in FIG. 16, and is also used to position the date indicator guide holder 710. A ring-shape date indicator 720 is mounted on the inner side of the date indicator guide holder 710, and the date indicator 720 is guided by means of the date indicator guide holder 710.

A date indicator driving wheel 721 and date indicator driving intermediate wheel 722 for driving the date indicator

720, a date jumper 723 for positioning of the date indicator 720, a calendar corrector wheel 724 for correcting the date indicator 720, and the like are mounted around the inside of the date indicator 720.

Figure 17:
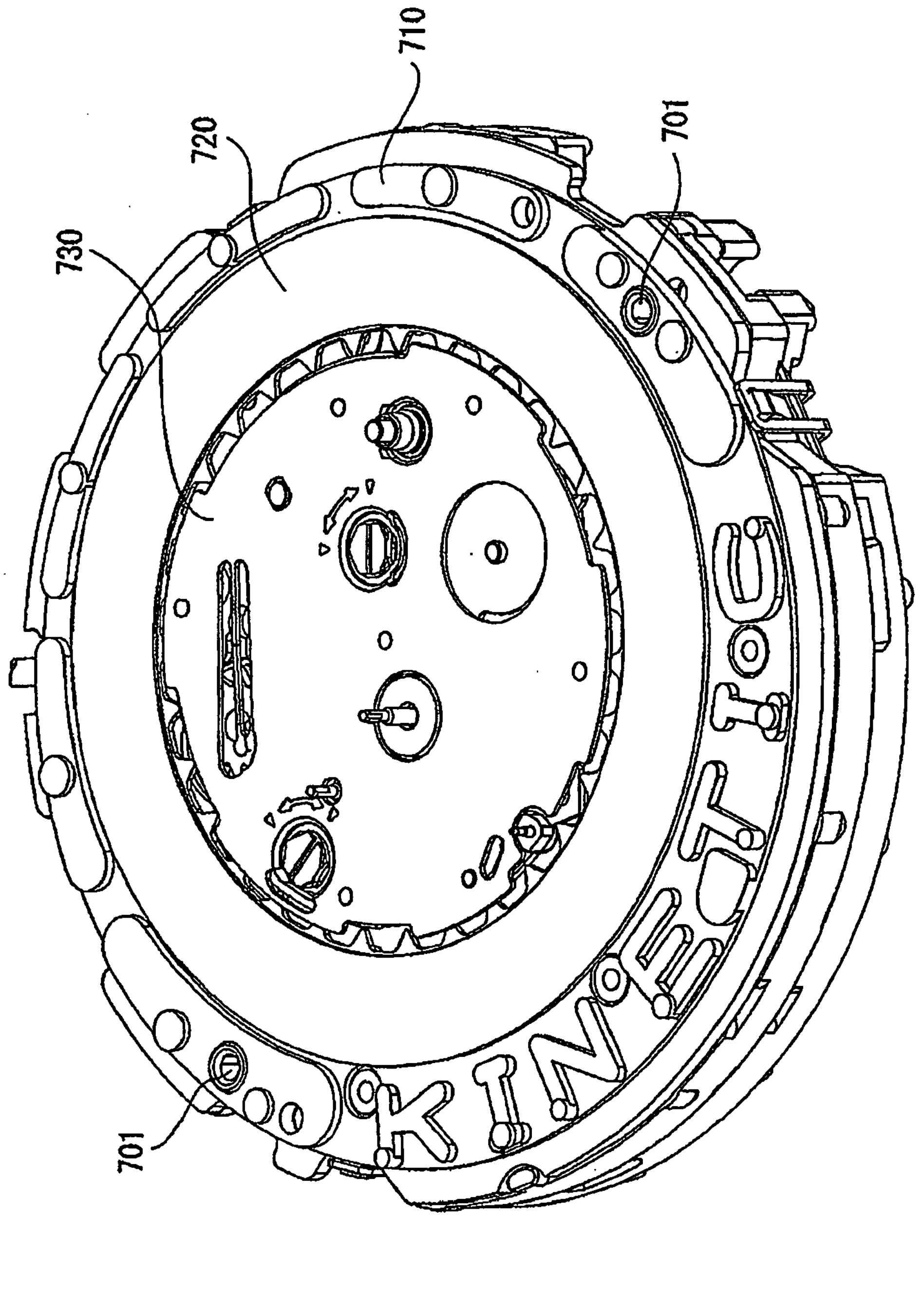
FIG. 17 is a perspective view showing the date indicator maintaining plate on the bottom plate surface of the movement.

A date indicator maintaining plate 730 is mounted on the date indicator driving wheel 721 or the like, as shown in FIG. 17, and holds the date indicator maintaining plate 720 and date indicator driving wheel 721.

In the timepiece 1 configured as described above, a first-layer base member is configured by the bottom plate 400 and the circuit holder 700, a first-layer cover member is configured by the gear train support 401, a second-layer base member is configured by the circuit cover 600, and a second-layer cover member is configured by the oscillating weight bridge 460. The bottom plate 400 and oscillating weight bridge 460 herein are metallic, and the circuit holder 700, the gear train support 401, and the circuit cover 600 are plastic.

[3-1. Operation of Basic Timepiece]

In the present embodiment, the oscillating weight 480 rotates when the timepiece 1 is mounted or otherwise placed on the arm and moved. The power generating rotor 613 rotates via the oscillating weight wheel 470 and rotor transmission gear 614 along with the rotation of the oscillating weight 480, and electric power is generated.

The electric power generated by the power generator 610 is rectified by the rectifying circuit electrically connected via the conduction board 630 and conduction coils 631, and is then supplied and charged to the secondary power source 640.

The electric power charged to the secondary power source 640 is supplied to the printed circuit board 501 via the conduction board 630 and conduction coils 631. The liquid crystal oscillator, IC, or other such control device mounted on the printed circuit board 501 is thereby driven, and the basic timepiece electric motor 101 is driven by a drive pulse outputted from this control device.

When the basic timepiece electric motor 101 is driven and the rotor 104 rotates, the rotation thereof is transmitted to the small second wheel and pinion 106 via the fifth wheel and pinion 105, and the seconds hand 13 operates as previously described.

The rotation of the rotor 104 is simultaneously transmitted via the fifth wheel and pinion 105, the middle gears 107 through 109, the third wheel and pinion 110, the center wheel and pinion 111, the minute wheel 138, and other such basic timepiece gear trains, whereby the hour hand 11 and the minute hand 12 operate.

[3-2. Operation of Chronograph Timepiece]

On the other hand, when the chronograph timepiece function is utilized, the start and stop button 18 is first pressed. The return-to-zero hammer 330 is then moved via the operating lever 340, the return-to-zero hammer 330 is separated from the heart-cams 210 and 224, and the setting of the seconds CG gear 208 and minute CG gear 220 is released.

The switch input terminal 341 is simultaneously brought into contact with the printed circuit board 501 to turn on the switch input by pressing the start and stop button 18, and a drive signal is sent from the control circuit to the electric motor 201 to drive the electric motor 201.

The rotation of the rotor 204 of the CG electric motor 201 is transmitted to the seconds CG gear 208 and minute CG gear 220 via the CG gear train, and the seconds CG hand 14 and minute CG hand 15 are both actuated.

When the start and stop button 18 is released, the operating lever 340 returns to its original position due to the resilience of the click spring 361, and the switch input terminal 341 is separated from the printed circuit board 501. Specifically, the CG electric motor 201 continues to be driven and the chronograph timekeeping continues.

While the CG electric motor 201 is being driven, the operating lever 340 rotates again and the switch input is turned on when the start and stop button 18 is pressed. Thus, the CG electric motor 201 stops, and the seconds CG hand 14 and minute CG hand 15 also stop.

If the start and stop button 18 is then pressed once again, the CG electric motor 201 begins to be driven again and the seconds CG hand 14 and minute CG hand 15 also begin to operate again. Thereafter, when the start and stop button 18 is pressed, the CG electric motor 201 stops, driving alternately repeats, and accumulated measurement of the chronograph time is performed.

On the other hand, when the reset button 19 is pressed, the return-to-zero hammer 330 moves via the transmission hammer 310 and the return-to-zero transmission hammer 320, the return-to-zero hammer 330 applies pressure to the heart-cams 210 and 224 of the seconds CG gear 208 and minute CG gear 220, and the hands 14 and 15 are returned to zero.

The present embodiment is designed such that a chronograph setting hammer that is set by pressure from the seconds CG second middle gear 206 is provided, and the rotor 204 of the CG electric motor 201 does not rotate along with the resetting operation of the seconds CG gear 208 and minute CG gear 220 when the reset button 19 is pressed. Furthermore, when the reset button 19 is pressed, the input terminal section 364 comes into contact with the reset terminal due to the releasing of the input terminal section 364 by the spring section 363, and the electric circuit for controlling the CG electric motor 201 is reset when the reset switch is inputted.

[3-3. Time Correction Operation of Basic Timepiece]

The setting stem 130 is pulled out by pulling out the winding-button 17 to the time correction position to correct the time indicated by the basic timepiece. Thus, when the setting stem 130 is rotated, the rotation is transmitted to the center wheel and pinion 111 via the setting-wheel 134, the middle gears 135 through 137, and the minute wheel 138 because the trigger-piece 131 and bolt 132 are interlocked and the drum wheel 133 and setting-wheel 134 are engaged, whereby the standard time is corrected. The rotation of the setting stem 130 herein is not transmitted to the basic timepiece electric motor 101 because the control lever 139 operates in an interlocked fashion with the pulling out of the setting stem 130 to set the fourth first middle gear 109.

The present embodiment has the following effects.

The indication of the hands can be easily read by the user because the seconds CG hand 14 is provided independently, the rotating shaft 14A thereof does not coincide with the rotating shafts of the other hands, and the standard time is displayed independently by the seconds hand 13 and the hour and minute hands 11 and 12. The minute CG hand 15 is also provided independently and indications thereof can therefore be read more easily. Consequently, the multifunction timepiece 1 having a chronograph timepiece function and including many pointers can be made into a timepiece with good visibility whereby the indications of the pointers can be accurately confirmed.

Also, the gear trains for driving the hands 11 through 15 can be mounted separately from each other and the cross-sectional overlapping of the hands and the overlapping of the gear trains can be minimized because, except for the hour and minute hands 11 and 12, the hands 11 through 15 are mounted independently. Therefore, the multifunction timepiece 1 can be made thinner in shape even when many pointers are provided to the timepiece 1.

(2) Since the rotating shaft 14A of the seconds CG hand 14 is disposed somewhat eccentric from the center 4A of the time display section 4, the lengths of the hour hand 11 and minute hand 12, which must be disposed so as not to interfere with the rotating shaft 14A, can be increased only by the length of eccentricity. Therefore, the lengths of the hands 11 and 12 can be set relatively long and the visibility of the standard time can be improved even when the hour and minute hands 11 and 12 for displaying the standard time are disposed in the 6:00 position of the time display section 4 separately from the seconds CG hand 14.

Furthermore, since the seconds CG hand 14 is set with the rotating shaft 14A disposed somewhat eccentric from the center 4A of the time display section 4 and with a length greater than those of the hands 11 through 13 and 15, a dynamic operation can be achieved for the hand 14 during mechanical resetting, and visibility is also improved.

(3) Since the minute CG hand 15 moves in a fan pattern, the rotating shaft 15A thereof can be disposed near the rotating shaft 14A of the seconds CG hand 14. Specifically, the distance between the rotating shafts 14A and 15A can be less than the length L4 of the minute CG hand 15. Therefore, the rotating shaft 15A of the minute CG hand 15 can be disposed adjacent to the center 4A of the time display section 4, and the indications of the minute CG hand 15 can be easily read because the length L4 of the minute CG hand 15 is increased by that distance.

Also, the cam contact points of the return-to-zero hammer 330 in contact with the heart-cams 210 and 224 can be adjacent to each other, and the return-to-zero hammer 330 in contact with the heart-cams 210 and 224 can be easily integrated and reduced in size because the axes 14A and 15A moved closer to each other when the chronograph hands 14 and 15 are returned to zero in a mechanical resetting configuration.

(4) At least two of the toothed gears 107 through 109 that do not increase or decrease speed are disposed between the gears on which the hour and minute hands 11 and 12 are mounted (center wheel and pinion 111, hour wheel) and the rotor 104 of the basic timepiece electric motor 101, and the cost of the components can be reduced because these toothed gears 107 through 109 are configured from similar gears. Therefore, the cost can be reduced even when there is a large distance between the hour and minute hands 11 and 12 and the seconds hand 13.

(5) In a regular timepiece, the conduction structure of the secondary power source and the printed circuit board is given priority, and the secondary power source is disposed in the bottom layer (first layer) of the printed circuit board, but when the secondary power source is disposed in the bottom layer, the electrical conduction from the secondary power source must be cut off when the circuit is electrically inspected after the components are assembled. Therefore, components such as positive terminals are designed to be incorporated last, and caution must be taken so that the secondary power source is not conductive during the assembly steps.

Accordingly, in the present embodiment, the secondary power source 640 is incorporated last in the steps of assembling the movement 100 because the secondary power source 640 is disposed in the second layer (top layer) next to the back cover 30. Therefore, the design is simple in comparison with disposing the secondary power source 640 in the first layer because there is no need to incorporate components such as a positive terminal last, and the assembly operation of the movement 100 can be performed efficiently. Also, after the other components are incorporated, the electrical inspection can be performed extremely easily and assembly operations and productivity can be improved because the circuits are electrically inspected prior to incorporating the secondary power source 640.

(6) The return-to-zero hammer 330, operating lever 340, and other components for striking the heart-cams 210 and 224 can be efficiently mounted because the resetting mechanism is mounted in the top layer of the CG gear train. Therefore, a timepiece 1 with a power generating device having a plurality of components can be accommodated to the size of a normal wristwatch.

(7) Circuits separated in the vertical direction can be reliably connected to each other in a simple configuration because the printed circuit board 501 and the secondary power source 640 in the second layer or the like are electrically connected by utilizing the conduction coils 631.

(8) A good balance is established between the positions of the hands, and design is improved because the seconds CG hand 14 is disposed at a position eccentric from the center 4A of the time display section 4 in the 12:00 direction, the hour hand 11 and minute hand 12 are disposed at a position eccentric from the center 4A in the 6:00 direction, the seconds hand 13 is disposed at a position eccentric from the center 4A roughly in the 10:00 direction, and the minute CG hand 15 is disposed at a position eccentric from the center 4A roughly in the 2:00 direction.

Additionally, since the minute CG hand 15 that moves in a fan pattern is disposed in roughly the 2:00 direction, the operation of the hands can be easily understood because the minute CG hand 15 rotates from the reset position around the timepiece, that is, in the same direction as the other hands.

(9) The movement 100 has a two-layered structure, the electric motors 101 and 201 and the gear train are disposed in the first layer, and the secondary power source 640 is disposed in the second layer, so the flat size of the secondary power source 640 can be larger than a common timepiece wherein these components are disposed on the same layer. Therefore, a secondary power source 640 with a lower internal resistance can be utilized, charging by the power generator 610 is efficient, and the timepiece 1 can continuously operate for a longer time.

(10) The electrical wiring between the electric motors 101 and 201 disposed in the first layer, the secondary power source 640 disposed in the second layer, and the printed circuit board 501 can be shortened because the printed circuit board 501 is disposed in the first layer and second layer of the movement 100. Therefore, external noise in the electrical wiring can be reduced, and the electric motors 101 and 201 can be prevented from malfunctioning or the like due to the external noise.

(11) A relatively larger amount of generated electric power can be outputted and the charging of the secondary power source 640 can be performed more efficiently, because a power generating device having an oscillating weight 480, an oscillating weight wheel 470, and a power generator 610 is provided.

Furthermore, an increase in the width of the timepiece 1 can be reduced even if the oscillating weight 480 is disposed overlapping the movement 100 with a two-layered structure because the oscillating weight has a flat shape.

(12) The toothed gears and other such components can be journaled in the same base member and cover member because the toothed gears of the gear trains are journaled in the first-layer base member comprising the bottom plate 400 and circuit holder 700 and in the first-layer cover member comprising the gear train support 401. Therefore, cross-sectionally overlapping components and the like can be guided while kept uniform in height, and variations in the distance from the center and the like can be reduced. Furthermore, the positional accuracy of the gears in relation to each other can be increased because the pivots of the gears are journaled in the integrated circuit holder 700 and gear train support 401, whereby variations in the distance from the center can be reduced.

(13) The thickness of the first-layer base member can be reduced while ensuring the necessary strength, because the first-layer base member for journaling a plurality of toothed gears is configured from a metallic bottom plate 400 and a plastic circuit holder 700. Furthermore, the metallic bottom plate 400 acts as a shield and can reduce or prevent the effects of external magnetic fields and the like on the electric motors 101 and 201, and the effects of static electricity on the IC or the like.

(14) The pivot holes for journaling the gear trains can be integrally molded during injection molding or the like, because the circuit holder 700, the gear train support 401, and the circuit cover 600 are made of plastic. Therefore, processing operations are simplified and manufacturing costs are reduced in comparison with forming pivot holes by processing holes in a metal plate.

In addition, when pivot holes are formed in plastic material, the pivot holes can be formed into holes wherein one side is closed off without passing through the member. Utilizing such pivot holes makes it possible to prevent dust from entering the pivot holes and to smoothly rotate the gears.

(15) The pivots of the seconds CG gear 208 and minute CG gear 220 are journaled in the circuit holder 700, making it possible to lengthen the circuit cover 600, and the oscillating weight bridge 460, the axes of the gears 208 and 220. Therefore, reading errors due to interference between the hands or the like can be minimized.

(16) There is no need to place the toothed gears at a distance from each other because the seconds CG gear 208 and the minute CG gear 220 are disposed in a cross-sectional misalignment, that is, misaligned in the direction of the thickness of the timepiece 1. Therefore, it is possible to shorten the distance between the centers of the seconds CG gear 208 and the minute CG gear 220, and the flat mounting space can be reduced.

The types of components and the cost can be reduced because the seconds CG gear 208 and minute CG gear 220 can be configured simply by modifying the same types of gears.

(17) Since the second CG first middle gear 207 has two pinions, it is possible to transmit the rotational force of the toothed gear 206 to the two gear trains (seconds CG gear 208 and minute CG second middle gear 222) with different speed reducing ratios by means of the top and bottom pinions. Therefore, the number of toothed gears can be reduced and the necessary mounting space can be narrowed compared with using a normal gear with only one toothed gear and pinion each.

Also, the seconds CG gear 208 interlocks with the heart-cam 210, and returning to zero immediately requires considerable force. Therefore, the toothed gear strength must be taken into account in order to apply a large force to the second CG first middle gear 207, but in the present embodiment, such consideration is not necessary because the strength of the shaft sections can be improved by providing two pinions.

(18) The effects of a leakage flux from the power generator 610 on the electric motors 101 and 201 can be reduced and a correction pulse need or other circuit measure need not be considered because the power generator 610 and the two electric motors 101 and 201 are disposed separate from each other in the thickness direction and the planar direction.

(19) The wiring for the power source can be shortened and malfunctioning due to external noise can be prevented because an IC or auxiliary capacitor is mounted in the planar position of the secondary power source 640. Also, the secondary batter acts as a shield and makes it possible to prevent IC damage from static electricity due to the mounting of a metallic secondary battery on the IC.

(20) Misalignment between the dial 3 and the date indicator maintaining plate 720 can be reduced because a guide pipe 701 for guiding the dial-foot serves as a guide for the date indicator guide holder 710.

[Second Embodiment]

Another embodiment of the present invention will now be described with reference to the diagrams. In the following embodiment, structural components that are identical or similar to those in the embodiment previously described are denoted by the same symbols, and descriptions thereof are omitted or simplified.

Figure 18:
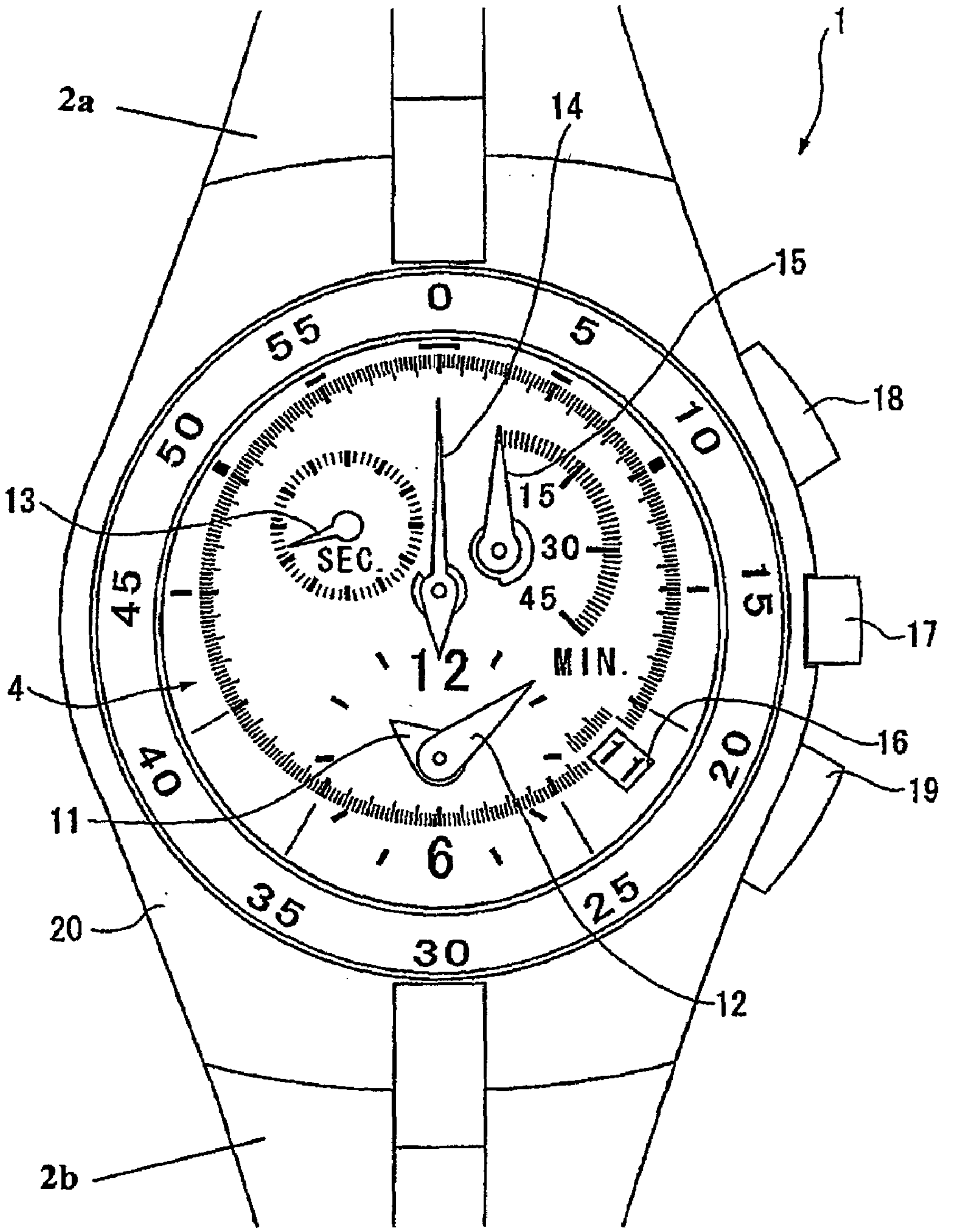
FIG. 18 is an external view of the front of the chronograph timepiece relating to the second embodiment.

FIG. 18 is an external view of the front of the present embodiment.

An hour hand 11 and minute hand 12 for displaying the standard time mounted on the same axis are disposed in the 6:00 direction from the center of the time display section 4 in the case 20 of the timepiece, and a basic timepiece seconds hand 13 for displaying the standard time is disposed in the 10:00 direction in this chronograph timepiece 1, similar to the first embodiment. A chronograph seconds hand 14 for displaying the second chronograph time is mounted in a position slightly eccentric from the center of the time display section 4 in the 12:00 direction. Also, a chronograph minute hand 15 for displaying the minute chronograph time is disposed roughly in the 2:00 direction and moves in a fan pattern above fan-shaped graduations. This chronograph is a 45-minute timer.

The configuration of the graduations of the hands, the winding-button 17, the start and stop button 18, and the reset button 19 is the same as in the first embodiment.

Figure 19:
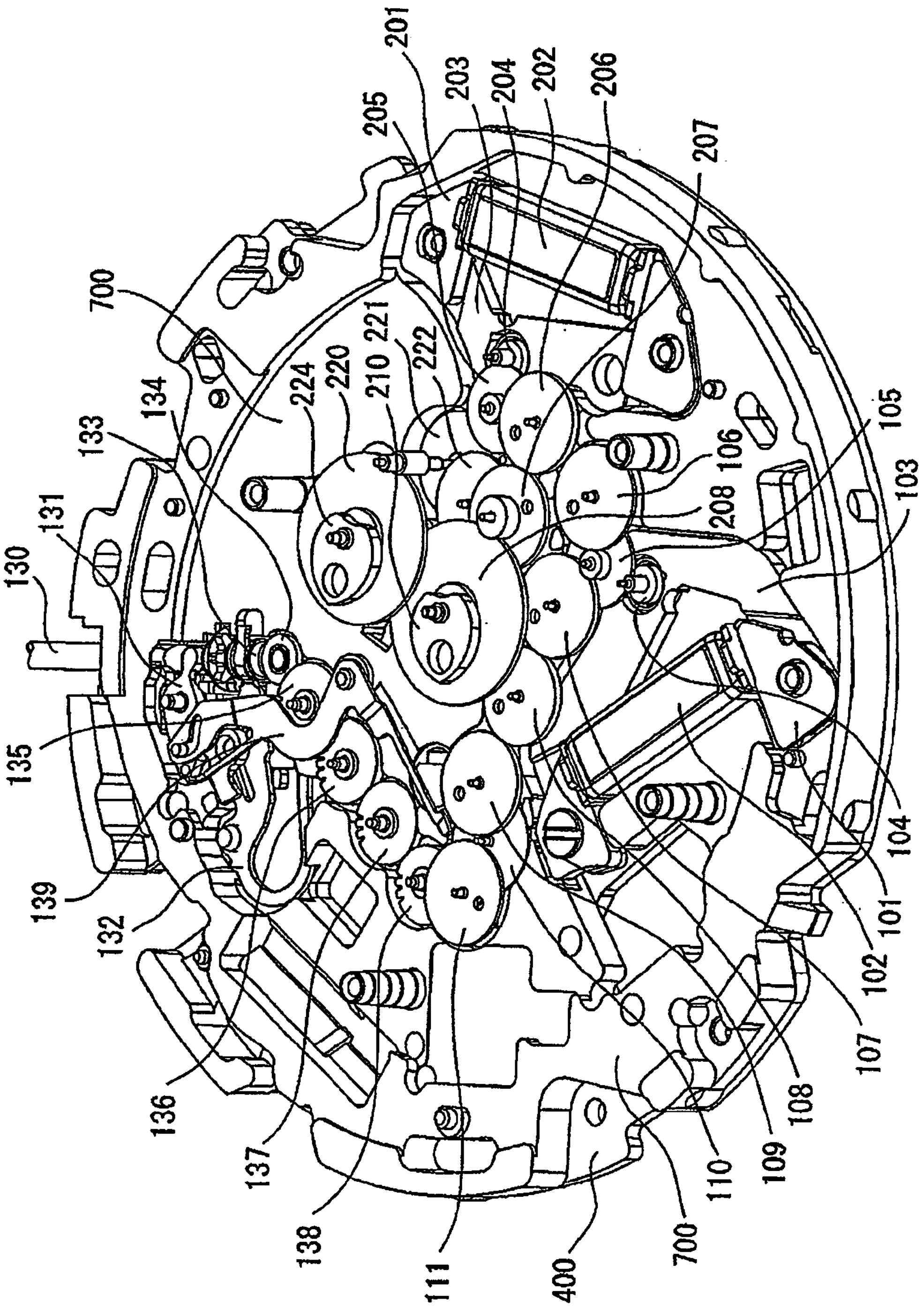
FIG. 19 is a perspective view of the entire main section of the movement of the second embodiment.

FIG. 19 is a perspective view of the entire main section of the movement of the timepiece, and is similar to FIG. 7 of the first embodiment. Specifically, FIG. 19 shows a basic timepiece gear train for displaying the standard time and a chronograph gear train for displaying the chronograph time in a state wherein the gear train support, the circuit cover, the return-to-zero clamp, and other components on the top surface of the movement have been removed.

First, the basic structure of the basic timepiece gear train for displaying the standard time will be described.

A circuit holder 700 made of a synthetic resin is mounted on the top surface of the bottom plate 400. The basic timepiece electric motor 101, which is a drive source for the basic timepiece, is configured from a basic timepiece coil 102, a basic timepiece stator 103, and a basic timepiece rotor 104; the basic timepiece rotor 104 is rotated at a timing of one step per second by a drive signal from the electric circuit; and the drive is reduced and transmitted to a small second wheel and pinion 106 via a fifth wheel and pinion

105, whereby the seconds of the standard time are displayed by means of a basic timepiece seconds hand 13 (shown in FIG. 18) supported on the small center wheel and pinion 106. Also, the rotation is reduced and transmitted to a center wheel and pinion 111 via the fifth wheel and pinion 105, a fourth third middle gear 107, a fourth second middle gear 108, a fourth first middle gear 109, and a third wheel and pinion 110; and the minutes of the standard time are displayed by the basic timepiece minute hand 12 (shown in FIG. 18) supported on the center wheel and pinion 111. The drive is transmitted from the center wheel and pinion 111 to an hour-wheel via the date rear wheel to display the hour of the standard time (omitted in the diagram). These components are not described in detail because they are the same as in a common electric timepiece, but the hours, minutes, and seconds of the standard time are laid out and displayed as shown in FIG. 18.

The setting stem 130 fixed to the winding-button 17 (shown in FIG. 18) is supported between the bottom plate 400 and the circuit holder 700, and pulling out the setting stem 130 allows a trigger-piece 131 and a bolt 132 to interlock and a drum wheel 133 to engage with a setting-wheel 134. The setting-wheel 134 transmits the rotation of the setting stem 130 sequentially to a third intermediate minute wheel 135, a date back second middle gear 136, a date back first middle gear 137, and a minute wheel 138, whereby the standard time is corrected. A control lever 139 interlocks with the trigger-piece 131 and sets the fourth first middle gear 109 in an interlocking fashion with the pulling out of the setting stem 130. The gears and hammers constituting the basic timepiece gear train described above are supported between the circuit holder 700 and the gear train support 401 (shown in FIG. 21, but a diagram of the basic timepiece gear train is omitted).

Figure 20:
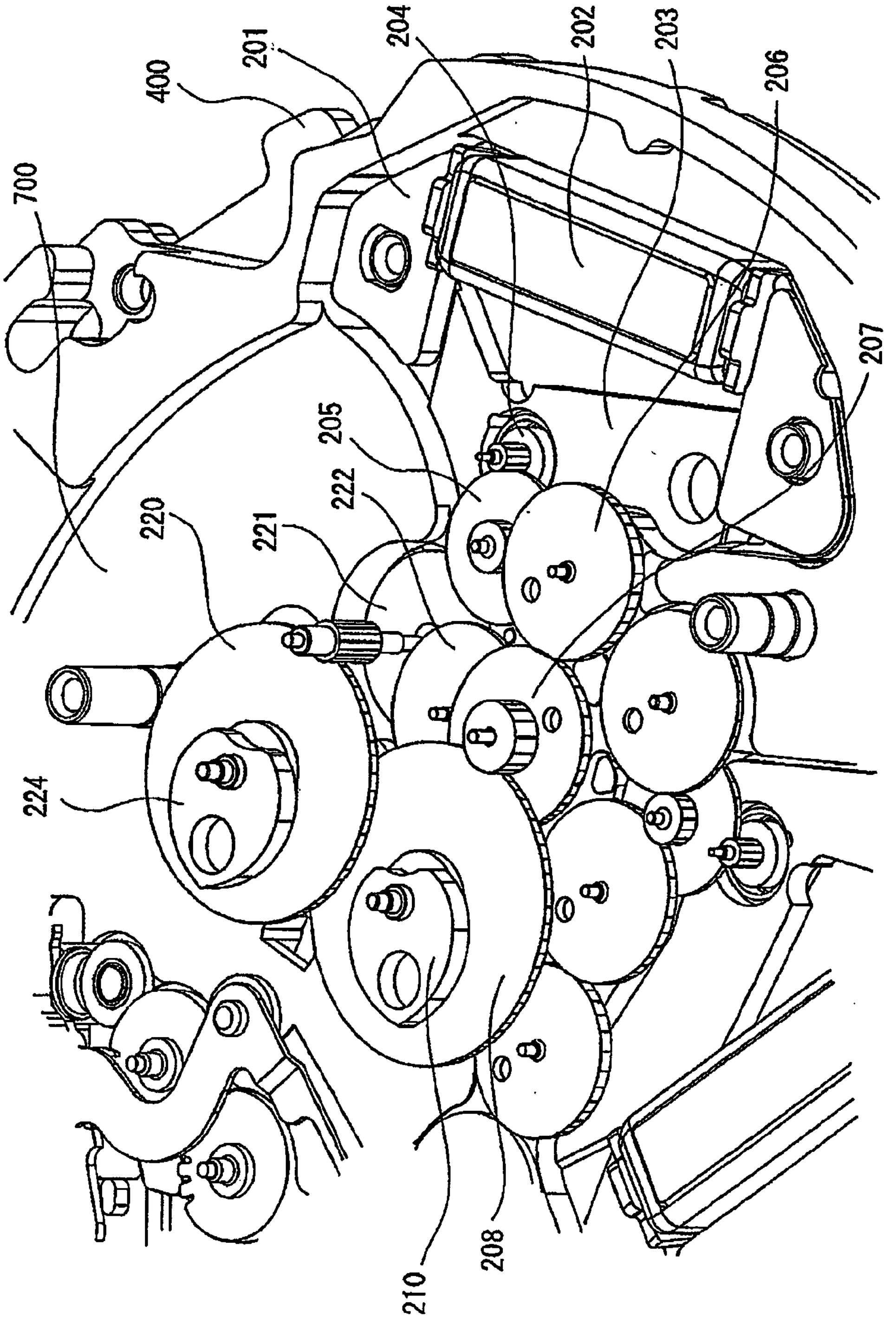
FIG. 20 is an enlarged perspective view of the main section of the chronograph gear train in FIG. 19.

The chronograph gear train in FIG. 20 will now be described. FIG. 20 is an enlarged perspective view of the main section of the chronograph gear train in FIG. 19.

The chronograph electric motor 201, which is a drive source for the chronograph gear train, is configured from a chronograph coil 202, a chronograph stator 203, and a chronograph rotor 204. The chronograph rotor 204 is rotatably driven by a drive signal from the electric circuit; the rotation is transmitted to a seconds CG gear 208 via a second CG third middle gear 205, a seconds CG second middle gear 206, and a second CG first middle gear 207; and the chronograph seconds are displayed by the chronograph seconds hand 14 (shown in FIG. 18) supported by the seconds CG gear 208. The seconds CG gear 208 includes a heart-cam 210 for resetting to zero.

The minute CG gear 220, which is a chronograph gear for the minutes, transmits the step drive from the chronograph electric motor 201 from the second CG first middle gear 207 via the minute CG second middle gear 222 and the minute CG first middle gear 221, and the chronograph minutes are displayed by the chronograph minute hand 15 (FIG. 18) supported by the minute CG gear 220. The minute CG gear 220 includes a heart-cam 224 for resetting to zero. The second CG first middle gear 207 includes a pinion for engaging with the minute CG gear 220 and a pinion for engaging with the minute CG second middle gear 222 (not shown).

Figure 21:
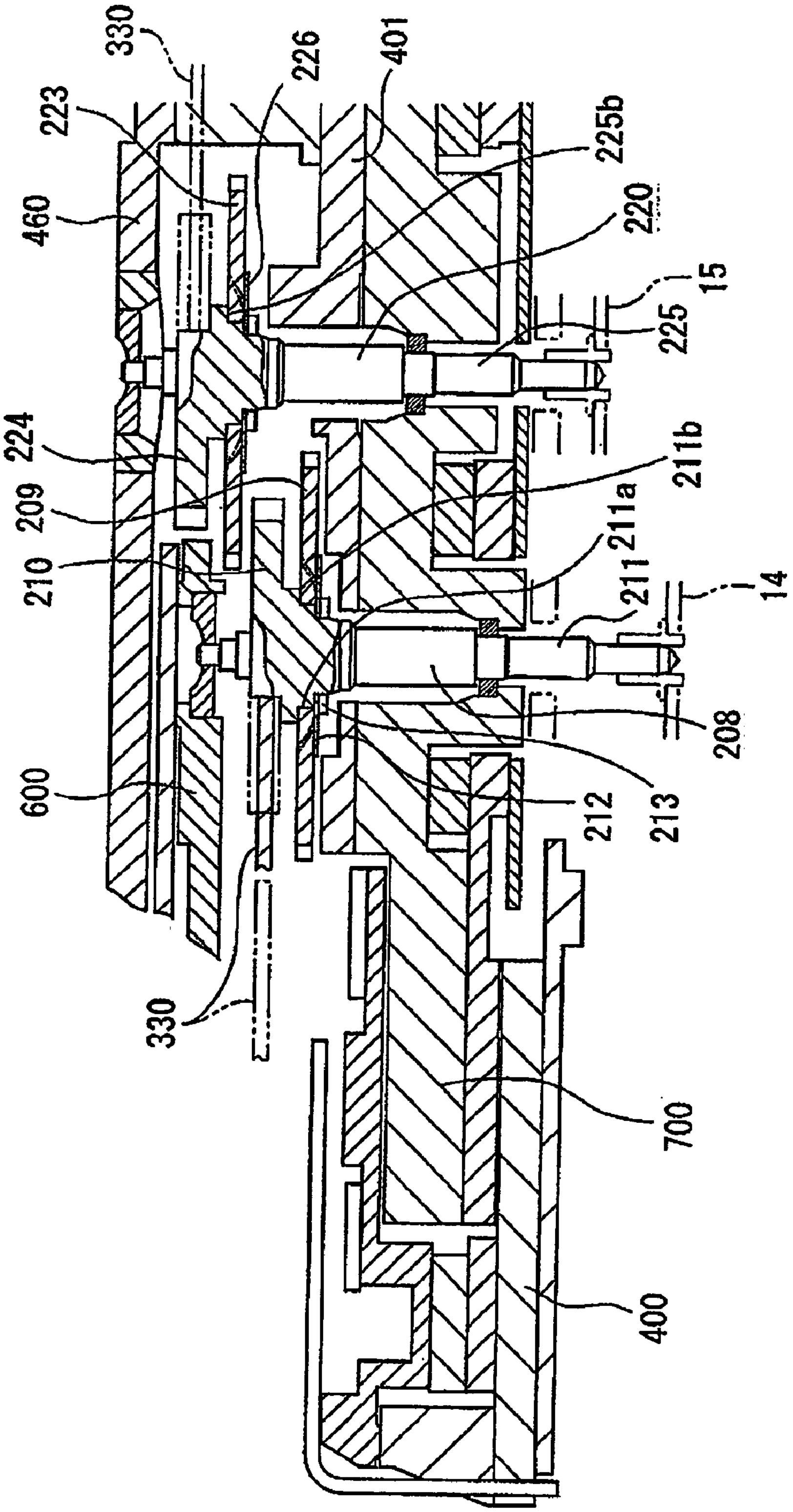
FIG. 21 is a cross-sectional view of a seconds CG gear and a minute CG gear.

The chronograph gear train is supported between a circuit holder 700, a circuit cover 600, and an oscillating weight bridge 460 (not shown) installed on the top surface of the bottom plate 400, as shown in FIG. 21.

FIG. 21 is a cross-sectional view of the seconds CG gear 208 and the minute CG gear 220.

Since the seconds CG gear 208 and the minute CG gear 220 have the same configuration, the seconds CG gear 208 will be described in detail as an example.

The seconds CG gear 208 is configured from a seconds CG gear axis 211, a heart-cam 210, and a second CG toothed gear 209, and this configuration is similar to the first embodiment.

The second CG toothed gear 209 is attached in a rotatable manner to the bottom section 211*a* of the heart-cam 210 formed on the seconds CG gear axis 211, and is pressed against the bottom step section 211*b* of the heart-cam 210 by the elastic force of a sliding spring 212. The sliding spring 212 pushes on the second CG toothed gear 209 with a specific amount of flexure by pressing and fixing a sliding spring hold-down support 213 to the seconds CG gear axis 211. The contacting portions of the heart-cam 210 and the second CG toothed gear 209 are interlocked by means of a friction force based on the pressure of the sliding spring 212 during chronograph measurement. On the other hand, during resetting, the heart-cam 210 is pressed on the side by the return-to-zero hammer 330 and is forced to rotate, causing the second CG toothed gear 209 and the heart-cam 210 to slip; and the seconds CG gear axis 211 integrated with the heart-cam 210 rotates to return the chronograph seconds hand 14 to the 0-seconds position. The second CG toothed gear 209 and other parts of the chronograph gear train do not rotate and maintain a normal engaged state. The resetting operation is described in detail with reference to FIG. 22 onward. Herein, the seconds CG gear 208 is supported between the circuit holder 700 and the circuit cover 600 by axle bearings.

The minute CG gear 220 has a structure similar to the seconds CG gear 208, and a detailed description thereof is omitted, but the minute CG gear 220 is configured from a minute CG gear axle 225, a minute CG toothed gear 223, and a heart-cam 224. The minute CG toothed gear 223 is adapted to be pressed against the heart-cam bottom step section 225*b* by the elastic force of a sliding spring 226. The minute CG gear 220 is supported between the circuit holder 700 and the oscillating weight bridge 460 by an axle bearing.

During resetting, the heart-cam 224 is forced to rotate by the return-to-zero hammer 330 and to slip in relation to the minute CG toothed gear 223, and the minute CG gear axle 225 integrated with the heart-cam 224 rotates to return the chronograph minute hand 15 to zero. The minute CG toothed gear 223 and the other parts of the chronograph gear train do not rotate and maintain a normal engaged state.

In the present invention, the sliding springs 212 and 226 are configured separately from the second CG toothed gear 209 and the minute CG toothed gear 223, but the functions do not change even if sliding sections are provided in the CG toothed gears. Also, the heart-cam is formed integrally with the CG gear axle, but also may be fixed on as a separate member.

Figure 22:
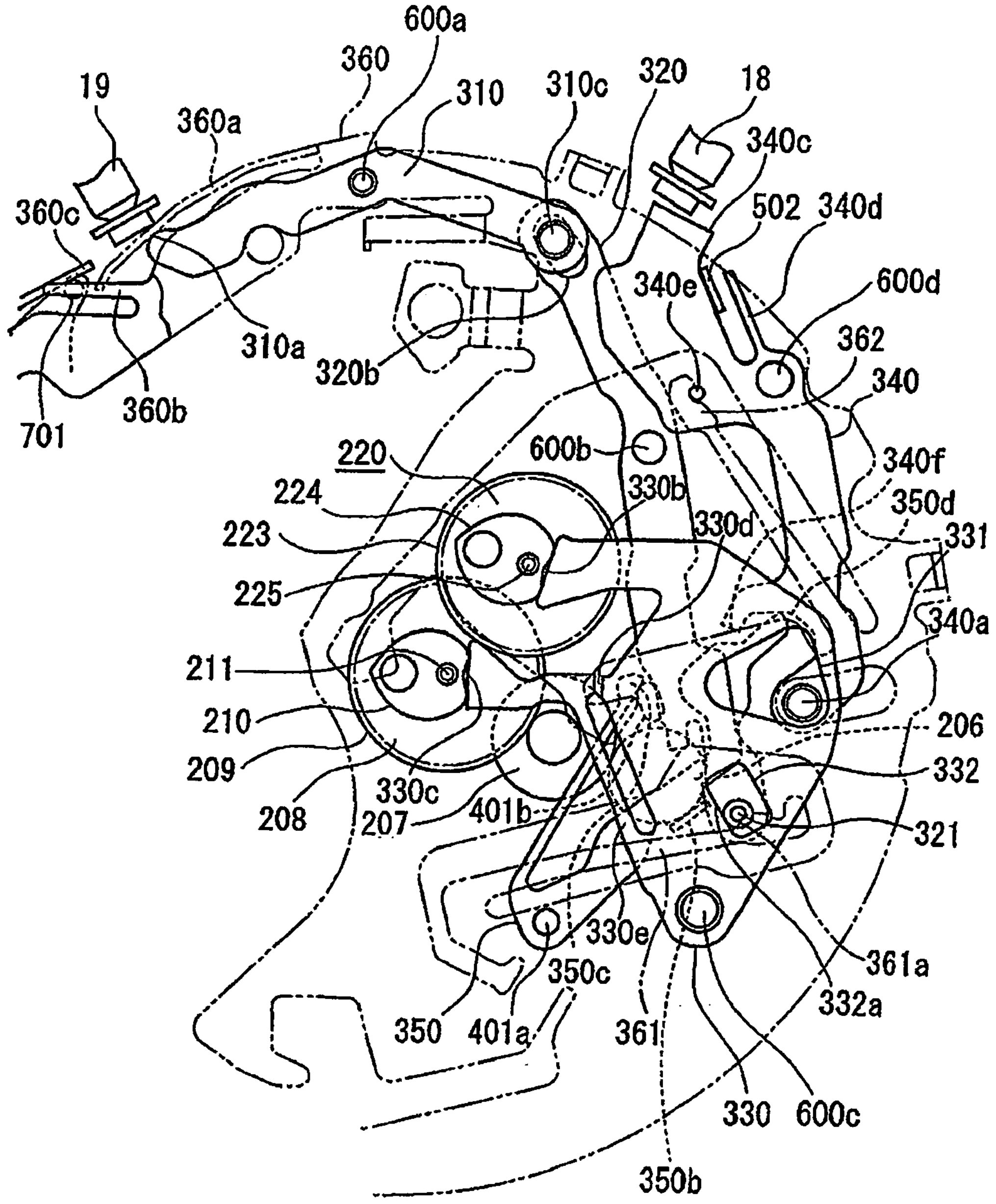
FIG. 22 is a plan view of the main section during resetting.
Figure 23:
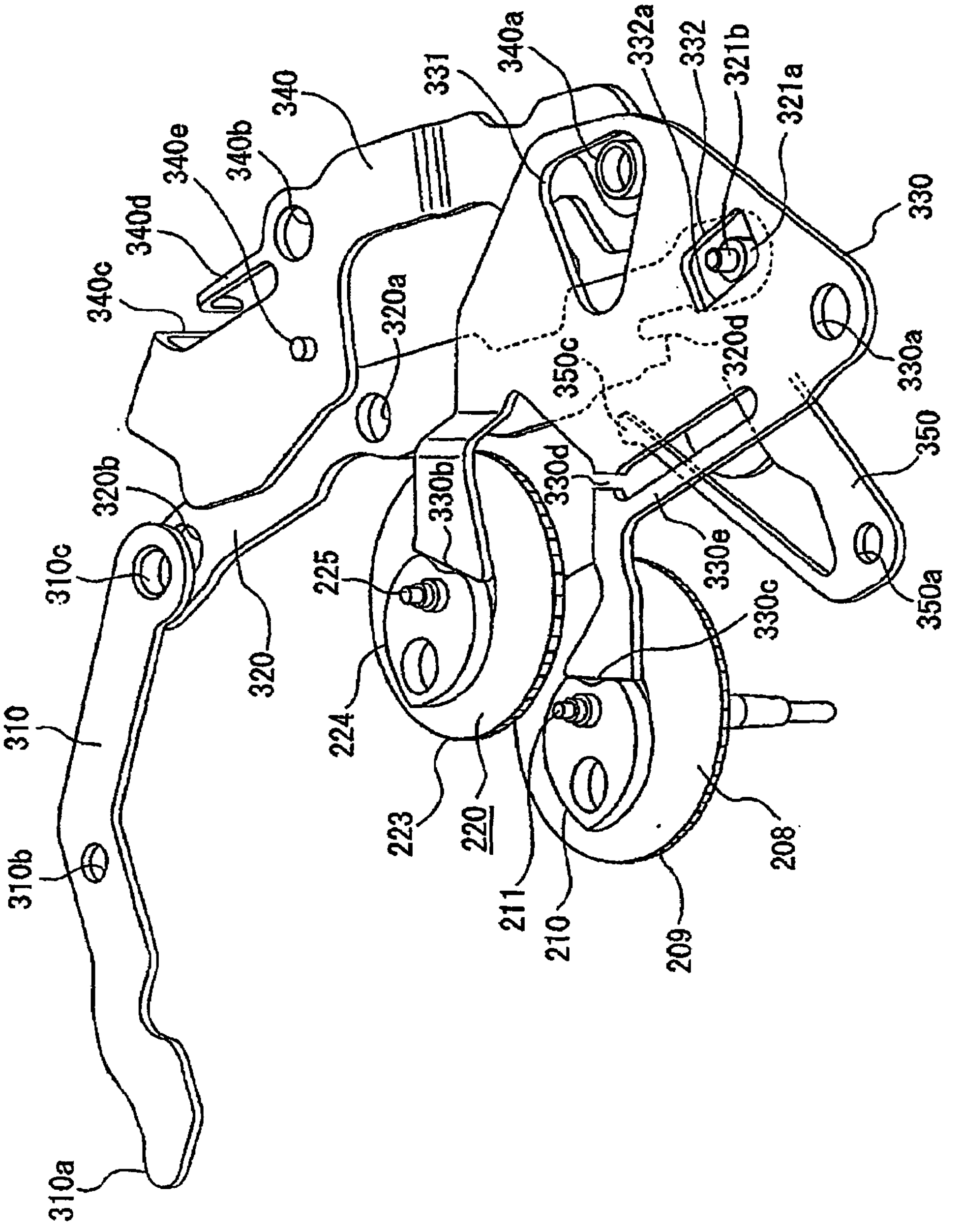
FIG. 23 is a cross-sectional view of the main structural portion in FIG. 22.

The chronograph configuration will now be described using FIGS. 22 and 23. FIG. 22 is a plan view of the main section showing the chronograph reset state when the reset button is pressed. FIG. 23 is a perspective view of the main section of the resetting mechanism in FIG. 22 with the main structural components removed.

The start and stop button 18, which is the first external operating member, is in the initial position prior to being pressed in FIGS. 22 and 23. The reset button 19, which is the second external operating member, is shown as having been pressed. Part of the return-to-zero clamp 360 forms a return-to-zero clamp spring section 360*a* bent towards the bottom plate, and comes into contact with the tip 310*a* of the transmission hammer 310. The transmission hammer 310 is provided with a hole 310*b* in a position corresponding to a transmission hammer shaft 600*a* that is set in a resin-molded circuit cover 600, and the hole 310*b* engages with the transmission hammer shaft 600*a*. An operating shaft 310*c* is formed integrally with the transmission hammer 310 at the other end section of the transmission hammer 310, and is caused to engage a track-shaped hole (a long hole) 320*b* in the return-to-zero transmission hammer 320.

The return-to-zero transmission hammer 320 is provided with a substantially centrally located hole 320*a* in engagement with a rotating shaft 600*b* formed integrally with the circuit cover 600. An operating shaft 321 having two steps with different radii is set in the tip in the direction opposite the transmission hammer 310. The large-step section 321*a* of the operating shaft 321 engages with a roughly rectangular hole 332 in the return-to-zero hammer 330. The small-step section 321 b of the operating shaft 321 (see FIG. 23) engages with a click spring 361. The click spring 361 is a positioning member for positioning of the return-to-zero transmission hammer 320, and is formed integrally with the return-to-zero clamp 360.

The return-to-zero hammer 330 that interlocks with the return-to-zero transmission hammer 320 is provided with a hole 330*a* corresponding to a rotating shaft 600*c* formed in the circuit cover 600, and the hole 330*a* engages with the rotating shaft 600*c*. A surface 330*b* in contact with the heart-cam 224 of the minute CG gear 220 and a surface 330*c* in contact with the heart-cam 210 of the seconds CG gear 208 are provided in the timepiece central direction of the return-to-zero hammer 330. A slit 330*d* that faces the contact surface 330*b* is cut into the surface 330*c* in contact with the return-to-zero hammer 330, and the surface 330*c* has a spring section 330*e*. The operating lever 340 is provided with a roughly triangular hole 331, and the hole 331 engages with an operating shaft 340*a* formed in the operating lever 340.

The operating lever 340 is provided with a hole 340*b* in a position corresponding to a rotating shaft 600*d* formed in the circuit cover 600, and is caused to engage the rotating shaft 600*d*. Also, a surface 340*c* in contact with the start and stop button 18 when the button is forms a folded cross-sectional configuration adjacent to the button, which is the first external operating member. A switch input terminal 340*d* is integrally formed between the button contact surface 340*c* and the hole 340*b*, and is electrically connected to a start and stop input pattern 502 provided to the side surface of the printed circuit board 501 (see FIG. 27) when the start and stop button 18 is pressed. Furthermore, a shaft 340*e* and the operating shaft 340*a* are formed in the same surface on the operating lever 340; the shaft 340*e* is formed in the return-to-zero clamp 360 and is caused to engage the click spring 362, which is a positioning member for positioning of the operating lever 340; and the operating shaft 340*a* engages with the roughly triangular hole 331 of the return-to-zero hammer 330.

A chronograph setting hammer 350 is provided with a hole 350*a* in a position corresponding to a rotating shaft 401*a* formed in the gear train support 401 to provide a loose rotatable fit.

A spring section 350*c* in contact with the side surface of a protruding section 401*b formed in a track shape on the gear train support* 401, *a setting section* 350*b* bent to a position adjacent to the seconds CG second middle gear 206 and caused to engage the seconds CG second middle gear 206 in a cross-sectional manner, and a beak-shaped tip section 350*d* that engages with a tip section 340*f* of the operating lever 340 are formed in the chronograph setting hammer 350. There is also engagement with the peninsula-shaped protruding section 320*d* of the return-to-zero transmission hammer 320.

The operation of the chronograph will now be described using FIGS. 22 through 28.

The resetting operation will be described with reference to FIGS. 22 and 23.

When the reset button 19 is pressed, the reset button 19 pushes the tip 310*a* of the transmission hammer 310 and moves it counterclockwise via the spring section 360*a* of the return-to-zero clamp 360. The transmission hammer 310 rotates around the transmission hammer shaft 600*a*, and the operating shaft 310*c* at the other end also rotates counterclockwise.

The return-to-zero transmission hammer 320 is rotated by the operating shaft 310*c* of the transmission hammer 310 clockwise around the rotating shaft 600*b*, and the operating shaft 321 at the other end also rotates clockwise. The inner wall 332*a* of the roughly rectangular hole 332 provided to the return-to-zero hammer 330 is then pressed on by the large-step section 321*a* of the operating shaft 321, and the return-to-zero hammer 330 is made to rotate counterclockwise around the rotating shaft 600*c*. The surface 330*b* facing the end surface of the heart-cam 224 of the minute CG gear 220 and the surface 330*c* facing the end surface of the heart-cam 210 of the seconds CG gear 208 are pressed against the heart-cams 210 and 224, respectively, by the rotation of the return-to-zero hammer 330, and the chronograph seconds hand 14 and chronograph minute hand 15 stopped by the heart-cams 210 and 224, that is, the seconds CG gear axis 211 and minute CG gear axis 225, are returned, that is, reset, to a set position, commonly the zero position.

At this point, the pressure between the two heart-cams 210 and 224 can reliably return the hands to zero while the dimensional variations of the structural components are compensated for by the spring section 330*e*, because the seconds CG gear 208 of the return-to-zero hammer 330 is cut by a slit 330*d*, and pressure is applied to the heart-cam 210 by the elastic force of the spring section 330*e*.

When the seconds CG gear 208 and minute CG gear 220 are returned to zero, the second CG toothed gear 209 and the minute CG toothed gear 223 form a sliding structure with the seconds CG gear axis 211 and the minute CG gear axis 225, so the other parts of the chronograph gear train do not rotate even if the heart-cams are returned to zero.

Therefore, the chronograph can be accurately started without rotating the chronograph gear train or the chronograph rotor 204 and without any misalignment in their respective positions.

When the resetting operation is completed, the operating shaft 321 of the return-to-zero transmission hammer 320 is positioned on a slanted surface 361*a* at the end of the click spring 361 formed integrally on the return-to-zero clamp 360, and is pressed on by the elastic force of the click spring 361 to come into contact with the inner wall 332*a* of the roughly rectangular hole 332 of the return-to-zero hammer 330. Therefore, the return-to-zero transmission hammer 320 can maintain a stable position.

When the reset button 19 is released, the reset button 19 and the spring section 360*a* of the return-to-zero clamp 360 return to their positions prior to the operation. The state of the other levers engaging with the transmission hammer 310 does not change even if the reset button 19 is pressed repeatedly because the reset button 19, the return-to-zero transmission hammer 320, and the return-to-zero hammer 330 are kept in their state when the resetting operation is completed.

When the reset button 19 is pressed to perform the resetting operation, the connection between the return-to-zero transmission hammer 320 and the peninsula-shaped protruding section 320*d* is released so the chronograph setting hammer 350 is rotated counterclockwise by the elastic force of the spring section 350*c*, and the setting section 350*b* applies pressure to the seconds CG second middle gear to set the chronograph gear train.

The second CG toothed gear 209 and minute CG toothed gear 223 have a sliding structure, and the other parts of the chronograph gear train are configured not to rotate when the heart-cams 210 and 224 are rotated and returned to zero, but the other parts of the chronograph gear train are sometimes rotated during resetting if the sliding torque becomes greater than the load of the chronograph gear train. It is possible to rotate the chronograph gear train and accurately start the chronograph during the return-to-zero operation without changing the phases of the magnetic poles of the chronograph rotor 204, because the sliding structure can be made fully functional by providing the chronograph setting hammer 350.

The chronograph setting hammer 350 sets the seconds CG second middle gear 206 and may also set the other parts of the chronograph gear train. Also, the chronograph setting hammer 350 continues to maintain its position even when the reset button 19 is released because the position of the return-to-zero transmission hammer 320 does not change.

During the return-to-zero operation, the start and stop button 18 is in its position prior to being pressed, the position of the operating lever 340 is determined by the shaft 340*e* and the click spring 362 of the return-to-zero clamp 360, and the switch input terminal 340*d* is also held in a position away from the start and stop input pattern 502.

Here, the timing during the return-to-zero operation is a sequence whereby the order of the reset switch input, the chronograph setting, and the resetting do not cause malfunctioning, providing the most suitable timing because the present embodiment involves a structure wherein the chronograph setting hammer 350 interlocks with the return-to-zero transmission hammer 320.

Figure 24:
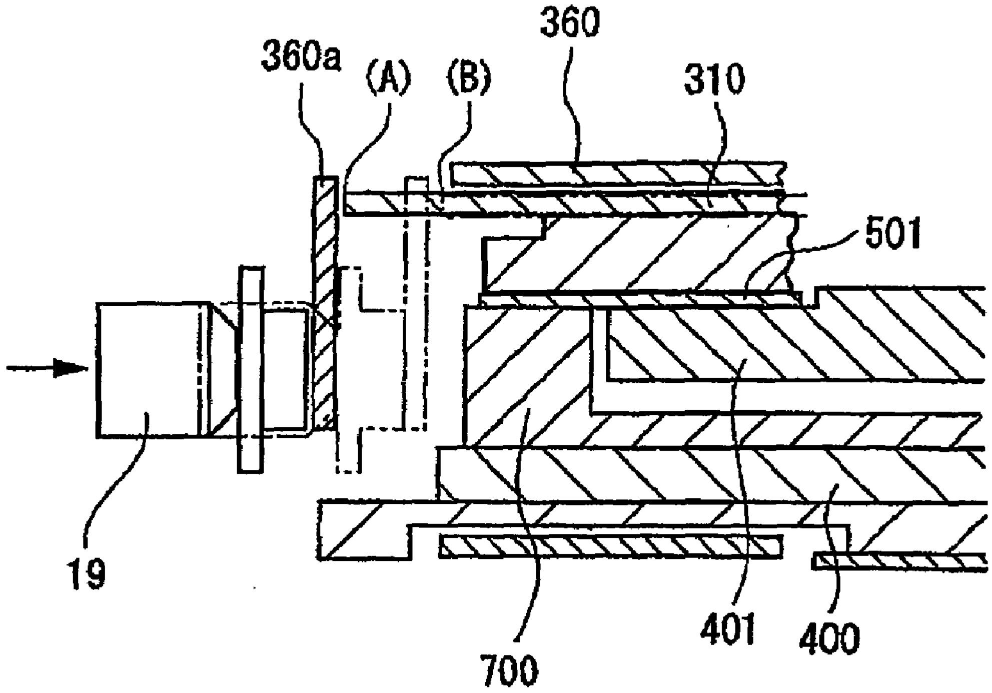
FIG. 24 is a cross-sectional view when the reset button is operated.

The switch input when the reset button 19 is pressed will be described with reference to FIGS. 24 and 25. FIG. 24 is a cross-sectional view of the reset button during the return-to-zero operation, and FIG. 25 is a side view as seen from the reset button direction.

When the reset button 19 is pressed (in the direction of the arrow), the movement of the reset button 19 is transmitted via the spring section 360*a* of the return-to-zero clamp 360, and the transmission hammer 310 is moved from position (A) to position (B). Therefore, as previously described, the return-to-zero transmission hammer 320 and the return-to-zero hammer 330 interlock to apply pressure to the heart-cams 210 and 224 and return the chronograph seconds hand 14 and chronograph minute hand 15 to zero.

Figure 25:
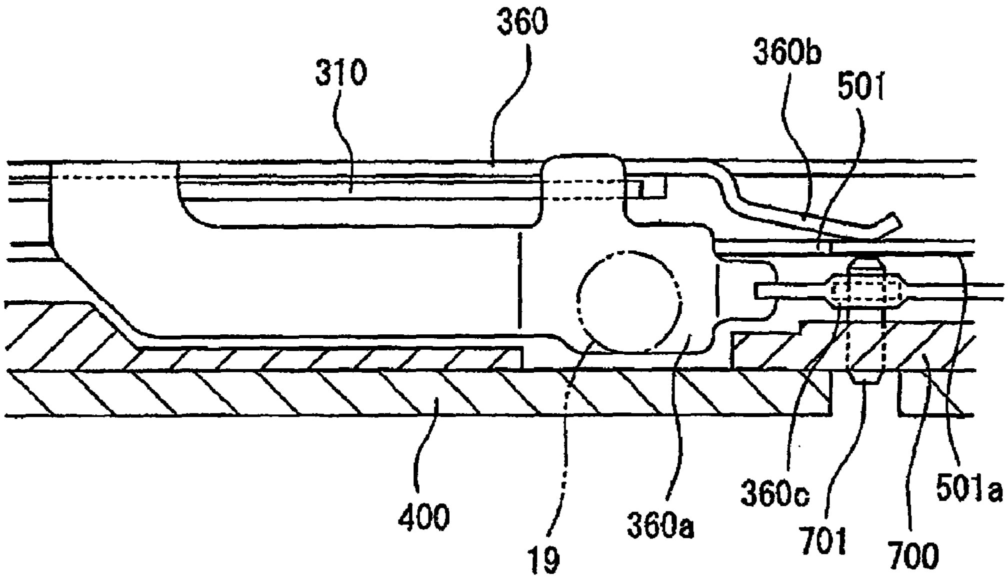
FIG. 25 is a side view as seen from the button side in FIG. 24.

In FIG. 25, a reset terminal 701 is set into the circuit holder 700, and the surface of one end of the reset terminal 701 is connected to a reset input pattern 501 a provided to the printed circuit board 501.

The surface opposite the reset input pattern 501*a* of the printed circuit board 501 is firmly pressed down by a reset terminal clamp spring 360*b* having part of the return-to-zero clamp 360, enhancing the reliability of the connection between the reset terminal 701 and the reset input pattern 501*a*.

Pressing the reset button 19 moves the tip section of the spring section 360*a* next to the center of the timepiece, an input terminal 360*c* formed integrally with the return-to-zero clamp 360 comes into contact with the reset terminal 701 in conjunction with this movement, and the reset input is turned on. When the reset input is turned on, the electric circuit is reset, and the chronograph is set to its initial state and is ready to be started. When released, the reset button 19 is returned to its original position by a button return spring (not shown) provided to the case, the return-to-zero clamp spring section 360*a* and input terminal 360*c* return to their original positions by their own elastic force, and the connection with the reset terminal 701 is lost, but the state of the chronograph does not change.

The electric circuit is configured not to receive reset input if the start and stop signals are not inputted when the reset button 19 is repeatedly pressed.

Figure 26:
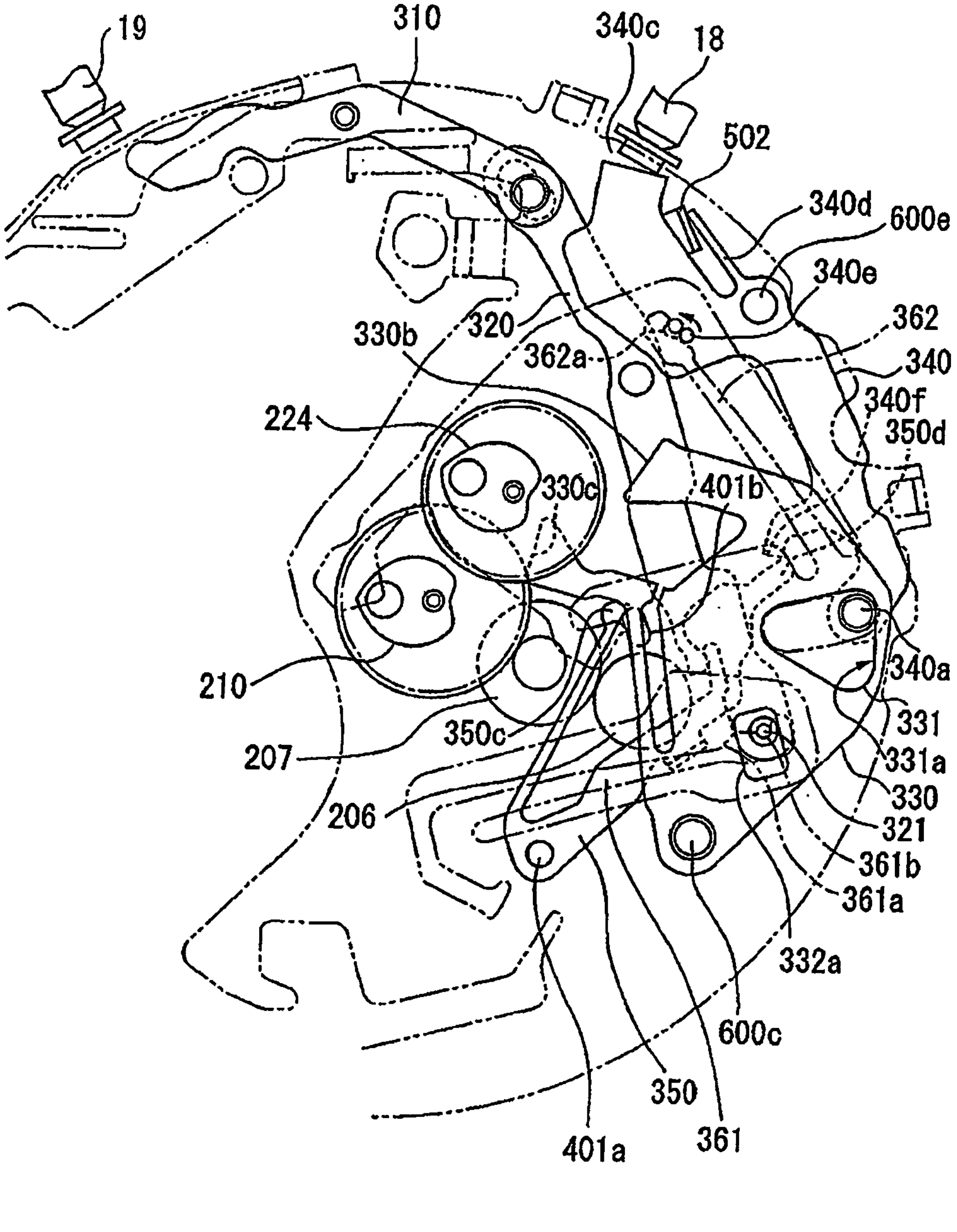
FIG. 26 is a plan view of the main section during starting and stopping.
Figure 27:
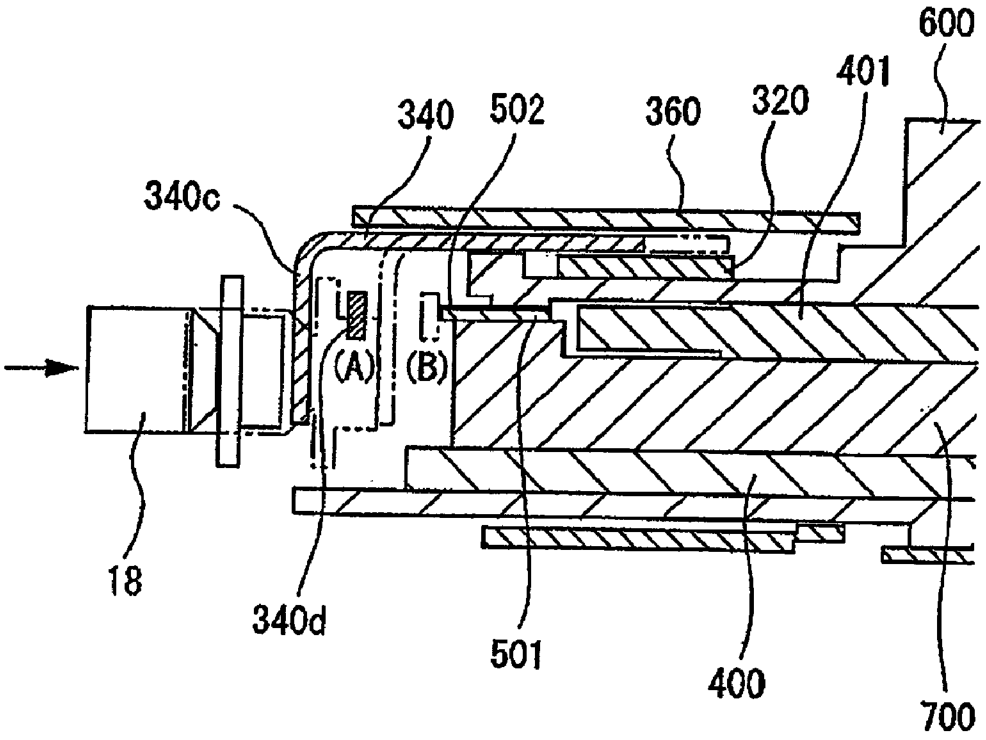
FIG. 27 is a cross-sectional view when the start and stop button are operated.

The operation for starting chronograph measurement will now be described with reference to FIGS. 26 and 27. FIG. 26 is a plan view of the main section showing the state when the start and stop button is pressed, and FIG. 27 is a cross-sectional view during start switch input.

When the start and stop button 18 is pressed, the operating lever 340 moves the surface 340*c* in contact with the start and stop button 18 and rotates it counterclockwise around a rotating shaft 600*e*. When the operating shaft 340*a* formed in the operating lever rotates counterclockwise, the inner wall 331*a* of the roughly triangular hole 331 in the return-to-zero hammer 330 is pressed and the return-to-zero hammer 330 rotates clockwise around the rotating shaft 600*c*.

The surfaces 330*b* and 330*c* of the return-to-zero hammer 330 in contact with the heart-cams 224 and 210 move to a position away from the range of the rotational trajectories of the heart-cams 224 and 210. At the same time, the chronograph setting hammer 350 rotates around the rotating shaft 401*a*, and the setting section 350*b* moves to a position away from the seconds CG second middle gear 206 because the peninsula-shaped tip section 340*f* of the operating lever 340 moves the beak-shaped tip section 350*d* of the chronograph setting hammer 350. Therefore, the chronograph gear train is left in a state in which all setting are released.

The switch input terminal 340*d* formed on the operating lever 340 is bent at the tip and mounted on the side surface of the printed circuit board 501, and is electrically connected to the start and stop input pattern 502 provided to the end surface of the printed circuit board 501 when the start and stop button 18 is pressed. The switch input is thus turned on and chronograph measurement starts.

The most suitable timing for starting should be in the sequence of the return-to-zero release or setting release and the start switch input. This timing is the most suitable because it eliminates starting errors and allows the return-to-zero state of the return-to-zero hammer 330 and the setting of the chronograph gear train to be released with a single operating lever.

The return-to-zero hammer 330 interlocked with the operating lever 340 pushes on the operating shaft 321 of the return-to-zero transmission hammer 320 with the inner wall 332*a* of the roughly rectangular hole 332 and moves it from the slanted surface 361*a* on the tip of the click spring 361 to a bed 361*b*. The position of the return-to-zero transmission hammer 320 is determined and held in this state. The transmission hammer 310 is returned to a position where it can be pushed on by the reset button 19.

The shaft 340*e* of the operating lever 340 that engages with the click spring 362 is caused to move over the slanted surface of the bed 362*a* at the tip of the click spring when the start and stop button 18 is pressed, is returned to its original position (in the direction of the arrow) due by the elastic force of the click spring 362 and the slanted surface of the wall in the longitudinal direction on the outer side of the bed 362*a* when the start and stop button 18 is released, and is fitted and positioned in the bed 362*a*. Therefore, the position of the operating lever 340 is determined and set by the click spring 362 except when operation is in progress. Also, when the operating lever 340 returns to its set position, the position is held without any movement of the return-to-zero hammer 330 because the operating shaft 340*a* moves through the roughly triangular hole 331 of the return-to-zero hammer 330 and does not engage with the walls inside the hole.

The switch input terminal 340*d* is separated from the start and stop input pattern 502 to turn off the switch input, but chronograph measurement continues with no change in the state of the electric circuit.

The stop operation will now be described. After chronograph is started, the start and stop button 18 is pressed. The operating lever 340 is pushed on by the start and stop button 18 and rotated counterclockwise. The operating shaft 340*a* moves through the roughly triangular hole 331 of the return-to-zero hammer 330, but does not engage with the walls inside the hole.

The shaft 340*e* that engages with the click spring 362 stops after moving over the concave slanted surface from the bed 362*a* at the tip of the click spring. The switch input terminal 340*d* then becomes connected to the start and stop input pattern 502, the stop input turns on, the signal to the chronograph electric motor 201 stops, and chronograph measurement stops. The operating lever 340 stops after returning to the bed 362*a* at the tip of the click spring (in the direction of the arrow) due to the elastic force of the click spring 362 and the restoring force of the slanted surface when the start and stop button 18 is released, and is held at the position prior to button operation.

As described above, the chronograph can be started and stopped repeatedly by pressing the start and stop button 18, making cumulative measurement possible.

The pressing operation has a satisfactory feel when the start and stop button 18 is pressed, because the force of resistance at the moment the shaft 340*e* engaging with the click spring 362 of the operating lever 340 moves over the slanted surface of the bed 362*a* at the tip of the click spring is transmitted to the start and stop button 18.

The pressing operation has a satisfactory feel also when the reset button 19 is pressed because the force of resistance at the moment the operating shaft 321 of the return-to-zero transmission hammer 320 moves over the peak between the two concavities while moving from the bed 361 b at the tip of the click spring to the slanted surface 361*a*.

The switch input state of the switch input terminal 340*d* in FIG. 27 will now be described. When the start and stop button 18 is pressed (in the direction of the arrow), the contact surface 340*c* of the operating lever 340 is pushed, and the return-to-zero hammer 330 in the return-to-zero state is moved to a state wherein the return-to-zero configuration is released as previously described. At this point, the switch input terminal 340*d* formed integrally with the operating lever 340 moves from (A) to (B) and comes into contact with the start and stop input pattern 502 provided to the printed circuit board 501 to turn the switch input on, a drive signal is sent to the chronograph electric motor 201, and chronograph measurement starts. When the start and stop button 18 is released, the start and stop button 18 is returned to its original position by a button return spring (not shown) provided in the case 20 of the timepiece. The operating lever input terminal 340*d* then also returns to (A) from (B), and the switch input is turned off. However, the drive signal continues to be sent and chronograph measurement continues.

If the start and stop button 18 is pressed again during chronograph measurement, the operating lever 340 interlocks with the button and the switch input terminal 340*d* comes into contact with the start and stop input pattern 502 as previously described, turning on the input. The drive signal from the electric circuit to the chronograph electric motor 201 is then turned off, and chronograph measurement stops. Then, when the start and stop button 18 is released, the start and stop button 18, the operating lever 340, and the switch input terminal 340*d* return to their original positions, but the state of the chronograph does not change. Thus, the chronograph can be repeatedly started and stopped by repeatedly pressing the start and stop button 18.

Figure 28:
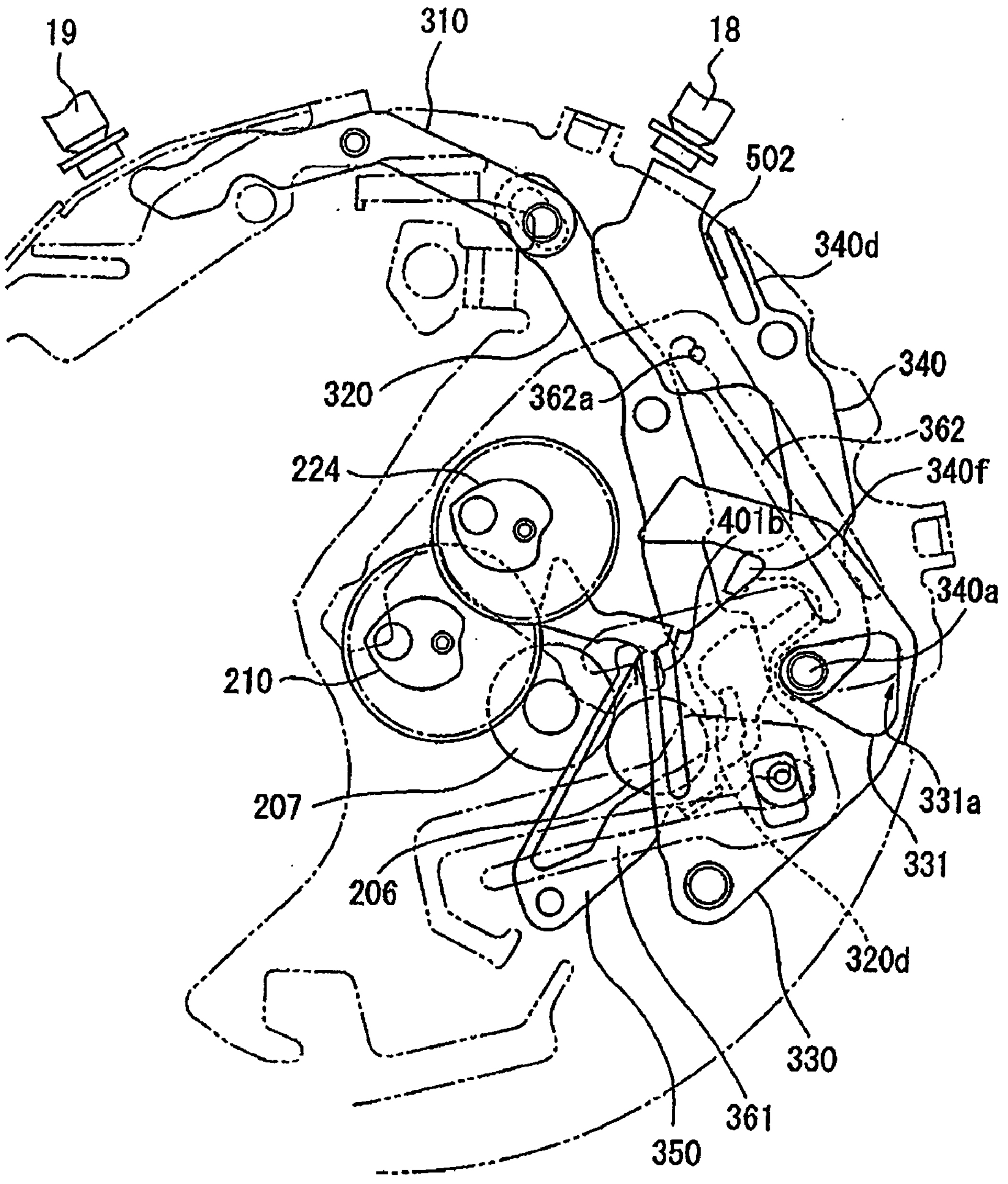
FIG. 28 is a plan view of the main section before the buttons are operated.

FIG. 28 shows the state existing before both the reset button 19 and the start and stop button 18 have been pressed.

The relative positional relationship between the reset button 19, the transmission hammer 310, the return-to-zero transmission hammer 320, and the return-to-zero hammer 330 is the same as in FIG. 26.

The operating lever 340 returns to a stable state in the bed 362*a* at the tip of the click spring 362 from its position when the start and stop button 18 is pressed. The switch input terminal 340*d* is in a position away from the start and stop input pattern 502, and the operating shaft 340*a* moves from the inner wall 331*a* of the roughly triangular hole 331 in the return-to-zero hammer 330 to the wall on the opposite side. When the setting of the chronograph setting hammer 350 is released, the peninsula-shaped tip section 340*f* of the engaged operating lever 340 stops at a position away from the chronograph setting hammer 350. The chronograph setting hammer 350 is controllably kept in a position where it does not come into contact with the seconds CG second middle gear 206 at the peninsula-shaped protruding section 320*d* of the return-to-zero transmission hammer 320.

Therefore, the consumed current relating to turning the switch on and off can be reduced because the switch is turned off in the start, stop, and reset states, except when the switch input is turned on by pressing the buttons.

In summary of the operations described above, the operating lever 340 is pushed and the return-to-zero hammer 330 is moved to a position away from the heart-cams 210 and 224 by the pressing of the start and stop button 18 during the start operation. At the same time, the setting of the seconds CG second middle gear 206 of the chronograph setting hammer 350 is released, the switch input terminal 340*d* is brought into contact with the start and stop input pattern 502 to turn on the start switch input, and chronograph measurement starts. The return-to-zero transmission hammer 320 is moved to the starting position of the bed 361*b* at the tip of the click spring, and holds this position. The return-to-zero transmission hammer 320 moves the transmission hammer 310 to a position where the reset button 19 can be pressed. When the start and stop button 18 is released, the operating lever 340 is returned to and held at a set position by the click spring 362, and the other hammers are also held at their current positions.

Also, during the stop operation, the operating lever 340 is moved to a position past the slanted surface of the bed 362*a* at the tip of the click spring by the pressing of the start and stop button 18, the switch input terminal 340*d* is brought into contact with the start and stop input pattern 502 to turn on the stop input, chronograph measurement is stopped, and the chronograph time can then be read. The other hammers do not operate at this time. When the start and stop button 18 is released, the operating lever 340 is returned to and held at the same set position as during the start operation by the click spring 362.

When the chronograph is stopped during the return-to-zero operation, pressing the reset button 19 pushes on the transmission hammer 310, the return-to-zero transmission hammer 320 is moved from the set position of the click spring 361 during the stop operation to the slanted surface 361*a* in a set position for the next resetting, the return-to-zero transmission hammer 320 interlocks with the hammer, and pressure is applied to the heart-cams 210 and 224 of the seconds CG gear 208 and the minute CG gear 220 to return the hands to zero. At the same time, the chronograph setting hammer 350 is pushed and the seconds CG second middle gear 206 is set by pressure. The reset switch is then turned on and the electric circuit is reset.

According to the present embodiment, the following effects can be obtained in addition to the same effects as the first embodiment.

The specifications of the chronograph operation have three operations: the start, stop, and return-to-zero operations. In the present embodiment, it is possible to provide a chronograph timepiece that has a simple structure with fewer components and that is configured from three primary structural components for this operation: a return-to-zero hammer 330, a return-to-zero transmission hammer 320, and an operating lever 340.

Also, the chronograph operation can be reliably performed because the positions of the operating lever 340, the return-to-zero transmission hammer 320, and the return-to-zero hammer 330 are controllably held in each return-to-zero state.

Also, in the present embodiment, the transmission hammer 310 is mounted between the return-to-zero transmission hammer 320 and the reset button 19; and the transmission hammer 310, the return-to-zero transmission hammer 320, and the return-to-zero hammer 330 interlock and return the hands to zero when the reset button 19 is pressed. The position of the reset button 19 is roughly in the 4:00 direction in the present embodiment, but the applicable merits can still be achieved by varying the position and shape of the transmission hammer 310 without changing the configuration of the return-to-zero transmission hammer 320 and other constituent components even when the position of the reset button 19 is moved to another position out of concerns for design or the like. Specifically, the return-to-zero transmission hammer can be more easily adapted to various layouts, and the applicable range of layouts can be expanded, by dividing the hammer into a component for coming into contact with the reset button 19 (transmission hammer 310) and a component for engaging with the return-to-zero hammer 330 (return-to-zero transmission hammer 320).

The present embodiment has a click spring 362 for positioning the operating lever 340 at a set position prior to button operation except for when the start and stop button 18 is pressed, and a click spring 361 for controlling the position of the return-to-zero transmission hammer 320 in the return-to-zero state when the reset button 19 is pressed, and for controlling the position of the return-to-zero transmission hammer 320 in the return-to-zero release state when the start and stop button 18 is pressed.

Since such click springs 362 and 361 are provided, it is possible to control the positions of the operating lever 340 and the return-to-zero transmission hammer 320 in the concavities on the tips in a stable manner. Also, when these components move over the peaks of the tips of the click springs due to the button operations, the operating force needed to cross the peripheral slanted surfaces thereof increases, and the components move instantaneously to the next controlled position the instant the surfaces are crossed, making button more pleasant to operate and preventing malfunctioning because the buttons cannot be moved by accidental touching.

The click springs 361 and 362, while differing in the shape of the springs and the shape of the concavities at the tip, are formed integrally with the return-to-zero clamp 360, so the number of components can be reduced, the structure simplified, assembly made easier, and other effects obtained. Integrally forming the click springs 361 and 362 with the return-to-zero clamp 360 also has the following effects: variations in their relative positions are reduced; positions can be accurately preserved not only for the operating lever 340 and return-to-zero transmission hammer 320, whose positions are directly controlled, but also for the return-to-zero hammer 330 and chronograph setting hammer 350 interlocked with the operating lever 340 and return-to-zero transmission hammer 320; and the chronograph can be prevented from malfunctioning.

Since a sliding structure is incorporated in the seconds CG gear 208 and minute CG gear 220 in the present embodiment, the chronograph seconds hand 14 and chronograph minute hand 15 journaled in the heart-cams, specifically, in the seconds CG gear 208 and minute CG gear 220, are returned to zero and the other parts of the chronograph gear train do not rotate when the return-to-zero hammer 330 is pushed on by the heart-cams to return the hands to zero. Therefore, the chronograph rotor 204 of the chronograph electric motor 201 does not become out of phase magnetically, and chronograph measurement errors due to late starting can be reduced.

Also, the operating lever 340 can be easily moved and the timing of the switch input can be easily accommodated by the present embodiment because the switch input terminal 340*d*, which is integrally configured with the operating lever 340 that operates in the start/stop sequence, is provided for the switch input of the electronic circuits.

Since the operating lever 340 is returned to a set position by a position setting member after the start and stop operations, the switch input terminal 340*d* is held in a position away from the start and stop input pattern 502 of the electric circuit after the switch input is transmitted to the electric circuit. Therefore, an electric current is generated only intermittently by the switch input, and it is possible to reduce electric power consumption. Also, the switch input terminal 340*d* can be formed in any position of the operating lever 340, or can be accommodated in the movement, which contributes to a more compact configuration for the timepiece.

Since the present embodiment includes the chronograph setting hammer 350, the sliding function can be reliably employed, rotation to the chronograph gear train during resetting can be prevented, and measurement errors during the start of the chronograph can be prevented even when the sliding torque of the seconds CG gear 208 and minute CG gear 220 is greater than the load on the chronograph gear train. The timing during resetting should be in the order "reset switch input," "set," and "return to zero," but the most suitable timing can be easily set because the chronograph setting hammer 350 and the return-to-zero hammer 330 are operated by the return-to-zero transmission hammer 320 to perform setting and resetting operations in interlocked fashion.

Also, in the present embodiment, pressing the start and stop button 18 causes the chronograph setting hammer 350 to engage with the operating lever 340, and pressing the start and stop button 18 again causes the setting of the chronograph gear train to be released.

When the chronograph starts, the chronograph setting hammer 350 must be released from the toothed gears of the chronograph gear train prior to the start switch input. The most suitable timing for starting the chronograph is the sequence from the release of the return-to-zero or set state to the start switch input. Direct interlocking of the operating lever 340 and the chronograph setting hammer 350 for performing the start switch input and releasing the setting constitute a structure in which this timing can be easily accommodated.

The present invention is not limited to the embodiments previously described, and all modifications, improvements, and other changes that remain within the range in which the objects of the present invention can be achieved are included in the present invention.

For example, an electric timepiece was given as an example in the above-described embodiments, but the present invention is not limited to an electric motor drive as a driving configuration for the pointers, and may be employed in a mechanical timepiece with a mainspring drive.

Also, two pointers, a seconds CG hand 14 and a minute CG hand 15, were provided in the above-described embodiments, but an hour CG hand may also be added, or only the seconds CG hand 14 may be provided.

Furthermore, information indicated by pointers provided in addition to the pointers for indicating the standard time is not limited to chronograph time as in the above-described embodiment, and other time information, such as the set time of alarms or timers, may also be involved. A pressure meter, a thermometer, a hygrometer, and the like may be included in addition to a time information display, and the pointers may be used to indicate the measured values thereof. The pointers may also be used, for example, to indicate the charging voltage of the secondary battery in addition to the measurement information. In other words, the information indicated by the pointers can include information other than the standard time and should be appropriately set according to the functions required in the timepiece 1.

One or a plurality of pointers may be used to indicate information other than the standard time, and one pointer with a greater length than the other pointers should be adapted to be at least slightly eccentric from the center 4A of the time display section 4.

Furthermore, the embodiments previously described included a seconds hand 13 for indicating the standard time, but this seconds hand 13 does not necessarily need to be provided and the standard time may be displayed by only the hour and minute hands 11 and 12.

In the embodiments previously described, the minute CG hand 15 was configured to move in a fan pattern, but the hand may also be configured to move by rotating in the same manner as the seconds hand 13 or the like. In this case, the mounted position of the minute CG hand 15 and the length thereof should be set similar to the seconds hand 13 or the like so that the minute CG hand 15 does not interfere with the rotating shaft 14A.

In the embodiments previously described, the seconds CG hand 14 and the hour hand 11 and minute hand 12 were disposed in positions eccentric from the center 4A in the 12:00 direction and the 6:00 direction, respectively, but these hands are not limited to these directions and may, for example, be mutually eccentric in the 3:00 direction and the 9:00 direction, or other directions.

Furthermore, the seconds CG hand 14 and the hour hand 11 and minute hand 12 were eccentric in mutually opposite directions (directions opposing each other) from the center 4A, but may also be eccentric from the center 4A in directions that do not oppose each other. For example, the seconds CG hand 14 may be eccentric from the center 4A in the 12:00 direction, and the hour hand 11 and minute hand 12 may be eccentric in roughly the 8:00 direction. The seconds CG hand 14 and the hour and minute hands 11 and 12 may also be eccentric from the center 4A in the same direction, for example, the 12:00 direction.

In short, the mounted positions of the hands should be appropriately set according to the number of mounted pointers and the like, and should particularly be set with consideration to the balance of the hands, the arrangement of the gear trains, and the like.

The planar shape of the time display section 4 can be circular, elliptical, rectangular, or the like. In these cases, the center 4A of the time display section 4 should normally be at the barycentric position of the time display section 4 of any shape.

Also, the IC mounted on the printed circuit board 501 was disposed in the same planar position as the secondary power source 640 in the embodiments previously described, but the IC may also be mounted at a position where it does not lie within the same plane as the secondary power source 640. The IC can still have a shielding effect to some degree even if it does not lie within the same plane as long as it is adjacent to the secondary power source 640. The IC and the secondary power source 640 may also be disposed in different planes by reinforcing the IC itself or providing another shield member.

The electric motors 101 and 201 were disposed in planar positions different from the planar position of the power generator 610 in the embodiments previously described, but may also, for example, be disposed at positions that lie within the same plane when appropriate measures are taken, such as placing a shield capable of blocking the magnetic flux between the electric motors 101 and 201 disposed above and below and the power generator 610. However, the embodiments previously described has the merit of being able to reduce the effect of the magnetic flux on the power generator 610 with a simple configuration.

The seconds CG gear 208 and the minute CG gear 220 were disposed spanning the first and second layers of the movement 100 to lengthen their shafts in the embodiments previously described, but they may also be journaled in the circuit holder 700 and gear train support 401 in the first layer of the movement 100, similar to the other gears. However, since relatively large hands 14 and 15 are mounted on the gears 208 and 220, a configuration such as that in the embodiments previously described is preferred because the effect of interference between the hands or the like can be reduced.

The first-layer base member was configured from the bottom plate 400 and the circuit holder 700, but may, for example, be configured from the bottom plate 400 alone. However, a configuration of two members made of metal and plastic is beneficial in terms of pivot hole machining and strength.

In the embodiments previously described, the first layer was configured with a first-layer base member and a first-layer cover member, and the second layer was configured with a second-layer base member and a second-layer cover member, but one member may be used as both the first-layer cover member and the second-layer base member.

However, providing a base member to both layers has merits in that the height level of the components disposed on both layers is easy to adjust and the components can be arranged with a high degree of precision.

The printed circuit board 501 was mounted between the layers in the embodiments previously described, but the printed circuit board 501 may be mounted on any of the layer components. However, mounting the printed circuit board between the layers has merits in that the wiring for the power source can be shortened and the wiring between the layers can be easily installed.

The power generating device incorporated in the timepiece 1 is not limited to one including an oscillating weight 480 and a power generator 610. For example, the power generating device may incorporate a spring and may drive the rotor of the power generator 610 by the spring, or may use a power generator that generates electric power by utilizing electromagnetic waves, heat, light, or other such various types of energy.

Multifunction timepieces having a power generating device are not limited to chronograph timepieces such as in the embodiments previously described, and may be common electric timepieces or the like with two or three hands. In short, the timepiece should have at least an electric motor, a gear train, a secondary power source, and a power generating device.

The transmission hammer 310 was provided between the reset button 19 and the return-to-zero transmission hammer 320 in the embodiments previously described, but the return-to-zero transmission hammer 320 may be pushed directly by the reset button 19, depending on the layout of the reset button 19. It is also possible to incorporate a plurality of hammers that include not only one transmission hammer 310, but also another hammer between the hammer in contact with the reset button 19 and the hammer for engaging with the return-to-zero hammer 330.

In the present embodiment, the sliding structure of the seconds CG gear 208 and minute CG gear 220 involved obtaining the sliding torque by pushing on the toothed gears with the sliding spring, but the same effects can be obtained if an elastic section is provided to the toothed gears themselves. Also, the sliding mechanism was provided to the seconds and minute CG gears, but may also be provided to part of another chronograph gear train.

Also, the sliding mechanism does not necessarily need to be provided. When a sliding structure is not provided, the load on the electric circuit increases when the chronograph rotor 204 rotates due to the operation and goes magnetically out of phase, but the there are means for detecting the magnetic phase in the electric circuit by the first drive signal and outputting the most suitable drive signal.

Also, in the present embodiments, two CG gears, that is, the seconds CG gear 208 and the minute CG gear 220, are installed to display chronograph measurements, but an hour CG gear or other such CG gears for displaying chronograph time may also be added, and the same effects can be obtained even with a seconds CG gear alone.

The member for positioning the operating lever and the member for positioning the return-to-zero transmission hammer in the present embodiment are click springs having an elastic section and a control section, but the same effects can be obtained when a plurality of hammers and other such members and springs are incorporated.

Also, the two positioning members are formed integrally with the return-to-zero clamp 360 in the present embodiment, but it is also possible to form a single positioning member or another positioning member in addition to the return-to-zero clamp.

One start and stop button was used in the present embodiment, but a start button and stop button may be provided separately.

The switch input spring 340*d* is not limited to being formed integrally with the operating lever 340. For example, it is possible to provide the switch input spring separate from the operating lever if the spring is set so as to interlock with the operation of the start and stop button.

The chronograph setting hammer in the present embodiment sets the seconds CG second middle gear 206, but the gear may also be set by other toothed gears in the chronograph gear train. However, since the chronograph gear train is a speed-reducing gear train from the chronograph electric motor, a toothed gear near the chronograph gear rotor 204 is preferable for reducing the setting torque.

The chronograph setting hammer performs setting by engaging with the return-to-zero transmission hammer and releases setting by engaging with the operating lever, but it is also possible to use a configuration wherein setting is released by another member interlocking with the operation of the start and stop button, and setting is performed by another member interlocking with the operation of the reset button.

Also, an electric timepiece was given as an example in the embodiments, but the present invention may also be adapted to the chronograph mechanism in a mechanical timepiece with a spring drive.

[Embodiment Summary]

This timepiece includes an hour hand and minute hand for keeping the standard time disposed in a time display section partitioned off by a dial cover disposed along the outer periphery of a dial, and a pointer mounted in the time display section and designed for indicating information other than the standard time. The dimension A from the rotating shaft of the pointer to the tip of the pointer is made greater than the dimension B from the rotating shaft of the minute hand to the tip of the minute hand. The rotating shaft of the pointer and the rotating shaft of the hour hand and minute hand are disposed at positions different from the center position of the time display section. The rotating shaft of the hour hand and minute hand and the rotating shaft of the pointer are disposed at positions separated from each other by a distance greater than the length B of the minute hand and less than the length A of the pointer.

With this timepiece, the hour and minute hands for keeping the standard time and the pointer for indicating chronograph time, alarm time, temperature, pressure, and other types of information other than the standard time are mounted so as to have different rotating shafts, so the pointer and the hour and minute hands are mounted independently to make reading the hand indications easier for the user and to improve visibility.

Also, the gear trains for driving the hands can be mounted separated from each other, and cross-sectional overlapping of the hands and overlapping of the gear trains can be minimized, because the pointer and the hour and minute hands are mounted at separate positions. Therefore, the timepiece can be made thin even with a multifunction timepiece with numerous hands.

In addition, a dynamic operation is achieved for the pointer and visibility is improved because the length of the pointer (the length A from the rotating shaft to the tip) is greater than the length B of the minute hand. The maximum length of this pointer is limited to the shortest possible length from the rotating shaft of the pointer to the outer periphery of the time display section. However, since the rotating shaft of the hour hand and minute hand and the rotating shaft of the pointer are disposed at positions separated from each other by a distance greater than the length B of the minute hand and less than the length A of the pointer, that is, since the configuration is such that the rotating shaft of the hour and minute hands is disposed within the movement trajectory of the pointer, the pointer can have an extremely great length in comparison with when the configuration is such that the trajectory of the pointer does not overlap the hour and minute hands as in Patent Literature 2.

Since the pointer can have such a great length, the visibility of the pointer can be improved without reducing the visibility of the standard time, and a timepiece in which all the information is readily visible can be obtained. Specifically, since the approximate time can be read from the positional relationship of the hour and minute hands, there is not necessarily a need to confirm the graduations or the like indicated by the hands. Therefore, it is possible to read the time information even with a pointer that is somewhat small. Accordingly, with a pointer for indicating chronograph time, pressure values, and other such information, the corresponding graduation positions must often be read to confirm the indicated information, and the visibility needed for confirming the indicated information can be improved if the pointer itself can be made longer (larger) and the intervals between the graduations can be increased.

The rotating shaft of the pointer and the rotating shaft of the hour hand and minute hand may also be mounted on opposite sides of the center position of the time display section, and made eccentric in opposite directions.

In this case, since the rotating shaft of the hour and minute hand is disposed closer to the center of the time display section opposite the rotating shaft of the pointer, the lengths of the hour and minute hands can be increased in comparison with disposing the rotating shaft of the pointer in the center of the time display section, which can further improve the visibility of the standard time.

The rotating shaft of the pointer may also be disposed at a position eccentric from the center of the time display section in the 12:00 direction, and the rotating shaft of the hour hand and minute hand may be disposed at a position eccentric from the center of the time display section in the 6:00 direction.

The term "12:00 direction" herein refers to the direction in question when the direction facing the graduation that indicates 12:00 in the standard time from the rotating shaft of the hour and minute hands for indicating the standard time corresponds to the direction from the center of the time display section. The same applies to the 6:00 direction.

If the pointer and the minute and hour hands are vertically misaligned (in the direction between 12:00 and 6:00), a good balance is achieved in mounting the hands, which contributes to a timepiece with an excellent design.

The timepiece includes a seconds hand mounted in the time display section and designed for keeping the standard time, the length C from the rotating shaft of the seconds hand to the tip of the seconds hand is less than the length A of the pointer, the rotating shaft of the seconds hand is disposed independently at a different position from the rotating shaft of the other hands, and the space between the rotating shaft of the pointer and the rotating shaft of the seconds hand may be set to a distance greater than the length C of the seconds hand and less than the length A of the pointer.

If the seconds hand for the standard time is mounted separately from the hour and minute hands and the pointer, the seconds of the standard time are easily visible, cross-sectional overlapping of the hands and overlapping of the gear trains can be minimized, and the timepiece can be made thinner.

A second pointer for indicating different information from the first pointer may be included, wherein the length D from the rotating shaft of the second pointer to the tip of the second pointer is less than the length A of the pointer, the rotating shaft of the second pointer is disposed independently at a different position than the rotating shaft of the other hands, and the space between the rotating shaft of the pointer and the rotating shaft of the second pointer is set to a distance less than the length A of the pointer.

If a second pointer is included, two types of information can be indicated along with that of the first pointer. For example, it is possible to indicate the seconds and minutes of the chronograph time with both pointers, and also to indicate the pressure and temperature with both pointers.

The space between the rotating shaft of the pointer and the rotating shaft of the second pointer may be set to a distance less than the length D of the second pointer, and the second pointer may be configured to be capable of being rotatably driven only within a specific angular range.

When the second pointer is configured to be capable of rotating only within a specific angular range such that the drive range thereof does not include the rotating shaft-of the first pointer, the second pointer can be prevented from running into the first pointer even if the rotating shaft of the second pointer is adjacent to the rotating shaft of the first pointer. In addition, in order to accommodate each hand in the range of the time display section, the hands cannot be very long when they must be designed not to run into the rotating shaft of the first pointer when rotating, but the length D of the second pointer at which collisions can still be prevented within the angular range of rotation can be greater than these hands, which further improves visibility.

The rotating shaft of the second pointer is disposed at a position eccentric from the center of the time display section roughly in the 2:00 direction, the rotating shaft of the pointer is disposed at a position eccentric from the center of the time display section in the 12:00 direction, the rotating shaft of the hour hand and minute hand is disposed at a position eccentric from the center of the time display section in the 6:00 direction, and a seconds hand for keeping the standard time whose rotating shaft is disposed at a position eccentric from the center of the time display section roughly in the 10:00 direction may be also included.

When the hands are designed in such a layout, a good balance is achieved in mounting the hands, design can be improved, the gear trains or the like for driving the hands can be mounted dispersed from each other to simplify mounting of the components in the movement, and less space is needed.

The pointer is a second chronograph hand, for example, and the second pointer is a minute chronograph hand.

According to this configuration, it is possible to fashion a multifunction timepiece configure a most often-used timepiece with chronograph.

This timepiece has a movement including a power generating device, a secondary power source for storing electric power generated by this power generating device, an electric motor driven by the electric power, and a gear train for transmitting the rotation of this embodiment to a pointer;

and the movement is configured from two layers: a first layer next to a dial and a second layer next to a back cover, wherein the electric motor and the gear train may be mounted in the first layer, and the secondary power source may be mounted in the second layer.

Since the movement has a two-layer structure, with the electric motor and the gear train mounted in the first layer next to the dial and the secondary power source mounted in the second layer next to the back cover, the thickness of the timepiece is increased in comparison with a common timepiece wherein the movement is not separated into two layers and the electric motor, the gear train, and the secondary power source are disposed at the same height level, but the planar size of the secondary power source can be increased as well. Specifically, since the gear train and the electric motor are not mounted in the second layer, a mounting space that much greater for the secondary power source can be ensured, which allows for a larger secondary power source.

The secondary power source has less internal resistance with greater size, which allows for more efficient charging and makes it possible to lengthen the duration of continuous service for the timepiece.

Furthermore, since the secondary power source is mounted in the second layer next to the back cover, the secondary power source can be incorporated last during the assembly process of the movement. The design is therefore simplified and the assembly operation of the movement can be performed efficiently in comparison with when the secondary power source is mounted in the first layer. Also, since the circuits can be electrically inspected prior to incorporating the secondary power source after the other components have been incorporated, the electrical inspection is extremely simple.

This timepiece may include a gear that has a heart-cam and is designed for holding the pointer for indicating information other than the standard time; a gear train for transmitting the driving force from a drive source to the gear; a return-to-zero hammer capable of moving to a return-to-zero position of applying pressure to the heart-cam and to a position away from the heart-cam; a first external operating member; an operating lever that moves the return-to-zero hammer to a position away from the heart-cam in conjunction with the pressing of the first external operating member when the return-to-zero hammer is in contact with the heart-cam, and that is positioned at a set position except during the operation of the first external operating member; a second external operating member; and a return-to-zero transmission hammer for controlling the return-to-zero hammer at a position in which pressure is applied to the heart-cam in conjunction with the pressing of the second external operating member.

A chronograph hand for displaying chronograph time, for example, can be used as the pointer. A chronograph gear that has a heart-cam and is designed for supporting the chronograph hand, for example, can be used as the gear for supporting the pointer. Furthermore, a chronograph gear train for transmitting the driving force from the drive source to the chronograph gear, for example, can be used as the gear train.

The operating lever moves the return-to-zero hammer that is applying pressure to the heart-cam to a position away from the heart-cam in conjunction with the pressing of the first external operating member, and is positioned at a set position by a positioning member, except during the operation of the first external operating member. Specifically, the operating lever operates in conjunction with the pressing of the first external operating member and moves the return-to-zero hammer when the return-to-zero hammer is applying pressure to the heart-cam during this operation, but does not move the return-to-zero hammer when the return-to-zero hammer is already separated from the heart-cam. Therefore, after the return-to-zero hammer is moved to a position away from the heart-cam, the operating lever is returned to a set position, that is, its position prior to being pushed on by the first external operating member when the first external operating member is released. Therefore, a satisfactory feel is obtained during operation, and malfunctions such as those occurring when the buttons are lightly pressed and the switches are closed due to an unsatisfactory response can be prevented because the operating lever positioned at the set position is also pushed on when the first external operating member is pressed and operated a second time.

Also, the return-to-zero separated from the heart-cam is returned to, and controllably kept in, a position for applying pressure to the heart-cam in conjunction with the pressing of the second external operating member. Therefore, the return-to-zero operation can be achieved by the pressing of the second external operating member.

Furthermore, the return-to-zero hammer is separated from the return-to-zero position where pressure is applied to the heart-cam and controllably kept in a position where the pressure is released in conjunction with the pressing of the first external operating member, with the result that, for example, the chronograph hands can be driven if the electric motor is driven, and the chronograph hands can be stopped if the electric motor is stopped in cases in which the chronograph hands are driven by the electric motor.

Therefore, a switch interlocking with the first external operating member and the operating lever is provided, and every time the first external operating member is pressed, the pointer of the chronograph hands or the like can be started and stopped if the drive of the electric motor is configured to repeatedly start and stop in an alternating manner.

Therefore, when the start, stop, and return-to-zero operations, which are the general operating specifications of a chronograph, are performed, it is possible in the present invention to configure the primary structural components from a return-to-zero hammer, a return-to-zero transmission hammer, and an operating lever; to provide a simple structure; and to improve assembly.

It is preferable that a printed circuit board with a control circuit for the electric motor be mounted between the first and second layer of the movement, and that the printed circuit board, the power generating device, the secondary power source, and the electric motor be electrically connected.

With such a configuration, the electrical wiring between the electric motor mounted in the first layer, the secondary power source mounted in the second layer, and the printed circuit board can be shortened, interference from external noise can be reduced, and malfunctioning can be prevented.

It is also preferable that the power generating device be configured with an oscillating weight and with a power generator that has a power generating coil and a power generating rotor rotated by the oscillating weight, and that the power generator be mounted in the second layer.

When a power generating device using an oscillating weight is used, the oscillating weight is rotated when the arm or the like on which the timepiece is mounted is moved. The kinetic energy is converted to rotational energy by the rotation of the oscillating weight, the rotor rotates due to this rotational energy, and electric power is generated by the power generator. The kinetic energy from the exterior can be efficiently converted to a large amount of rotational energy, and a large amount of electric power can be generated because the oscillating weight can be provided with a shape capable of a significant momentum by adjusting the weight of the oscillating weight and the distance between the rotating shaft and the weight. Also, the power generating device itself can be made thin, and the movement into which the power generating device is incorporated can be made relatively thin because the rotating shaft has a flat shape.

Furthermore, it is preferable that the first layer of the movement includes a first-layer base member for supporting either of pivots of the gear train shafts, and also includes a first-layer cover member for supporting the other pivot of the gear train shafts; the electric motor is mounted between the first-layer base member and the first-layer cover member; the second layer of the movement includes a second-layer base member and a second-layer cover member; the power generator is mounted between the second-layer base member and the second-layer cover member; and the oscillating weight is mounted next to the back cover of the second-layer cover member.

With such a configuration, the components mounted in each layer can be mounted using the base members of each layer as a reference because the first and second layers both have a base member and a cover member. Therefore, the assembly operation is improved because mounting and assembly of the components is simplified and gear train backlash is easy to regulate.

Furthermore, there is no need for concern over interference with the rotating shaft when mounting the secondary power source or other such components, and the components can be assembled that much more efficiently because the oscillating weight is provided next to the back cover of the second-layer cover member, that is, the side that is free from the other components.

Also, it is preferable that the first-layer base member is configured by layering a metal plate and a plastic plate, wherein pivot holes for holding the pivots of the gear train is formed in the plastic plate, and the second-layer base member is configured from a plastic plate in which pivot holes for holding the pivots of the gear train are formed.

If pivot holes are formed in the plastic plate, the pivot holes can be formed integrally by injection molding or the like, and machining is simplified in comparison with when pivot holes are machined in a metal plate, which further reduces cost. Machining costs can be greatly reduced particularly when there are many toothed gears, or, specifically, many pivot holes. A metal plate is laminated, and mechanical strength can therefore be ensured by means of this metal plate. Therefore, the thickness of the plastic plate can be reduced, and also the thickness of the timepiece can be greatly reduced.

Furthermore, it is preferable to include a pointer for indicating information other than the standard time, wherein one of the pivots of the rotating shaft of this pointer is supported by the first-layer base member of the movement, and the other pivot is supported by the second-layer base member or the second-layer cover member.

With such a configuration, the rotating shaft of the pointer can be lengthened and reading errors due to interference between the hands or the like can be minimized.

Also, the electric motor is preferably mounted at a position that does not overlap the planar position of the power generator.

The power generator and the electric motor are mounted in vertically separated positions in different layers, but the power generator and electric motor can be mounted even farther away from each other because they are mounted in different planes. Since the effect of a leakage flux can be reduced in proportion to the square of the distance, the effect of a leakage flux can be reduced even further and no concern is needed for the circuit if the power generator and the electric motor can be mounted away from each other.

Also, it is preferably that an IC is mounted on the printed circuit board and that the planar position of the IC be within the planar position of the secondary battery.

If the IC is mounted within the planar position of the secondary battery, that is, on the lower side (glass side) of the secondary battery, the wiring for the power source connecting the two can be shortened, and malfunctioning due to external noise or the like can be prevented. Also, the metallic secondary battery can act as a shield to prevent IC damage due to static electricity by being mounted on the IC.

Furthermore, it is preferable that the return-to-zero transmission hammer is configured from a first return-to-zero transmission hammer and a second return-to-zero transmission hammer, that both return-to-zero transmission hammers include rotating shafts in their centers and are disposed such that their ends can rotate, two of the ends are coupled to each other to be capable of rotating and moving in a sliding fashion, the other end of the first return-to-zero transmission hammer is mounted to be capable of coming into contact with the second external operating member, and the other end of the second return-to-zero transmission hammer is provided to ensure contact with the return-to-zero hammer.

The configuration may be such that the return-to-zero transmission hammer comes into contact directly with the second external operating member, and that the return-to-zero transmission hammer is directly operated by the pushing action of the second external operating member.

The first return-to-zero transmission hammer pushed on by the second external operating member and the second return-to-zero transmission hammer for engaging with the return-to-zero hammer may be mounted between the second external operating member and the return-to-zero hammer, and the return-to-zero hammer may be moved to a position where pressure is applied to the heart-cams via the first and second return-to-zero transmission hammers due to the pressing of the second external operating member.

Also, it is preferable that this timepiece includes an operating lever positioning member for engaging with the operating lever, and a return-to-zero transmission hammer positioning member for engaging with the return-to-zero transmission hammer; the operating lever positioning member includes an elastic section capable of resilient deformation by the pressing force during operation of the first external operating member, and a control section that utilizes the elastic force of the elastic section to position the operating lever to a set position, except during the operation of the first external operating member; and the return-to-zero transmission hammer positioning member includes an elastic section capable of resilient deformation by either the pressing force during operation of the first external operating member or the pressing force during operation of the second external operating member, and a control section for positioning the return-to-zero transmission hammer to a position in which the return-to-zero hammer is separated from the heart-cams, and a position in which the hammer is applying pressure to the heart-cams.

The positioning members can be a click spring or other component comprising, for example, an elastic section that is capable of resilient deformation and is obtained by processing a plate and elongating it from the base side, and a control section with a shaft that can be engaged, is formed into a concave shape next to the tip of the elastic section, and protrudes into the operating lever or the return-to-zero transmission hammer.

In such a configuration, the elastic force functions to return the operating lever to a set position by the elastic section of the operating lever positioning member. Therefore, when the pressing of the first external operating member is released and the pressing force of the first external operating member on the operating lever is no longer in effect, the operating lever is automatically returned to a set position by the elastic force of the elastic section, and is positioned by the control section to its position prior to the operation of the first external operating member.

The return-to-zero transmission hammer positioning member controllably pushes the return-to-zero transmission hammer with the control section to a position where the return-to-zero hammer applies pressure to the heart-cams when the second external operating member is pressed, and controls the position of the return-to-zero transmission hammer with the control section so that the return-to-zero hammer is held in a position away from the heart-cams. The return-to-zero transmission hammer positioning member applies elastic force to the return-to-zero transmission hammer so as to maintain it in the two controlled position states, and the return-to-zero transmission hammer moves away from the controlled positions when a force that is sufficient to exceed the elastic force is applied.

The positioning members can control the positions of the operating lever and the return-to-zero transmission hammer in a stable manner with the elastic force of the elastic section and the control section, and a satisfactory feel can be obtained and malfunctioning prevented because there is no need for a specific operating force when the hammers are removed from the control section, which may have a concave shape, of the positioning member during operation of the first external operating member. Therefore, the satisfactory feel during operation can be controlled and an appropriate and satisfactory sense of operation with improved operability can be obtained by suitably adjusting the shape of the control section of the positioning members and the elastic force of the elastic section.

The operating lever positioning member and the return-to-zero transmission hammer positioning member may be formed on different members, but are preferably formed at different positions of the same member.

Forming the positioning members on the same member has the effects of reducing the number of components, simplifying the structure, and improving assembly in comparison with when they are formed on different members. Configuring them on the same member also suppresses variations in their relative positions, improves mutual positional precision between the operating lever and the return-to-zero transmission hammer, and makes stable operation possible. The shape of the control section, the shape of the elastic section, and the position should be suitably set for the two positioning members in accordance with the configuration and other attributes of the operating lever and the return-to-zero transmission hammer.

It is preferable that in cases in which the return-to-zero hammer is applying pressure to the heart-cams, the chronograph hands or other such pointers start when the first external operating member interlocking with the operating lever is pressed to separate the return-to-zero hammer from the heart-cams; the chronograph hands or other such pointers stop when the first external operating member is pressed in cases in which the return-to-zero hammer is separated from the heart-cams; when the chronograph hands or other such pointers have stopped, the chronograph hands or other such pointers start when the first external operating member is pressed; and when the return-to-zero hammer is separated from the heart-cams, the chronograph hands or other such pointers return to zero when the second external operating member is pressed.

In cases in which the return-to-zero hammer is applying pressure to the heart-cams (returned to zero), the operating lever is pushed on when the first external operating member is pressed, and the return-to-zero hammer moves to a position away from the heart-cams, causing the chronograph hands or other such pointers to start. When the first external operating member is pressed again, the operating lever is pushed on and the chronograph hands or other such pointers stop. When the chronograph hands or other such pointers have stopped, pressing the first external operating member starts the chronograph hands or other such pointers.

Therefore, starting and stopping is repeated by consecutively pressing the first external operating member, cumulative chronograph measurement is possible, the operation is simplified, and the operation is free of errors.

It is preferable that the operating lever includes a switch input spring inputted by the pressing of the first external operating member, and that the start and stop operations of the chronograph hands or other such pointers are controlled by the input of the switch input spring.

In a chronograph timepiece wherein a chronograph gear train is driven by an electric circuit and a chronograph electric motor, which is a drive source, the switch input must be transmitted to the electric circuit in order to operate the chronograph. Therefore, if a switch input spring formed integrally with the operating lever is provided, the switch input spring operates in the same manner as the operating lever, the switch input is turned on by the pressing of the first external operating member, and the switch input is turned off when the operation is released, so the switch input can be transmitted to the electric circuit.

With such a configuration, the movement of the operating lever, the timing of the return-to-zero hammer as it separates from the heart-cams, and the switch input timing can be easily accommodated because the switch input spring can operate integrally with the operating lever in the same manner.

Also, the switch input spring is advantageous in that its position on the operating lever can also be selected according to the layout of the electric circuit and the other hammers, so the spring can be formed towards the inner side of the movement, and the external size of the movement can be reduced.

The chronograph gear or other such gear is preferably configured from an shaft section with a heart-cam and from a toothed gear section for meshing with another gear train (chronograph gear train or the like) and providing sliding engagement with the shaft section.

With such a configuration, for example, since the chronograph gear includes a sliding mechanism, only the heart-cam and shaft section of the chronograph gear are forced to rotate during resetting, and no measurement errors occur because the other toothed gears of the chronograph gear train do not rotate.

Due to the presence of the sliding mechanism, measurement errors also do not occur because the rotation is not transmitted to the rotor during resetting.

Furthermore, the heart-cam rotates instantaneously during resetting, applying a rotation load to the other parts of the chronograph gear train. Therefore, including a sliding mechanism allows for a stable return to zero without stopping the rotation during the return to zero because no load is applied to the chronograph gear train during forced rotation. Also, a design is possible wherein the load during forced rotation is applied to the weakest section of the chronograph gear train in terms of strength per unit area without any damage.

It is preferable to include a setting hammer (chronograph setting hammer or the like) for setting any one of the toothed gears in the area extending from the drive source of the gear train (chronograph gear train or the like) to the gears (chronograph gears or the like) when the gears (chronograph gears or the like) are returned to zero.

Since a chronograph setting hammer is provided for setting the toothed gears of the chronograph gear train, the sliding function is reliably performed by the pressing force of the chronograph setting hammer, rotation is prevented from extending to the drive source during resetting, and no measurement errors occur when the chronograph starts.

It is preferable to include a setting hammer (chronograph setting hammer or the like) for engaging with the return-to-zero transmission hammer and pushing/setting one of the toothed gears of the gear train (chronograph gear train or the like) in conjunction with the pressing of the second external operating member.

If the configuration is such that the chronograph setting hammer is made to engage with the return-to-zero transmission hammer and that one of the toothed gears of the chronograph gear train is pushed and set in conjunction with the pressing of the second external operating member, the chronograph gear train can be set in accordance with the operation for returning the chronograph gears to zero. Specifically, the structure is such that a timing should be selected whereby setting occurs immediately before returning to zero, and that the timing is easily accommodated because the return-to-zero hammer and the chronograph setting hammer are made to operate by the return-to-zero transmission hammer.

The setting hammer (chronograph setting hammer or the like) preferably engages with the operating lever and releases the setting of the gear train (chronograph gear train or the like) in conjunction with the pressing of the first external operating member.

For example, when the chronograph starts, it is preferable that the chronograph setting hammer is released from the toothed gears of the chronograph gear train prior to the start switch input.

Therefore, having the chronograph setting hammer interlock directly with the operating lever that performs the start switch input and releases the setting has the effect of allowing the timing to be easily accommodated.

It is preferable that the return-to-zero hammer includes a pressure section capable of applying pressure to the heart-cams, first and second holes, and a rotating shaft; the operating lever includes a tip section that comes into contact with the first external operating member, another tip section having an operating shaft that engages with the first hole of the return-to-zero hammer, and a rotating shaft provided between the tip sections; the return-to-zero transmission hammer includes a tips section that comes into contact with the second external operating member, an shaft member that engages with the second hole of the return-to-zero hammer, and a rotating shaft provided between the tip sections; the first hole of the return-to-zero hammer is formed into a shape that enables the operating shaft to come into contact with the inner wall of the hole and to move the return-to-zero hammer in cases in which the operating lever rotates in conjunction with the pressing of the first external operating member when the return-to-zero hammer pushes on the heart-cams, and enables the operating shaft to separate from the inner wall of the hole and to allow the return-to-zero hammer to move freely in cases in which the operating lever rotates in conjunction with the pressing of the first external operating member when the return-to-zero hammer is separated from the heart-cams; and the second hole of the return-to-zero hammer is formed into a shape which enables the shaft member of the return-to-zero transmission hammer to be pushed on by the inner wall of the hole along with the rotation of the return-to-zero hammer when the return-to-zero hammer is in contact with the heart-cams, and enables the shaft member of the return-to-zero hammer to come into contact with the inner wall of the hole and allows the movement of the return-to-zero hammer towards the heart-cams to be controlled when the return-to-zero hammer is separated from the heart-cams.

With such a configuration, a specific operation can be achieved by suitably devising the shapes of the first and second holes of the return-to-zero hammer and causing the operating shaft of the operating lever and the shaft member of the return-to-zero transmission hammer to engage with the holes. For example, the first hole can have a substantially triangular shape, and when the return-to-zero hammer is separated from the heart-cams, the operating shaft of the operating lever can move freely within the triangular hole even when the operating lever rotates.

The configuration is made relatively simple, and operation can be performed reliably because the operation is made possible merely by devising the shapes of the holes and other components in a suitable manner.

Industrial Applicability

The present invention can be utilized in a multifunction timepiece, for example, a chronograph timepiece having hands for displaying the standard time, and hands for displaying chronograph time, temperature, and other such information other than the standard time.

The terms "front," "back, "up," "down," "perpendicular," "horizontal," "slanted," and other direction-related terms used above indicate the directions in the employed diagrams. Therefore, the direction-related terms used to describe the present invention should be interpreted in relative terms as applied to the employed diagrams.

"Substantially," "essentially," "about," and other terms used above that represent an approximation indicate a reasonable amount of deviation that does not bring about a considerable change as a result. Terms that represent these approximations should be interpreted so as to include an error of about ±5% at least, as long as there is no considerable change due to the deviation.

This specification claims priority to Japanese Patent Application Nos. 2003-18806, 2003-22166, and 2003-22165. All the disclosures in Japanese Patent Application Nos. 2003-18806, 2003-22166, and 2003-22165 are incorporated herein by reference.

Only some embodiments of the present invention are cited in the above description, but it is apparent to those skilled in the art that it is possible to add modifications to the above-described embodiments by using the above-described disclosure without exceeding the range of the present invention as defined in the claims. The above-described embodiments furthermore do not limit the range of the present invention, which is defined by the accompanying claims or equivalents thereof, and are designed to provide solely a description of the present invention.

What is claimed is:

1. A timepiece comprising:

a dial having a dial cover and a time display section on an inner peripheral side thereof;

an hour hand being mounted on the time display section and having an hour hand rotating shaft disposed at a position different from the center position of the time display section;

a minute hand being mounted on the time display section and having a minute hand rotating shaft disposed at a position different from the center position of the time display section;

a first pointer being mounted on the time display section and having a first pointer rotating shaft arranged to be eccentric from the center of the time display section and arranged in a different location from the minute hand rotating shaft and the hour hand rotating shaft on the time display section, a dimension A from the first pointer rotating shaft to a tip of the first pointer being greater than a dimension B from the minute hand rotating shaft to a tip of the minute hand, and the first pointer rotating shaft being disposed at a position away from the hour hand rotating shaft by a distance less than the dimension A and greater than the dimension B;

a second pointer being mounted on the time display section and having a second pointer rotating shaft arranged eccentric from the center of the time display section and different from the first pointer rotating shaft, the second pointer being configured to be capable of rotating only within a specific angular range, a dimension D from the second pointer rotating shaft to a tip of the second pointer being shorter than the dimension A, and the second pointer rotating shaft being disposed at a position away from the pointer rotating shaft by a distance less than the dimension D; and a movement being configured to drive the hour hand, the minute hand, the first pointer, and the second pointer.

2. A timepiece comprising:

a dial having a dial cover and a time display section on an inner peripheral side thereof;

an hour hand being mounted on the time display section and having an hour hand rotating shaft disposed at a position different from the center position of the time display section;

a minute hand being mounted on the time display section and having a minute hand rotating shaft disposed at a position different from the center position of the time display section and concentric with the hour hand rotating shaft, the hour hand rotating shaft and the minute hand rotating shaft being disposed at a position eccentric from the center position of the time display section in a 6:00 direction;

a pointer being mounted at a position eccentric from the center of the time display section and different from the hour hand rotating shaft and minute hand rotating shaft on the time display section and having a pointer rotating shaft, a dimension A from the pointer rotating shaft to a tip of the pointer being greater than a dimension B from the minute hand rotating shaft to a tip of the minute hand, the pointer rotating shaft being disposed at a position away from the hour hand rotating shaft by a distance less than the dimension A and greater than the dimension B, the pointer rotating shaft being disposed on the opposite side of the center position of the time display section from the hour hand and minute hand rotating shafts and the pointer rotating shaft being disposed at a position eccentric from the center position of the time display section in a 12:00 direction; and a movement being configured to drive the hour hand, the minute hand, and the pointer.

3. The timepiece according to claim 2, further comprising, a case to accommodate the dial, the hour hand, the minute hand, the pointer, and the movement, and a wrist mounting strap connected to the case.

4. A timepiece comprising:

a dial having a dial cover and a time display section on an inner peripheral side thereof;

an hour hand being mounted on the time display section and having an hour hand rotating shaft disposed at a position different from the center position of the time display section;

a minute hand being mounted on the time display section and having a minute hand rotating shaft disposed at a position different from the center position of the time display section and concentric with the hour hand rotating shaft;

a pointer being mounted at a position eccentric from the center of the time display section and different from the hour hand rotating shaft and minute hand rotating shaft on the time display section and having a pointer rotating shaft, a dimension A from the pointer rotating shaft to a tip of the pointer being greater than a dimension B from the minute hand rotating shaft to a tip of the minute hand, and the pointer rotating shaft being disposed at a position away from the hour hand rotating shaft by a distance less than the dimension A and greater than the dimension B;

a movement being configured to drive the hour hand, the minute hand, and the pointer; and a seconds hand being mounted on the time display section and having a seconds hand rotating shaft at a position different from the pointer rotating shaft, a dimension C from the seconds hand rotating shaft to a tip of the seconds hand being less than the dimension A, and the seconds hand rotating shaft being disposed at a position away from the pointer rotating shaft by a distance greater than the dimension C and less than the dimension A.

5. The timepiece according to claim 4, wherein the pointer rotating shaft is disposed at a position eccentric from the center of the time display section in a 12:00 direction, the hour hand rotating shaft and the minute hand rotating shaft are disposed at a position eccentric from the center of the time display section in a 6:00 direction, and the seconds hand rotating shaft is disposed at a position eccentric from the center of the time display section in a 10:00 direction.

6. The timepiece according to claim 5, further comprising, a second pointer that is disposed on the time display section and has a second pointer rotating shaft at a position different from the pointer rotating shaft, wherein a dimension D from the second pointer rotating shaft to a tip of the second pointer is less than the dimension A, and the second pointer rotating shaft is disposed at a position away from the pointer rotating shaft by a distance less than the dimension A, wherein the second pointer rotating shaft is disposed at a position eccentric from the center of the time display section about in a 2:00 direction.

7. The timepiece according to claim 6, wherein the second pointer is configured to be capable of rotating only within a specific angular range, and the second pointer rotating shaft is disposed at a position away from the pointer rotating shaft by a distance less than the dimension D.

8. The timepiece according to claim 7, further comprising, a case to accommodate the dial, the hour hand, the minute hand, the pointer, and the movement, and a wrist mounting strap connected to the case.

9. A timepiece comprising:

a dial having a dial cover and a time display section on an inner peripheral side thereof;

an hour hand being mounted on the time display section and having an hour hand rotating shaft disposed at a position different from the center position of the time display section;

a minute hand being mounted on the time display section and having a minute hand rotating shaft disposed at a position different from the center position of the time display section and concentric with the hour hand rotating shaft;

a pointer being mounted at a position eccentric from the center of the time display section and different from the hour hand rotating shaft and minute hand rotating shaft on the time display section and having a pointer rotating shaft, a dimension A from the pointer rotating shaft to a tip of the pointer being greater than a dimension B from the minute hand rotating shaft to a tip of the minute hand, and the pointer rotating shaft being disposed at a position away from the hour hand rotating shaft by a distance less than the dimension A and greater than the dimension B; and a movement being configured to drive the hour hand, the minute hand, and the pointer a second pointer being mounted on the time display section and having a second pointer rotating shaft at a position different from the pointer rotating shaft, a dimension D from the second pointer rotating shaft to a tip of the second pointer being less than the dimension A, and the second pointer rotating shaft being disposed at a position away from the pointer rotating shaft by a distance less than the dimension A.

10. The timepiece according to claim 9, wherein the second pointer rotating shaft is disposed at a position eccentric from the center of the time display section about in a 2:00 direction, the pointer rotating shaft is disposed at a position eccentric from the center of the time display section in a 12:00 direction, and the hour hand rotating shaft and the minute hand rotating shaft are disposed at a position eccentric from the center of the time display section in a 6:00 direction.

11. The timepiece according to claim 10, further comprising, a case to accommodate the dial, the hour hand, the minute hand, the pointer, and the movement, and a wrist mounting strap connected to the case.

12. The timepiece according to claim 9, wherein the pointer is a seconds chronograph hand, and the second pointer is a minute chronograph hand.

13. The timepiece according to claim 12, further comprising, a date display section to display the date on the dial.

14. The timepiece according to claim 13, further comprising, a case to accommodate the dial, the hour hand, the minute hand, the pointer, and the movement, and a wrist mounting strap connected to the case.

15. The timepiece according to claim 14, wherein the dial has seconds chronograph graduations and minute chronograph graduations.

* * * * *